United States Patent
Tanimoto et al.

(10) Patent No.: US 10,642,607 B2
(45) Date of Patent: May 5, 2020

(54) DETERMINATION APPARATUS AND DETERMINATION METHOD

(71) Applicant: Renesas Electronics Corporation, Tokyo (JP)

(72) Inventors: Tadaaki Tanimoto, Tokyo (JP); Naoyuki Morita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 93 days.

(21) Appl. No.: 15/656,893

(22) Filed: Jul. 21, 2017

(65) Prior Publication Data
US 2018/0088936 A1 Mar. 29, 2018

(30) Foreign Application Priority Data

Sep. 23, 2016 (JP) .................. 2016-185274

(51) Int. Cl.
*G06F 8/71* (2018.01)
*G06F 8/65* (2018.01)
(Continued)

(52) U.S. Cl.
CPC .................. *G06F 8/71* (2013.01); *G06F 8/30* (2013.01); *G06F 8/65* (2013.01); *G06F 8/658* (2018.02);
(Continued)

(58) Field of Classification Search
CPC ... G06F 8/30; G06F 8/65; G06F 8/656; G06F 8/658; G06F 8/71; G06F 9/94498; G06F 21/76
(Continued)

(56) References Cited

U.S. PATENT DOCUMENTS

| 6,353,861 B1 * | 3/2002 | Dolin, Jr. ......... G05B 19/41865 709/220 |
| 7,020,850 B2 * | 3/2006 | Raghavan ................. G06F 8/34 703/23 |

(Continued)

FOREIGN PATENT DOCUMENTS

| JP | 2010-218334 A | 9/2010 |
| JP | 2015-032314 A | 2/2015 |

OTHER PUBLICATIONS

Bordeaux et al., "Propositional Satisfiability and Constraint Programming : a Comparative Survey", ACM, 2006, 63pg. (Year: 2006).*

(Continued)

*Primary Examiner* — Ryan D. Coyer
(74) *Attorney, Agent, or Firm* — McDermott Will & Emery LLP

(57) ABSTRACT

A determination apparatus includes a difference code generation section that generates a first difference code and a second difference code, the first difference code representing a set of code pieces in a first program that are different from code pieces in a second program, the second difference code representing a set of code pieces in the second program that are different from code pieces in the first program, a logical expression derivation section that performs predetermined conversion to derive a first logical expression from the first difference code and derive a second logical expression from the second difference code, and a determination section that, depending on whether the second logical expression includes the first logical expression, determines whether the first program in a predetermined embedded device is dynamically updatable to the second program.

21 Claims, 39 Drawing Sheets

(51) Int. Cl.
G06F 9/448 (2018.01)
G06F 8/658 (2018.01)
G06F 8/30 (2018.01)
G06F 21/76 (2013.01)
G06F 8/656 (2018.01)

(52) U.S. Cl.
CPC ............ G06F 9/4498 (2018.02); *G06F 8/656* (2018.02); *G06F 21/76* (2013.01)

(58) Field of Classification Search
USPC .......................................................... 717/106
See application file for complete search history.

(56) References Cited

U.S. PATENT DOCUMENTS

| | | | |
|---|---|---|---|
| 8,468,516 B1* | 6/2013 | Chen ...................... | G06F 8/656 717/170 |
| 2004/0128281 A1* | 7/2004 | Terazono .................. | G06F 8/65 |
| 2013/0227505 A1* | 8/2013 | Tanimoto ............. | G06F 17/504 716/107 |
| 2015/0040113 A1 | 2/2015 | Muench-Casanova et al. | |

OTHER PUBLICATIONS

Cordeiro et al., "SMT-Based BoundedModel Checking for Embedded ANSI-C Software", arXiv:0907.2072v2 [cs.SE], 2009, 12pg. (Year: 2009).*

Gao et al., "BinHunt: Automatically Finding Semantic Differences in Binary Programs", Springer-Verlag, 2008, 18pg. (Year: 2008).*

Leino, K. Rustan M., "Dafny: An Automatic Program Verifier for Functional Correctness", Microsoft Research, 2010, 19pg. (Year: 2010).*

Person et al., "Directed Incremental Symbolic Execution", ACM, 2011, 12pg. (Year: 2011).*

Masatomo Hashimoto, "A Method of Safety Analysis for Runtime Code Update," In Proc. of ASIAN, LNCS 4435, pp. 60-74, 2007.

Deepak Gupta, Pankaj Jalote, and Gautam Barua, "A Formal Framework for On-line Software Version Change," IEEE Trans. on Software Engineering, vol. 22 Issue.2, pp. 120-131, Feb. 1996.

Joel Koshy and Raju Pandey, "Remote Incremental Linking for Energy-Efficient Reprogramming of Sensor Networks," In Proc. of the 2nd European Workshop on Wireless Sensor Networks, pp. 354-365, 2005.

Meik Felser, Rudiger Kapitza, Jurgen Kleinoder, and Wolfgang Schroder-Preikschat, "Dynamic Software Update of Resource-Constrained Distributed Embedded Systems," Embedded System Design: Topics, Techniques and Trends, vol. 231 of the series IFIP—The International Federation for Information Processing pp. 387-400, 2007.

Alfred V. Aho,Ravi Sethi,Jeffrey D. Ullman Monica S. Lam, "Compilers: Principles, Techniques, and Tools," Prentice Hall, and English Translation thereof; Addison-Wesley Publishing Co., 1986.

Scott A. Mahlke, David C. Lin, William Y. Chen, Richard E. Hank, and Roger A. Bringmann, "Effective compiler support for predicated execution using the hyperblock," ACM SIGMICRO Newsletter, vol. 23, Issue.1-2, pp. 45-54, Dec. 1992.

Robin Milner, "Communication and Concurrency (Prentice HallIInternational Series in Computer Science)," Prentice Hall; 1995.

Thomas A. Henzinger, Ranjit Jhala, Rupak Majumdar, and Gregoire Sutre,"Lazy Abstraction". Proceedings of the 29th Annual Symposium on Principles of Programming Languages (POPL), ACM Press, 2002, pp. 58-70.

* cited by examiner $p \xrightarrow{*} q$: q CAN BE REACHED FROM p BY EXECUTING FINITE NUMBER OF STEPS ∃ $S_k$: PROGRAM CONTEXT $P'(T(S_k)) \leadsto P'(t_l)$: REACHABLE

HERE,

T : S→S' : CONTEXT CONVERSION

P : UN-UPDATED PROGRAM

P' : UPDATED PROGRAM

} GENERALLY UNDETERMINABLE

→ UPDATE TIMING RESTRICTS CONTEXT CONVERSION T

FIG. 8

■ COMPLIANCE WITH MISRA-C

- RECURSIVE CALL ⇨ IT MAY BE ASSUMED THAT ALL RECURSIVE CALLS ARE CONVERTED TO LOOP DESCRIPTIONS.
- CONTROL FLOW and DATA FLOW ANALYSES CAN BE MADE.

⇨ CALL GRAPH TURNS OUT TO BE DAG.

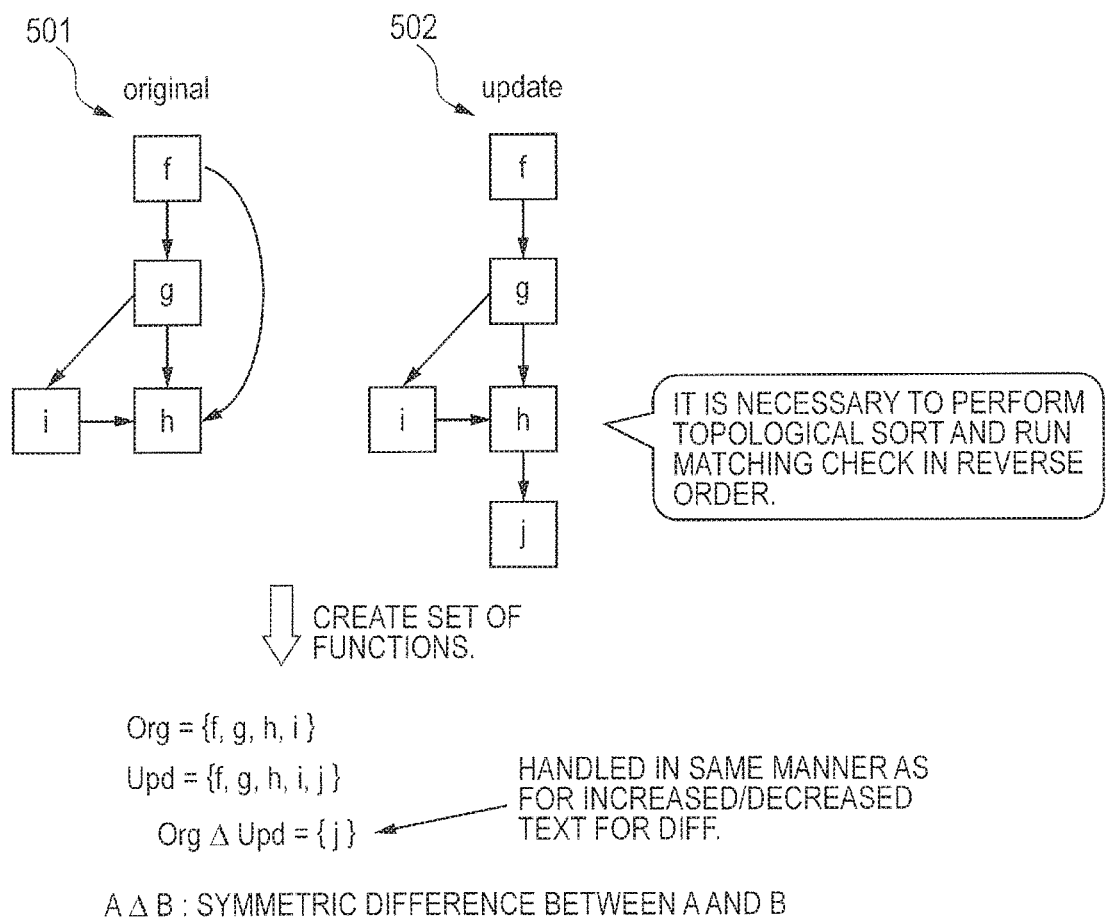

IT IS NECESSARY TO PERFORM TOPOLOGICAL SORT AND RUN MATCHING CHECK IN REVERSE ORDER.

⬇ CREATE SET OF FUNCTIONS.

Org = { f, g, h, i }
Upd = { f, g, h, i, j }
Org △ Upd = { j }  ← HANDLED IN SAME MANNER AS FOR INCREASED/DECREASED TEXT FOR DIFF.

A △ B : SYMMETRIC DIFFERENCE BETWEEN A AND B

■ COMPLIANCE WITH MISRA-C
ASSUMPTION: NO REAL INACTIVE CODES AND INACTIVE VARIABLES EXIST.
( ∵ IF THEY EXIST, COVERAGE IS NOT ACHIEVED.)

DETERMINATION APPARATUS AND DETERMINATION METHOD

CROSS-REFERENCE TO RELATED APPLICATIONS

The disclosure of Japanese Patent Application No. 2016-185274 filed on Sep. 23, 2016 including the specification, drawings, and abstract is incorporated herein by reference in its entirety.

BACKGROUND

The present invention relates to a determination apparatus and to a determination method. For example, the present invention relates to an apparatus and method for making a determination about performing a dynamic program update on an embedded device.

In recent years, there has been an increase in the number of embedded devices that are embedded in in-vehicle equipment and industrial equipment. Under such circumstances, a method for performing a so-called OTA (Over The Air) update on a program in such an embedded device is demanded. Various program update technologies are proposed.

A technology disclosed, for example, in Japanese Unexamined Patent Application Publication No. 2010-218334 dynamically updates a program on an individual module basis without stopping the operation of the program running on an embedded device by pre-assigning a base address and a relative address to each module of an update program.

A method disclosed in Japanese Unexamined Patent Application Publication No. 2015-32314 is an OS (Operating System) replacement method. In a currently executed OS, this method is exercised to make preparations for loading a new OS and store information to be delivered to the new OS at its startup. Subsequently, restarting the currently executed OS loads the new OS and makes preparations for delivering the information to the new OS at its startup. Eventually, restarting the new OS achieves OS replacement.

A method disclosed in Masatomo Hashimoto, A Method of Safety Analysis for Runtime Code Update, In Proc. of ASIAN, LNCS 4435, pp. 60-74, 2007 identifies code eliminations and insertions to be made by an update, makes analyses to determine the influence of the code eliminations and insertions upon a program control flow and a data flow, identifies a program portion uninfluenced by changes, regards the identified program portion as a changeable program point, and performs a program update during an operation.

SUMMARY

However, when the technology disclosed in Japanese Unexamined Patent Application Publication No. 2010-218334 is to be used to dynamically update a program in an embedded device, it is necessary to trace program context information during program execution. This incurs significant execution overhead, and makes it difficult to apply the technology to a hard real-time system used, for example, for in-vehicle control or industrial control. The program context information is dynamically stored in a memory, such as a heap memory, as a collection of various items of information required for program execution, and includes information about program control dependency, program data dependency, and data access.

Other problems and novel features will become apparent from the following description and from the accompanying drawings.

According to an aspect of the present invention, there is provided a determination apparatus that focuses attention on difference codes and solves a program's dynamic updatability problem by boiling it down to a satisfiability problem.

The above aspect of the present invention reduces execution overhead and provides applicability to a hard real-time system used, for example, for in-vehicle control or industrial control.

BRIEF DESCRIPTION OF THE DRAWINGS

FIG. 8 is a diagram illustrating an example of Call Graph Diff;

DETAILED DESCRIPTION

Figure 1:
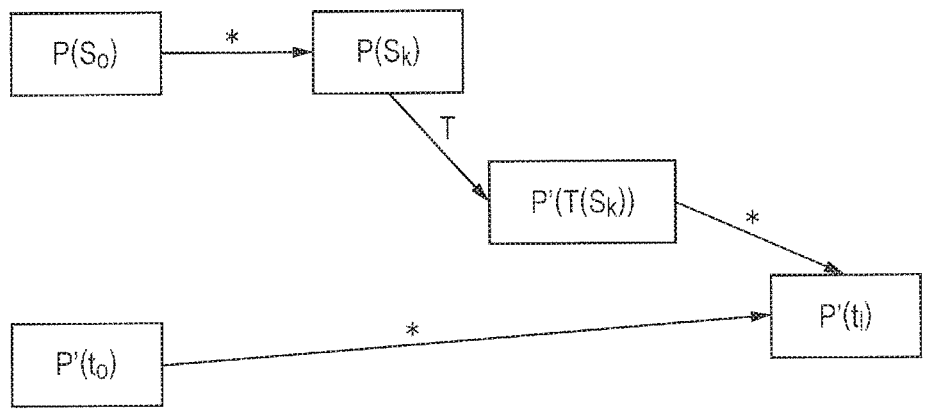
FIG. 1 is a diagram illustrating a dynamic updatability condition for a program.

In the following description and in the drawings, omissions and simplifications are made as needed for the clarification of explanation. Further, hardware for various elements depicted in the drawings as functional blocks for performing various processes can be implemented by a CPU, a memory, or other circuit while software for such elements can be implemented, for instance, by a program loaded into a memory. Therefore, it is to be understood by those skilled in the art that the functional blocks are not limited to hardware or software, but can be variously implemented by hardware only, by software only, or by a combination of hardware and software. Furthermore, like elements in the drawings are designated by the same reference numerals and will not be redundantly described.

Moreover, the above-mentioned program can be stored on various types of non-transitory computer readable media and supplied to a computer. The non-transitory computer readable media include various types of tangible storage media. The non-transitory computer readable media include a magnetic recording medium (e.g., flexible disk, magnetic tape, or hard disk drive), a magnetooptical recording medium (e.g., magnetooptical disk), a CD-ROM (Read Only Memory), a CD-R, a CD-R/W, and a semiconductor memory (e.g., mask ROM, PROM (Programmable ROM), EPROM (Erasable PROM), flash ROM, or RAM (Random Access Memory)). The program may be supplied to the computer by using various types of transitory computer readable media. The transitory computer readable media include an electrical signal, an optical signal, and an electromagnetic wave. The transitory computer readable media can supply the program to the computer through an electric wire, optical fiber, or other wired communication path or through a wireless communication path.

Problems to be solved by subsequently described embodiments will now be described in detail. FIG. 1 is a diagram illustrating a dynamic updatability condition for a program. Here, the dynamic updatability condition for a program is that a state reachable by executing an update program in an initial state is always reached by executing a finite number of steps after a program update is performed during program execution. Definitions in FIG. 1 are presented below.

P: An un-updated program.

P': An updated program.

$P(s0)$: An initial state of P.

$P(sk)$: A state reachable by executing a finite number of steps in the initial state of P.

$P'(t0)$: An initial state of P'.

$P'(t1)$: A state reachable by executing a finite number of steps in the initial state of P'.

T: A dynamic change from an un-updated program to an updated program.

FIG. 1 presents an example of execution in a situation where the above condition is met, that is, a dynamic program update is performed in $P(sk)$ and $P'(t1)$ is subsequently reached by executing a finite number of steps.

Further, the fact that whether the above condition is met cannot be determined is described in Deepak Gupta, Pankaj Jalote, and Gautam Barua, A Formal Framework for On-line Software Version Change, IEEE Tran on Software Engineering, Vol. 22, Issue 2, pp. 120-131, February 1996. Therefore, there is no alternative but to give sufficient conditions to make the determination achievable. Thus, there is a problem where very stringent restrictions are imposed as pointed out in Masatomo Hashimoto, A Method of Safety Analysis for Runtime Code Update, In Proc. of ASIAN, LNCS 4435, pp. 60-74, 2007. Furthermore, there is a problem where it is difficult to apply existing methods, such as a method described in Masatomo Hashimoto, A Method of Safety Analysis for Runtime Code Update, In Proc. of ASIAN, LNCS 4435, pp. 60-74, 2007, to a hard real-time system used, for example, for in-vehicle control or industrial control. The reason is that the existing methods make it necessary to trace program context information during program execution. This incurs significant execution overhead. As mentioned earlier, the program context information is dynamically stored in a memory, such as a heap memory, as a collection of various items of information required for program execution, and includes information about program control dependency, program data dependency, and data access.

Problems existing in Japanese Unexamined Patent Application Publication No. 2010-218334, in Japanese Unexamined Patent Application Publication No. 2015-32314, and in Masatomo Hashimoto, A Method of Safety Analysis for Runtime Code Update, In Proc. of ASIAN, LNCS 4435, pp. 60-74, 2007 will now be described.

First of all, it is assumed in Japanese Unexamined Patent Application Publication No. 2010-218334 that dynamic address resolution of an update program can be provided by calculating a real address from a base address and a relative address in an embedded device. Therefore, direct application cannot be achieved if the embedded device is not capable of providing the dynamic address resolution. Further, an embodiment described in Japanese Unexamined Patent Application Publication No. 2010-218334 assumes that Linux (registered trademark) or other high-performance OS (Operating System) having a dynamic address conversion mechanism is incorporated. Therefore, the technology according to Japanese Unexamined Patent Application Publication No. 2010-218334 cannot be applied to a case where only an embedded OS having no such mechanism is incorporated or no OS is incorporated. Additionally, no further memory reduction cannot be achieved because it is assumed that a dynamic update is to be performed in a terminal device on an individual module basis.

Japanese Unexamined Patent Application Publication No. 2015-32314 does not provide a dynamic program updater. According to Japanese Unexamined Patent Application Publication No. 2015-32314, a currently executed OS always needs to be restarted when an update program is to be loaded. Further, a new OS is successively restarted to perform an update. Additionally, the Japanese Unexamined Patent Application Publication No. 2015-32314 assumes that the entire OS is to be updated. Therefore, memory reduction cannot be achieved by performing an update with a difference code only.

A technology disclosed in Masatomo Hashimoto, A Method of Safety Analysis for Runtime Code Update, In Proc. of ASIAN, LNCS 4435, pp. 60-74, 2007 is related to the derivation of a program point that permits dynamic switching between an uncorrected program and a corrected program. Thus, the Masatomo Hashimoto, A Method of Safety Analysis for Runtime Code Update, In Proc. of ASIAN, LNCS 4435, pp. 60-74, 2007 does not directly describe a dynamic program update technology based on the use of a difference update code. Further, according to Masatomo Hashimoto, A Method of Safety Analysis for Runtime Code Update, In Proc. of ASIAN, LNCS 4435, pp. 60-74, 2007, the derivation of a program point is not for a description, but is a method based on syntax. Therefore, if code optimization is performed, for example, by moving a code without changing the meaning of an un-updated program by using an updated program, an appropriate program point cannot be derived. Additionally, Masatomo Hashimoto, A Method of Safety Analysis for Runtime Code Update, In Proc. of ASIAN, LNCS 4435, pp. 60-74, 2007 assumes that a heap built during program execution is traced to determine whether the program point permits dynamic switching. This incurs significant execution overhead.

Moreover, Japanese Unexamined Patent Application Publication No. 2010-218334, Japanese Unexamined Patent Application Publication No. 2015-32314, and Masatomo Hashimoto, A Method of Safety Analysis for Runtime Code Update, In Proc. of ASIAN, LNCS 4435, pp. 60-74, 2007 do not provide a means of rolling back to an un-updated program upon detection of an update abnormality or in compliance with an instruction from the outside.

(Solutions)

A solution provided by the embodiments of the present invention includes a method and apparatus that not only verify sufficient conditions for determining whether a program update can be performed with a difference binary without restarting a system, but also verify, when a difference program is to be generated in a development environment from an un-updated program and an updated program, whether the difference binary meets the sufficient conditions.

The solution also includes a dynamic program update method that is executed in an embedded device by using the difference program.

Here, it is assumed that the embedded device includes a hardware mechanism having at least a processor capable of dynamically updating a program counter and one or more program memories and data memories independently accessible for read and write operations. It is also assumed that an un-updated program is already allocated. It is further assumed that if the sufficient conditions are not met, a program update is performed by restarting the system.

The solution provided by the embodiments of the present invention can be described as follows. A determination apparatus according to the embodiments of the present invention includes a difference code generation section, a logical expression derivation section, and a determination section. The difference code generation section generates a first difference code and a second difference code. The first difference code represents a set of code pieces in a first program that are different from code pieces in a second program. The second difference code represents a set of code pieces in the second program that are different from code pieces in the first program. The logical expression derivation section performs predetermined conversion to derive a first logical expression from the first difference code and derive a second logical expression from the second difference code. The determination section determines, depending on whether the second logical expression includes the first logical expression, whether the first program in a predetermined embedded device is dynamically updatable to the second program.

Further, the logical expression derivation section performs the predetermined conversion to derive a first SMT (Satisfiability Modulo Theories) expression from the first difference code as the first logical expression and derive a second SMT expression from the second difference code as the second logical expression.

Furthermore, when the first difference code and the second difference code include a loop description, the logical expression derivation section performs the predetermined conversion to build a first EFSM (Extended Finite State Machine) from the first difference code, build a second EFSM from the second difference code, derive the first SMT expression from the first EFSM as the first logical expression, and derive the second SMT expression from the second EFSM as the second logical expression.

Moreover, the logical expression derivation section performs a depth-first search, obtains a logical product of a transition condition and an executable statement that are added for each state transition traced during the depth-first search, couples branch paths with a logical sum, and obtains a logical product of all acquired expressions in order to derive the first SMT expression from the first EFSM and derive the second SMT expression from the second EFSM.

By using the first logical expression and the second logical expression, the determination section makes a simulation relation determination to determine whether the second logical expression includes the first logical expression, and makes a bisimulation equivalence determination to determine whether the first logical expression and the second logical expression are equivalent to each other.

The logical expression derivation section also performs the predetermined conversion by simplifying the first difference code and the second difference code.

Further, for the above-mentioned simplification, the logical expression derivation section performs the predetermined conversion by subjecting the first difference code and the second difference code to eager code motion, dead code elimination, and redundancy elimination in sequence.

The difference code generation section also generates object codes as the first difference code and the second difference code by performing address resolution for a code indicative of a difference between the first program and the second program.

Further, the difference code generation section generates the first difference code and the second difference code by determining the difference between the first program and the second program in such a manner as to maintain a function call structure.

Furthermore, the difference code generation section inputs task division information defining a program function group included in each task, uses the task division information to identify whether each task in the first program returns a return value indicative of the result of computation of a constant group to be updated or generates an inter-task data output, identifies whether each task in the second program receives the return value or the inter-task data output, and outputs information indicative of the result of identification.

A determination method according to the embodiments of the present invention includes the steps of: generating a first difference code and a second difference code, the first difference code representing a set of code pieces in a first program that are different from code pieces in a second program, the second difference code representing a set of code pieces in the second program that are different from code pieces in the first program; performing predetermined conversion to derive a first logical expression from the first difference code and derive a second logical expression from the second difference code; and determining, depending on whether the second logical expression includes the first logical expression, whether the first program in a predetermined embedded device is dynamically updatable to the second program.

(Advantageous Effects)

(1) Even when an embedded device does not have a dynamic address resolution function, a difference code can be used to determine whether a dynamic program update is achievable. If it is determined that a dynamic program update is achievable, the dynamic program update can be performed.

(2) As regards program context information dynamically stored as a collection of various items of information required for program execution, a program update can be performed without using a function for tracing during program execution except for information indicative of the presence of an output result used for data delivery between tasks. Therefore, execution overhead can be remarkably reduced as compared to a conventional method.

(3) As compared to an update performed on an individual module basis, further memory reduction can be achieved by using a difference code only.

(4) Information can be written into and deleted from a flash memory in smaller units. This ensures that the flash memory has a longer life than when an update is performed on an individual module.

(5) It is possible to determine whether a dynamic rollback to an un-updated program is achievable upon detection of an update abnormality or in compliance with an instruction from the outside. If it is determined that the dynamic rollback is achievable, the dynamic rollback can be performed.

First Embodiment

First of all, preconditions for a first embodiment of the present invention will be described. The first embodiment is for a program that is required to have at least a certain level of quality. More specifically, the present embodiment is intended, for example, for a program description compliant with the MISRA C or other similar standard equivalent to ISO 26262 ASIL-A or IEC 61508 SIL1. The program description applicable to the present embodiment is not specifically limited to a particular language, but is assumed to be without unreachable variables and unused variables and in compliance with the following conditions concerning static code analysis. When the following conditions are met, the unreachable variables and unused variables can be automatically eliminated from the program. Therefore, it is necessary that the program applicable to the present embodiment meet only the following conditions:

(1) A call graph indicative of inter-function dependency is buildable.

(2) A data flow graph is buildable.

(3) A control flow graph is buildable.

(4) A recursive description is convertible to a repeated description.

(5) Structured and without a jump description at a source code level.

The following assumes that all recursive descriptions are converted to repeated descriptions, and that no global variables are used.

It is also assumed that the following operations are always performed when a processor in charge of program execution dynamically allocates a difference program and an update program in a program memory in order to perform a dynamic program update:

(1) Saving a processor register value before dynamic allocation and restoring the processor register value immediately before switching.

(2) Managing the memory area to be used for storing the difference program and the update program in the program memory in such a manner as to prevent dynamic allocation from affecting a program execution by performing the same saving and restoring procedures as indicated in (1) above or using an area other than a program execution area.

A system described here is intended for use as a real-time system and particularly as a hard real-time system. It is especially assumed that the system includes at least a task dispatcher as a service running on a processor. Further, it is assumed that an embedded device for which a dynamic program update is performed includes a program allocation mechanism and a program update mechanism as described in Joel Koshy and Raju Pandey, Remote Incremental Linking for Energy-Efficient Reprogramming of Sensor Networks, In Proc. of the 2nd European Workshop on Wireless Sensor Networks, pp. 354-365, 2005 and in Meik Felser, Rudiger Kapitza, Jurgen Kleinoder, and Wolfgang Schroder-Preikschat, Dynamic Software Update of Resource-Constrained Distributed Embedded Systems, Embedded System Design, Topics, Techniques and Trends, Volume 231 of the series IFIP, the International Federation for Information Processing pp. 387-400, 2007. A dynamic program change procedure is, for example, to let the task dispatcher confirm the status of task execution in order to determine whether later-described switching timing conditions are met, poll a register value or other flag value indicative of whether an update is available, and perform a dynamic program update if the update is available. Here, determination, polling, and switching processes may be performed by an interrupt handler that is activated by an interrupt from the task dispatcher.

A configuration of the present embodiment will now be described.

Figure 2:
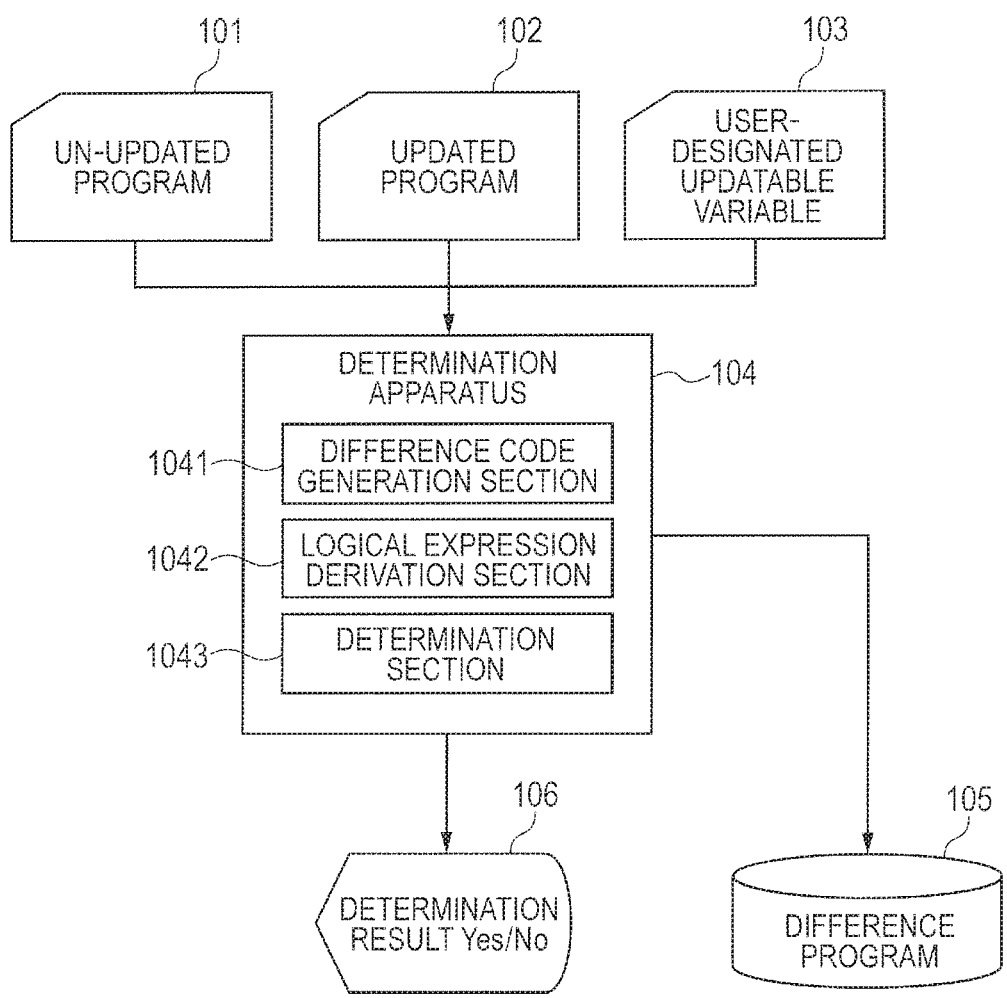
FIG. 2 is a block diagram illustrating a system configuration according to a first embodiment of the present invention.
Figure 3:
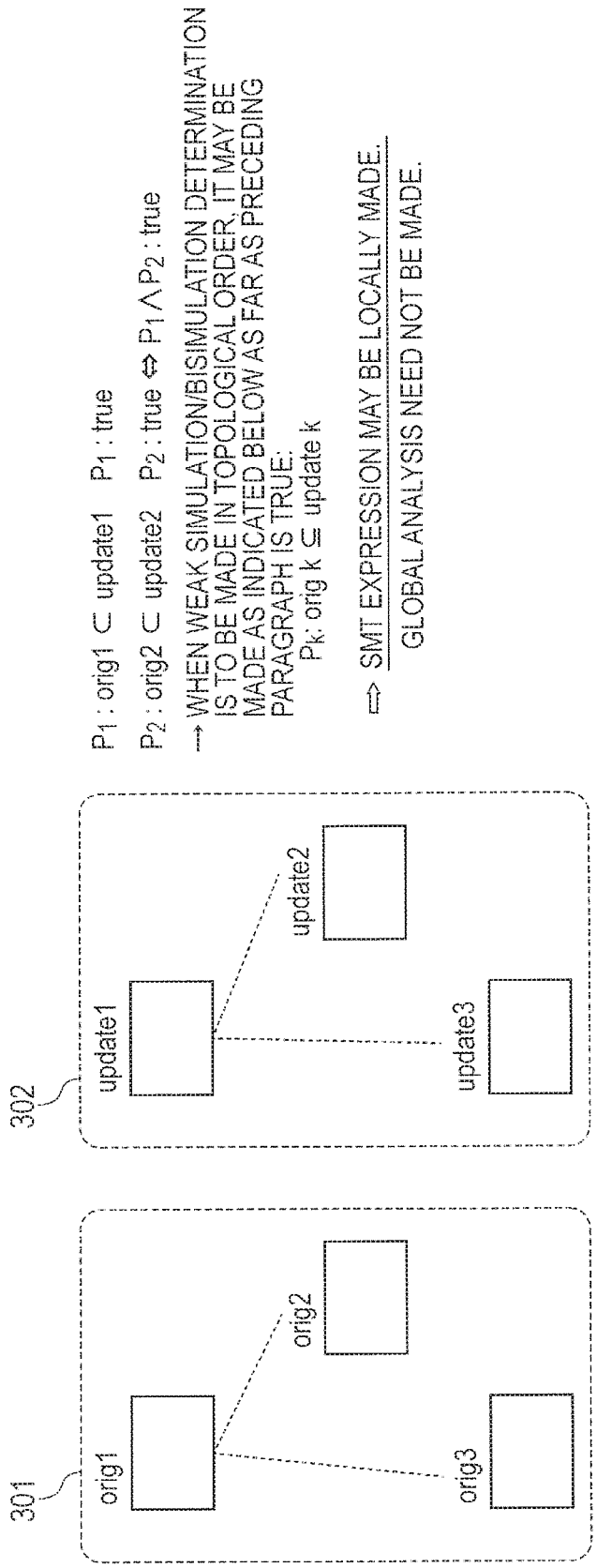
FIG. 3 is a diagram illustrating important properties according to the first embodiment.

The present embodiment provides a means and system for receiving an un-updated program, an updated program, and user-designated updatable variable information, making a sufficient condition determination to determine whether a dynamic update is achievable, and returning a determination result. The means or the system may generate a difference program. FIG. 2 illustrates a system configuration according to the present embodiment. The system configuration includes a means for performing a dynamic program update in an embedded device only when all tasks on the processor have completed their execution and become idle.

Sufficient conditions for determining whether a dynamic update can be performed are as follows.

Condition 1: P' includes the entirety of a valid program execution trace in P as a valid program execution trace.

Condition 2: If a variable of a register including an I/O other than a processor register is included in $\{V2-\text{dep}(V2, V1)\} \cup \Lambda$, the value of such a variable is permitted to be set up during a rogram update.

Meanings of symbols used are as follows.
P: Un-updated program.
P': Updated program.
Var(P): A set of all variables used in P.
Var(P'): A set of all variables used in P'.
$V1=\text{Var}(P) \cap \text{Var}(P')$: A set of all common variables of P and P'.
$V2=\text{Var}(P')-V1$: A set of all variables used in P' except all common variables of P and P'.
dep(V2, V1): A set of variables included in V2 that are defined in P' by using variables included in V1 and referenced by the definitions of variables included in V1.
$\Lambda=\{\text{user-designated updatable variables}\} \cup \{\text{fixed constant variables}\}$: A set of variables including user-designated updatable variables and fixed constant variables.

The user-designated updatable variables form information indicative of user-designated variables changeable by a dynamic program update.

The fixed constant variables are constant variables that are declared in a function on the presumption that no global variable exists and are not subject to change by program execution. For example, a fixed filter constant coefficient is one of the fixed constant variables.

Condition 1 indicates that an operation of P' can be partly simulated by P. Condition 2 indicates that the updatable variables are limited to variables newly introduced by P' only and user-designated updatable variables. A dynamic program update in an embedded device is performed when all tasks on the processor become idle, that is, at a timing when a variable update does not affect the program update. Thus, as is obvious from the discussion in Masatomo Hashimoto, A Method of Safety Analysis for Runtime Code Update, In Proc. of ASIAN, LNCS 4435, pp. 60-74, 2007, the dynamic updatability condition "a state reachable by executing an update program in an initial state is always reached by executing a finite number of steps after a program update is performed during program execution" is met.

Further, the dynamic updatability condition indicates that program context need not be traced, and that execution overhead is remarkably reduced as compared to a conventional method that needs tracing.

Condition 2 for an un-updated program and an updated program can be confirmed and implemented by making general data flow analysis because unused variables and unreachable codes are eliminated in advance from the programs so that no such variables and codes exist in the programs.

Confirmation and implementation of condition 1 for an un-updated program and an updated program are not directly described in Masatomo Hashimoto, A Method of Safety Analysis for Runtime Code Update, In Proc. of ASIAN, LNCS 4435, pp. 60-74, 2007. Particularly, even if a method is proposed based on a program point derivation method capable of dynamically switching between an un-modified program and a modified program, the program point derivation is not for a description, but is a method based on syntax. Therefore, if code optimization is performed, for example, by moving a code without changing the meaning of an un-updated program by using an updated program, an appropriate program point cannot be derived. That is to say, the confirmation and implementation of condition 1 is not self-evident. The means of confirmation will be revealed in the present embodiment.

(1. System Configuration)

FIG. 2 illustrates a system configuration according to the first embodiment. A determination apparatus 104 inputs an un-updated program 101, an updated program 102, and a user-designated updatable variable 103, performs a sufficiency determination process to check for dynamic updatability, and outputs a determination result 106 and a difference program 105. Here, the user-designated updatable variable 103 is information indicative of user-designated variables that can be changed by a dynamic program update. The user-designated updatable variable 103 is, for example, a preset peripheral I/O register. When a dynamic update of the value of the peripheral I/O register does not affect an overall program operation, a user designates a variable corresponding to the peripheral I/O register as the user-designated updatable variable 103. The un-updated program 101 is an example of a first program, and the updated program 102 is an example of a second program.

The determination apparatus 104 includes a difference code generation section 1041, a logical expression derivation section 1042, and a determination section 1043. The difference code generation section 1041 generates a first difference code. The first difference code represents a set of code pieces in the un-updated program 101 that are different from code pieces in the updated program 102. The difference code generation section 1041 also generates a second difference code. The second difference code represents a set of code pieces in the updated program 102 that are different from code pieces in the un-updated program. The logical expression derivation section 1042 performs predetermined conversion to derive a first logical expression from the first difference code. The logical expression derivation section 1042 also performs predetermined conversion to derive a second logical expression from the second difference code. The determination section 1043 determines, depending on whether the second logical expression includes the first logical expression, whether the un-updated program 101 can be dynamically updated in the above-mentioned embedded device to obtain the updated program 102, and outputs the determination result 106 and the difference program 105. The difference program 105 includes at least the second difference code and may include the first difference code.

When all tasks on the processor become idle, the dynamic program update in the embedded device according to the present embodiment is performed by using a program switching mechanism included in the embedded device. The dynamic program update is performed, for example, by performing dynamic program allocation during program execution, allowing the task dispatcher running on the processor to confirm that all the tasks are idle, polling the value of a register storing an update request, and checking for an update request. When the update request is verified, an address converter is enabled for controlling the un-updated program to execute only a difference code corresponding to an update portion.

(2. Overview of Condition 1 Determination Procedure)

An assumption imposed on a program description enables calculations to be performed to determine whether condition 1 is met by both the un-updated program and the updated program. However, it seems generally difficult to complete processing in a practical period of time. Thus, attention is focused on the following two important properties:

Property 1: The two programs differ only in the difference code portion.

Property 2: As regards the order of execution, the programs have a natural partial ordering.

It is obvious from property 2 that a determination process execution order for determining whether condition 1 is met by a portion changed by an update can be defined by performing a topological sort as indicated in an un-updated graph structure 301 of different portions and an updated graph structure 302 of the different portions. Thus, the following symbols can be defined without contradiction:

orig i: i-th different portion of the un-updated program that is made different by an update.

update i: i-th different portion of the updated program that is made different by the update.

$$\text{orig } i \subset \text{update } i \quad (1)$$

Condition 1 is met by orig i and update i.

Further, it is obvious from property 2 that when, for example, Equation (1) is satisfied, condition 1 is met by the whole program path from the beginning of the un-updated program to a point immediately before orig 2 and by the whole program path from the beginning of the updated program to a point immediately before update 2. It is assumed that Equation (2) below holds for up to the k-th (k is arbitrarily selected).

$$\text{orig } k \subset \text{update } k \quad (2)$$

In the above instance, properties 1 and 2 indicate that condition 1 is met by the whole program path from the beginning of the un-updated program to a point immediately before orig k+1 and by the whole program path from the beginning of the updated program to a point immediately before update k+1. Here, k is arbitrary. Therefore, when condition 1 is met by all different portions, condition 1 is met by the un-updated program and the updated program. Thus, an indication should be given that Equation (2) holds for each k. Now, a building method for orig k and update k and a determination method for Equation (2) remain to be clarified.

Figure 4:
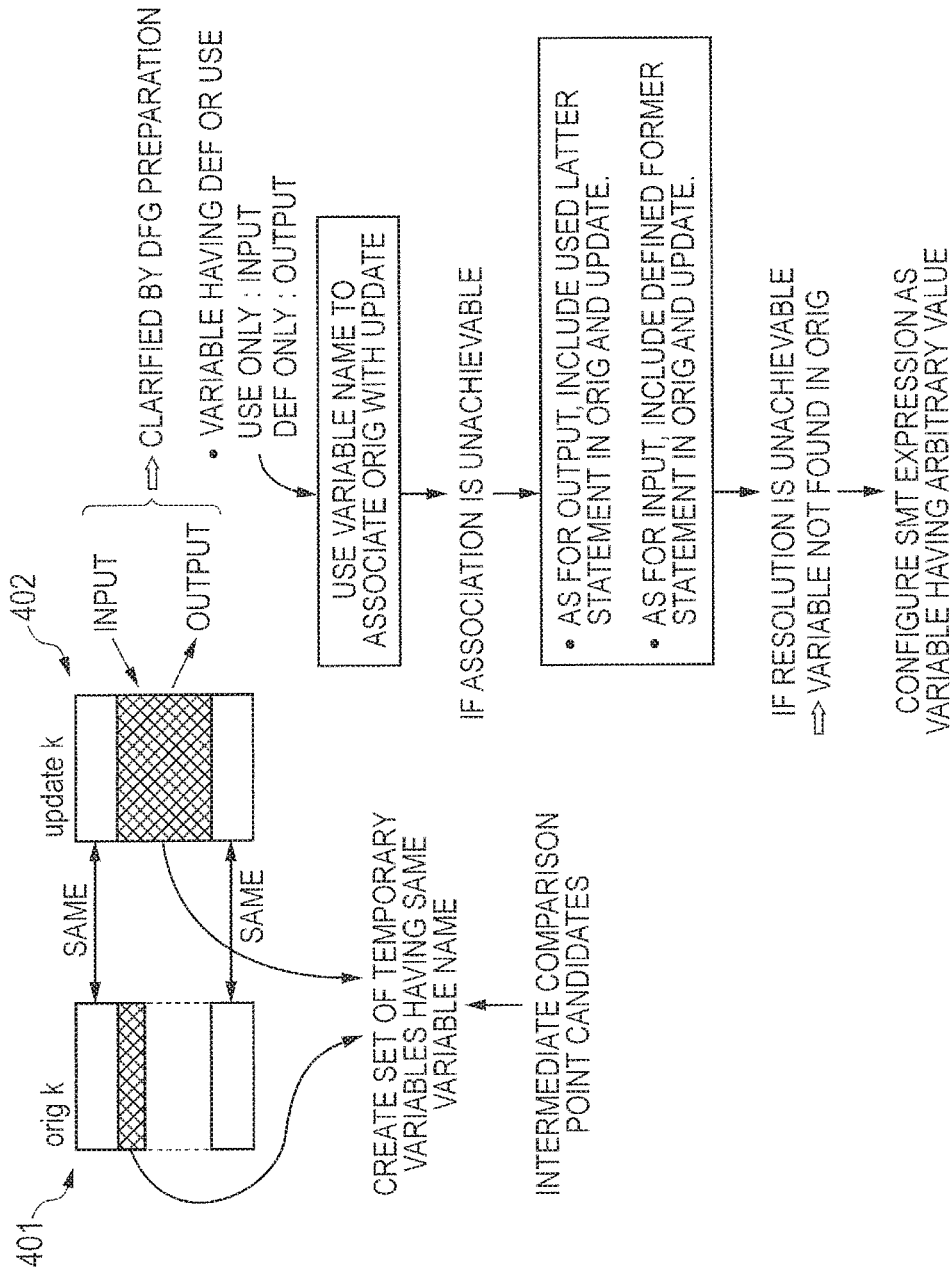
FIG. 4 is a diagram illustrating an inclusion determination procedure according to the first embodiment.

FIG. 4 illustrates a building method for update k. First of all, if P and P' differ in a fixed constant variable value, the value of P' is corrected to the value of P.

Var(orig k): A set of all variables included in orig k.

Var(update k): A set of all variables included in update k.

The above sets are determined, and then each variable is subjected to def-use analysis in both the un-updated program and the updated program.

InVar(orig k): A variable that is defined by P-orig k and then used by orig k.

OutVar(orig k): A variable that is defined by orig k and then used by P-orig k.

InVar(update k): A variable that is defined by P'-update k and then used by update k.

OutVar(update k): A variable that is defined by update k and then used by P'-update k.

The above variables are determined.

P-orig k: A program obtained by eliminating orig k from the un-updated program.

P'-update k: A program obtained by eliminating update k from the updated program.

The def-use analysis is disclosed in Alfred V. Aho, Ravi Sethi, Jeffrey D. Ullman Monica S. Lam, Compilers: Principles, Techniques, and Tools, Prentice Hall.

Next, differently named variables are determined as a set of variables included in V3, which is referenced by the following definitions:

$$\Delta\text{orig } k = \text{Var(orig } k) - \text{Var(update } k) - (\text{Var}(P) - (\Lambda \cup V1) - \text{dep}(V3, V1))$$

$$\Delta\text{update } k = \text{Var(update } k) - \text{Var(orig } k) - (\text{Var}(P') - (\Lambda \cup V1) - \text{dep}(V2, V1))$$

V3=Var(P)−V1: A set of variables obtained by eliminating all common variables of P and P' from a set of all variables used in P.

dep(V3, V1): A set of variables that are defined in P by using variables included in V1, referenced by the definitions of variables included in V1, and included in V3.

Next, the following sets are determined:

LastDefStmt(Δorig k): A set of assignment statements to be assigned to variables that are defined by P-orig k with respect to each variable of Δorig k and used by orig k, and this set of assignment statements is assigned in the last instance before P-org k reaches orig k.

FirstUseStmt(Δorig k): A set of statements for referencing variables that are defined by orig k with respect to each variable of Δorig k and used by P-orig k, and this set of statements is the first set of statements after orig k in P-orig k.

LastDefStmt(Δupdate k): A set of assignment statements to be assigned to variables that are defined by P-update k with respect to each variable of Δorig k and used by update k, and this set of assignment statements is assigned in the last instance before P-org k reaches update k.

FirstUseStmt(Δupdate k): A set of statements for referencing variables that are defined by update k with respect to each variable of Δorig k and used by P-update k, and this set of statements is the first set of statements after update k in P-update k.

Next, the following processes are performed:

1) If LastDefStmt(Δorig k)≠ϕ, a basic block set including statements included in LastDefStmt(Δorig k) is determined, and a hyperblock set including the basic block set is determined. A new orig k is obtained by adding the hyperblock set and a program path from the hyperblock set to orig k to orig k. Here, codes not reaching the previous orig k may be eliminated from codes added to the new orig k.

2) FirstUseStmt(Δorig k)≠ϕ, a basic block set including statements included in FirstDefStmt(Δorig k) is determined, and a hyperblock set including the basic block set is determined. A new orig k is obtained by adding the hyperblock set and a program path from orig k to the hyperblock set to orig k. Here, codes not reaching the determined hyperblock set and codes in the hyperblock set having no data dependency on variables in orig k may be eliminated from codes added to the new orig k.

3) If LastDefStmt(Δupdate k)≠ϕ, a basic block set including statements included in LastDefStmt(Δupdate k) is determined, and a hyperblock set including the basic block set is determined. A new update k is obtained by adding the hyperblock set and a program path from the hyperblock set to update k to update k. Here, codes not reaching the previous update k may be eliminated from codes added to the new update k.

4) If FirstUseStmt(Δupdate k)≠ϕ, a basic block set including statements included in FirstUseStmt(Δupdate k) is determined, and a hyperblock set including the basic block set is determined. A new update k is obtained by adding the hyperblock set and a program path from update k to the hyperblock set to update k. Here, codes not reaching the determined hyperblock set and codes in the hyperblock set having no data dependency on variables in orig k may be eliminated from codes added to the new orig k.

If orig k=ϕ, statements in P that correspond to LastDefStmt(Δupdate k) and FirstUseStmt(Δupdate k) built in P' are identified, and a hyperblock obtained by performing processes 3) and 4) above on P is regarded as orig k.

Basic blocks and hyperblocks are disclosed in Scott A. Mahlke, David C. Lin, William Y. Chen, Richard E. Hank, and Roger A. Bringmann, Effective compiler support for predicated execution using the hyperblock, ACM SIGMICRO Newsletter, Vol. 23, Issues 1-2, pp. 45-54, December 1992.

Subsequently, all definition statements and reference statements for user-designated updatable variables are eliminated from both the obtained orig k and update k.

Eventually, if update k includes variables corresponding to the original of {V2−dep(V2, V1)}∪Λ, such a set of variables is identified as ∪V(update k). The variables included in ∪V(update k) are interpreted as variables having arbitrary values in accordance with a determination made by Equation (2).

Meanwhile, if orig k includes variables corresponding to the original of V2−dep(V3, V1), such variables do not exist in update k, but exist only in orig k. As it is assumed that unused variables and unreachable variables exist in neither P nor P', update k is such that statements, for example, for assigning or referencing such variables are eliminated from orig k. Thus, it is determined that Equation (2) does not hold, and that condition 1 is not met.

The determination by Equation (2) for each k does not include a non-deterministic branch. If no non-deterministic branch is included, trace relation/equivalence agrees with simulation relation/bisimulation equivalence. Therefore, the determination is made by solving a simulation determination problem. Particularly, if the agreement can be verified by making a bisimulation determination, it indicates that orig k=update k, that is, orig k and update k are difference codes having the same meaning although they differ in syntax. It can be interpreted that only an operation execution cycle count is corrected.

Simulation and bisimulation are disclosed in Robin Milner, Communication and Concurrency (Prentice Hall International Series in Computer Science), Prentice Hall.

(3. Overall Flow of Sufficient Condition Determination of Dynamic Updatability)

Figure 5:
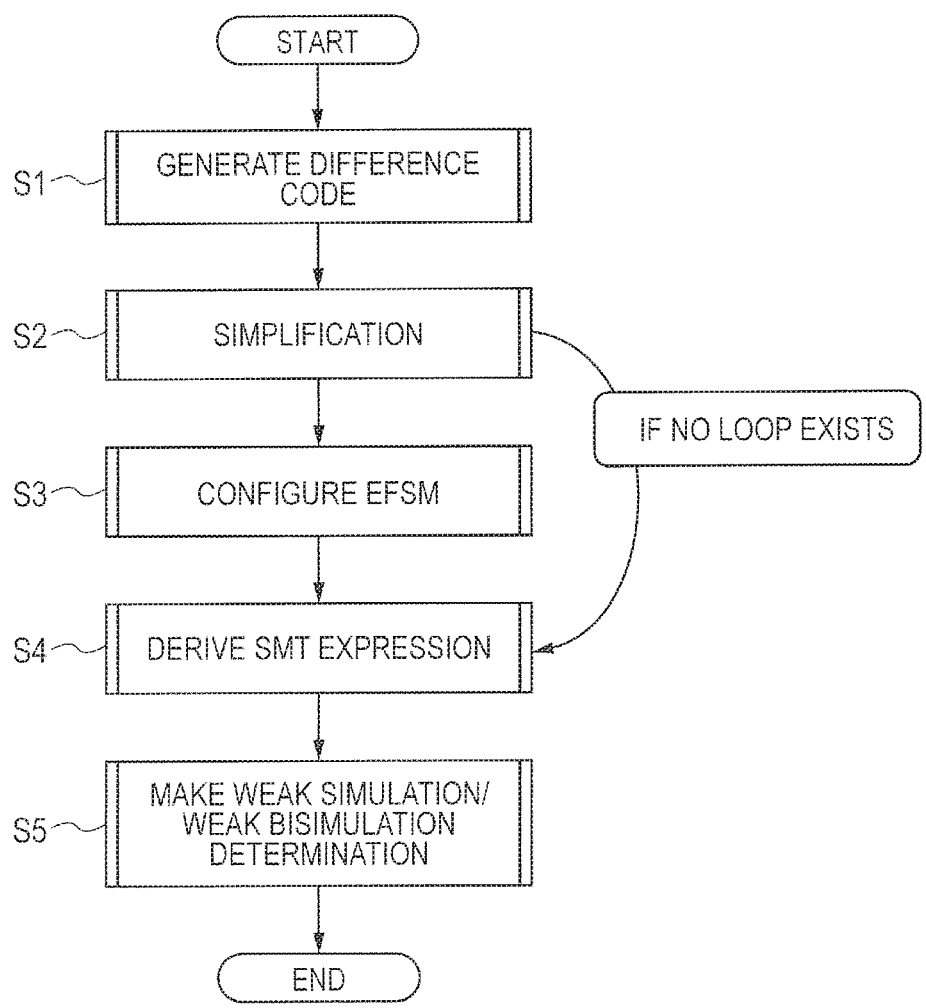
FIG. 5 is a flowchart illustrating the overall flow of sufficient condition determination of dynamic updatability.

FIG. 5 illustrates an exemplary overall flow of a sufficient condition determination process for dynamic updatability evaluation.

Figure 6:
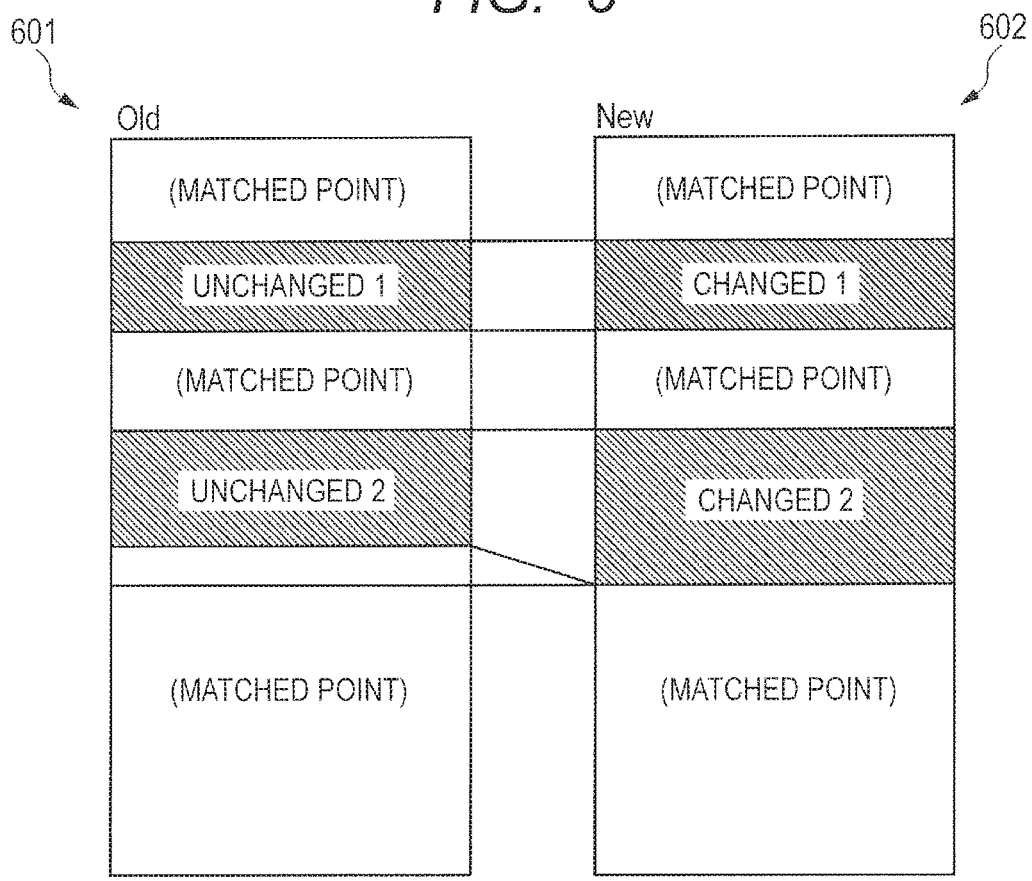
FIG. 6 is a diagram illustrating the concept of a vimdiff format.

(1) In step S1, the difference code generation section 1041 determines whether V2−dep(V3, V1)=ϕ. If the equation does not hold, it is determined that condition 1 is not met, and the determination process terminates. If, by contrast, the equation holds, the difference code generation section 1041 checks the correspondence between different portions of an un-updated program and an updated program and prepares {(orig k, update k)|0≤k≤N}. N is a total number of different points. It is assumed as indicated in FIG. 6 that the correspondence between the different portions can be obtained in the same manner as an output generated by the UNIX (registered trademark) command vimdiff. In FIG. 6, an un-updated program 601 and an updated program 602 are given, and the correspondence between identical portions and changed portions is indicated. For example, if left-side variables are the same, but right-side variables are different, or if a condition determination expression in a branch statement is partly changed, the correspondence between an unchanged portion 1 and a changed portion 1 is obtained. Further, if, for example, a statement is added, the correspondence between an unchanged portion 2 and a changed portion 2 is obtained. Although not shown, even when a statement is eliminated, the correspondence between an unchanged portion and a changed portion is obtained.

(2) In step S2, the logical expression derivation section 1042 simplifies the codes of orig k and update k with respect to each k. If no loop description of a code is included, processing skips step S3 and then proceeds to step S4.

(3) In step S3, the logical expression derivation section 1042 builds an EFSM (Extended Finite State Machine) from the simplified codes of orig k and update k with respect to each k.

(4) In step S4, if the codes include a loop description, the logical expression derivation section 1042 converts the EFSM built from each of orig k and update k to an SMT (Satisfiability Module Theories) expression with respect to each k. If no loop description is included, the logical expression derivation section 1042 directly converts the codes simplified in step S2 to the SMT expression. Steps S2, S3, and S4 form an example of predetermined conversion.

(5) In step S5, the determination section 1043 makes a simulation determination by using the SMT expression derived from each of orig k and update k with respect to each k.

(4. Difference Code Generation Process in View of Function Hierarchy)

Figure 7:
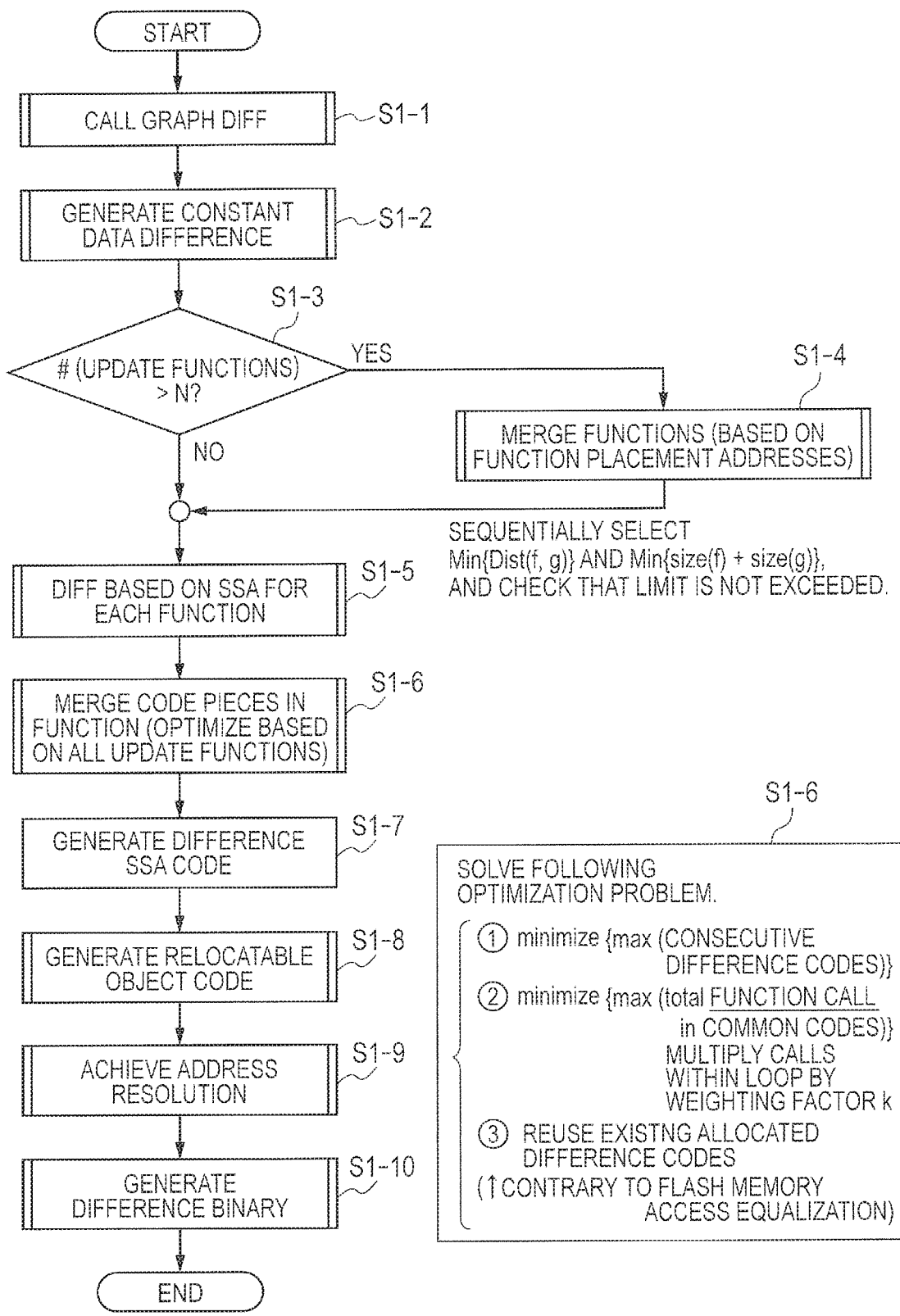
FIG. 7 is a flowchart illustrating the flow of difference code generation.

FIG. 7 illustrates an exemplary flow of a difference code generation process performed in view of function hierarchy.

(1) In step S1-1, the difference code generation section 1041 uses call graphs to acquire difference information, which is the information about differences caused by an update. The call graphs depict a function call relationship in the form of a graph.

(2) In step S1-2, the difference code generation section 1041 generates differences in fixed constant variable data.

(3) In general, an update causes differences in a plurality of functions. Therefore, if an upper limit N is imposed on the number of such functions, the difference code generation section 1041 determines in step S1-3 whether the number of functions involving the differences exceeds N. If the number of functions involving the differences exceeds N, while considering the location addresses of the affected functions, the difference code generation section 1041 merges the functions in step S1-4 so that the number of affected functions is equal to or smaller than N. For example, the functions are coupled so that their addresses are consecutive. If, by contrast, the number of functions involving the differences does not exceed N, processing proceeds to step S1-5. If the upper limit N is not imposed, processing skips steps S1-3 and S1-4 and then proceeds to step S1-5.

(4) In step S1-5, the difference code generation section 1041 extracts the correspondence {orig k, update k} between the difference codes in an SSA (Single Static Assignment) form of each of the functions whose changes caused by the update are determined.

(5) In general, a plurality of code chunks (hereinafter referred to as difference code pieces), which are changed by an update, may exist. Therefore, if an upper limit N is imposed on the number of difference code pieces, the difference code generation section 1041 merges the difference code pieces in the functions in step S1-6. An optimization problem to be solved in S1-6 is shown in the lower right of FIG. 7. However, step S1-6 will be described in detail later. If the upper limit N is not imposed, processing skips step S1-6 and then proceeds to step S1-7.

(6) In step S1-7, the difference code generation section 1041 generates a difference object code by using a difference SSA form.

(7) In step S1-8, the difference code generation section 1041 generates a relocatable object code for correcting to the difference object code in the embedded device. This step is skipped if the program update mechanism incorporated in the embedded device is not to be used.

Figure 29:
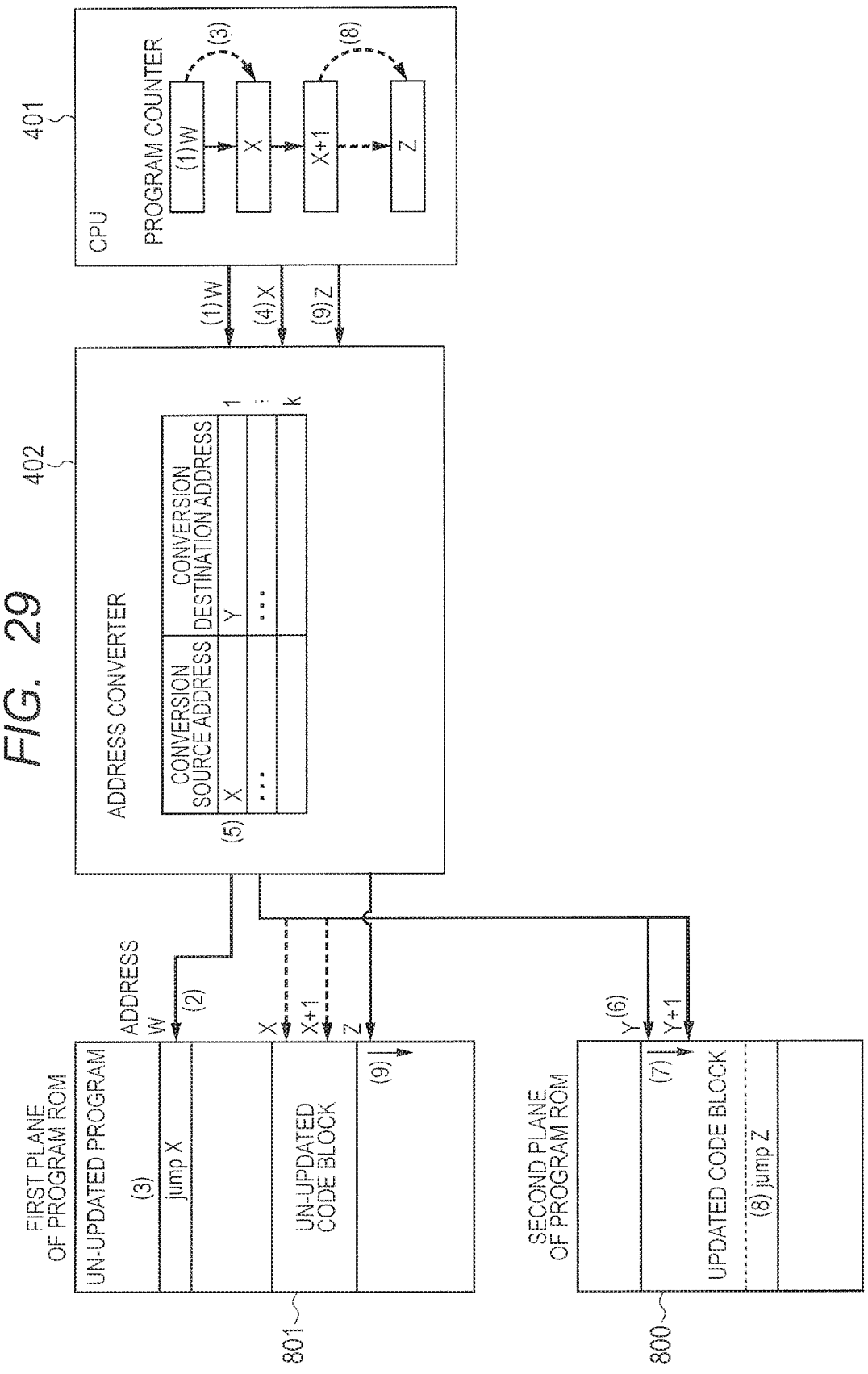
FIG. 29 is a schematic diagram illustrating an exemplary program execution procedure performed after an update.

A procedure for executing a program updated in the program update mechanism incorporated in the embedded device will now be described. FIG. 29 is a schematic diagram illustrating an exemplary program execution procedure performed after an update. For purposes of explanation, it is assumed that un-updated program object codes are allocated on a first plane of a program ROM 407, and that some of updated difference program object codes are allocated on a second plane of the program ROM 407. It is also assumed that a code block 800 allocated on the second plane corresponds to a code block 801, which includes some of the un-updated program object codes. Before a CPU 401 initiates program execution, an address converter 402 performs address conversion so that the code block 801 is replaced by the code block 800. The above-described method is used to make the updated program executable. An example of updated program execution is described below with reference to FIG. 29.

First of all, the value of a program counter in the CPU 401 is W (see (1) in the figure). In this instance, W does not exist at a conversion source address in an address conversion table. Therefore, the address converter 402 outputs W (see (2) in the figure). Next, the CPU 401 executes the instruction Jump X at address W and rewrites the value of the program counter to X (see (3) in the figure). Next, the CPU attempts to read an instruction at address X (see (4) in the figure). However, X matches with the conversion source address (see (5) in the figure). Therefore, the address converter 402 outputs address Y (see (6) in the figure). Thus, the CPU 401 reads an instruction at address Y and executes the instruction (see (7) in the figure). Subsequently, the value of the program counter is changed to X+1, and the address converter 402 changes X+1 to Y+1 so that an instruction at address Y+1 is executed. After an update, the instruction Jump Z is allocated at the end of the code block 800. The CPU 401 executes this instruction (see (8) in the figure). Subsequently, the CPU 401 continues with execution at address Z of the un-updated program (see (9) in the figure).

Figure 30:
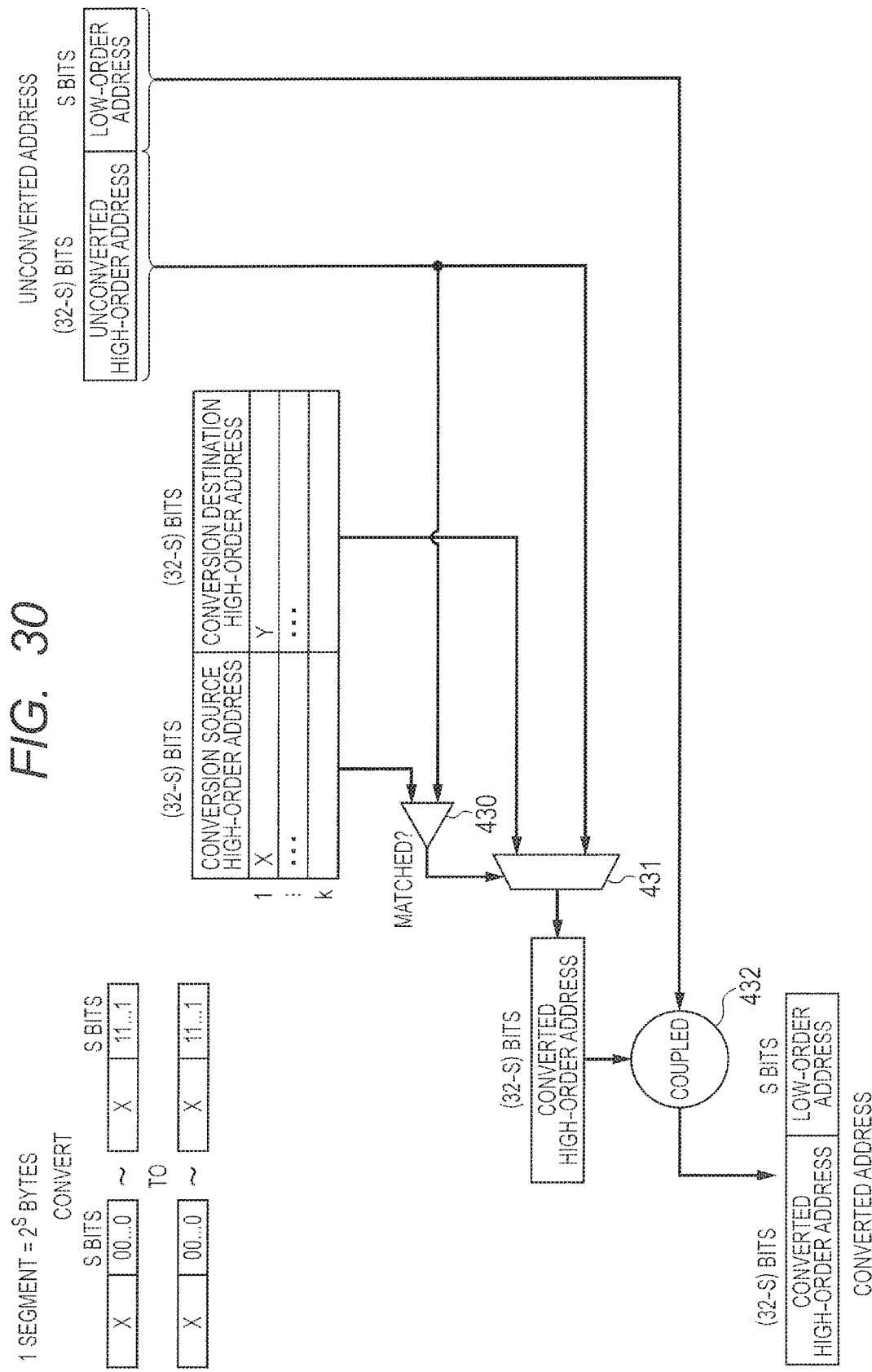
FIG. 30 is a schematic diagram illustrating the details of address conversion by an address converter.

Address conversion by the address converter 402 will now be described in detail. More specifically, the address converter 402 changes the high-order bit string of an address that is acquired by allowing the CPU 401 to decode an instruction and has a predetermined number of bits (hereinafter referred to as the high-order address), and couples the changed high-order bit string to the low-order bit string of the address to achieve address conversion. That is to say, the address converter 402 determines whether the inputted high-order address matches with a conversion source address registered in the address conversion table. If these addresses match each other, the address converter 402 replaces the high-order address with a conversion destination address, couples a low-order address to the converted high-order address, and outputs the resulting address. As described above, the address converter 402 performs address conversion by handling the number of bits of the high-order address as one segment. Therefore, the address conversion table can be made smaller in size than when all address bits are subjected to conversion. FIG. 30 is a schematic diagram illustrating the details of address conversion by the address converter 402. Here, it is assumed that the number of address bits is 32, and that a segment size set in the address converter 402 is $2^s$ bytes. In this instance, the address conversion table in which, for example, up to k conversions are written stores a pair of a (32-s) bit high-order address serving as a conversion source address and a (32-s) bit high-order address serving as a conversion destination address. The address converter 402 uses a comparator 430 to determine whether the high-order address of an unconverted address matches the conversion source address indicated in the address conversion table. If the addresses match each other, a selector 431 outputs the conversion destination address indicated in the address conversion table. If, by contrast, the addresses do not match each other, the selector 431 outputs the high-order address of the unconverted address. Subsequently, a coupler 432 generates a converted address by coupling the (32-s) bit high-order address, which is outputted from the selector 431, to the low-order address of the s-bit unconverted address.

For dynamic difference code allocation during program execution, the allocation of two or more physical memory planes is required. However, the allocation of two or more physical memory planes are not required when only a program update is to be dynamically performed by allowing the address converter to perform switching. As far as the un-updated program, the difference codes, and the address converter are setup (and the sufficient conditions are met), a dynamic program update can be performed in a device. Consequently, it is assumed herein that more lenient conditions are applied, that is, one or more memory planes are allocated.

The explanation continues by returning to FIG. 7.

(8) In step S1-9, the difference code generation section 1041 generates a linker script for address resolution.

(9) In step S1-10, the difference code generation section 1041 generates a difference binary, that is, an object code for a difference code, by using difference codes, the other object codes subjected to address resolution, and the linker script.

Before a detailed description of processing in step S1-1, exemplary call graphs shown in FIG. 8 will be described. As it is assumed that control flow and data flow analyses can be made, it should be noted that a call graph indicative of a function call relationship can be built. Further, as it is assumed that no recursive call exists, it should be noted that the call graph always turns out to be a DAG (Directed Acyclic Graph). An example of an un-updated call graph is shown at 501, and an example of an updated call graph is shown at 502. In the examples, f, g, h, i, and j are function names. It is assumed that f, g, h, and i perfectly remain unchanged by an update in terms of the function name, the type, the number of arguments, the types of the arguments, and the arrangement of the arguments. When a set of functions is configured from f, g, h, i, and j, the following results are obtained:

Org={f, g, h, i}
Upd={f, g, h, i, j}

Thus, the following difference is obtained:

(Org−Upd)∪(Upd−Org)={j}

In general, functions tend to be called from a plurality of locations. Therefore, inline handling of the function j, which is not included in 501 but is included in 502, is considered to be inefficient. Thus, the difference in a call graph needs to be identified in a non-inline state. This implementation may be achieved, for example, by identifying the difference between the un-updated call graph and the updated call graph from the leaf node of a call graph having a DAG structure to the start node of a DAG.

Figure 9:
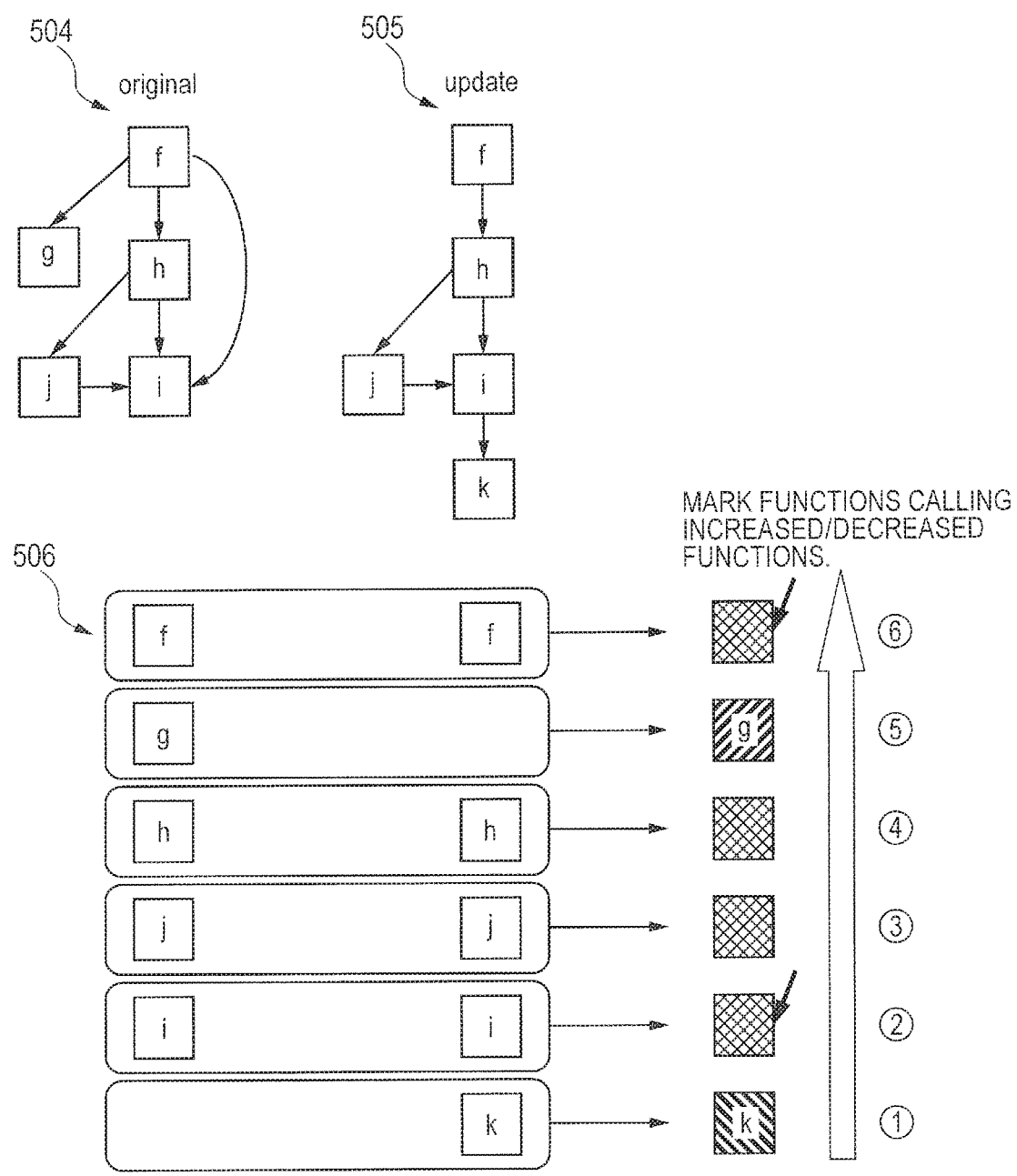
FIG. 9 is a diagram illustrating an exemplary overview of a Call Graph Diff building process.

FIG. 9 illustrates an overview of a call graph difference building process. An example of an un-updated call graph is shown at 504, and an example of an updated call graph is shown at 505. In the examples, f, g, h, i, j, and k are function names. It is assumed that f, h, i, and j perfectly remain unchanged by an update in terms of the function name, the type, the number of arguments, the types of the arguments, and the arrangement of the arguments. When a set of functions is configured from f, g, h, i, j, and k, the following results are obtained:

Org'={f, g, h, i, j}
Upd'={f, h, i, j, k}

Thus, the following difference is obtained:

(Org'−Upd')∪(Upd'−Org')={g,k}

When a difference is identified without expanding a function, a function for calling the function identified as the difference is such that the call turns out to be at least a difference. Therefore, simultaneous identification is needed. In the example shown in at 506, a topological sort is performed on the nodes of the un-updated call graph and updated call graph, difference function nodes are identified while making a comparison in reverse order, function nodes having an output edge to difference functions in a call graph are called for an update, and the called function nodes are marked as an increased function.

Figure 10:
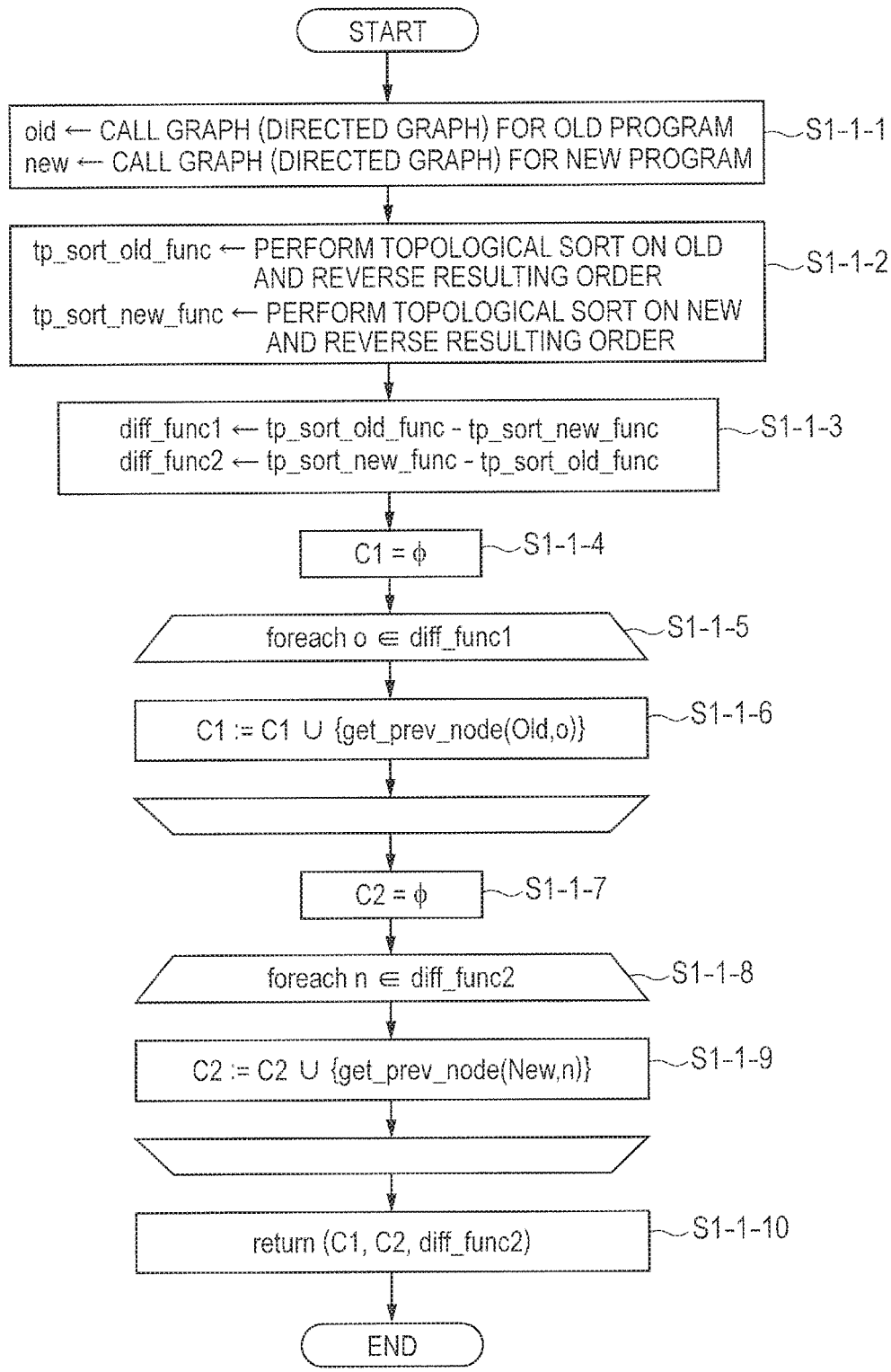
FIG. 10 is a flowchart illustrating a Call Graph Diff process.

FIG. 10 illustrates an exemplary flow of an identification process for difference functions and difference function call functions in a call graph. Here, it is assumed that the following is a function for returning all nodes on cg having an output edge to a node n of cg in a call graph cg.

get_prev_node(Call Graph cg, node n)

(1) In step S-1-1, the difference code generation section 1041 initializes Old as a call graph for an un-updated program and New as a call graph for an updated program.

(2) In step S1-1-2, the difference code generation section 1041 performs a topological sort on Old, gives a reverse-order label to each node of Old, and uses the result as tp_sort_old_func, and performs a topological sort on New, gives a reverse-order label to each node of New, and uses the result as tp_sort_new_func.

(3) In step S1-1-3, the difference code generation section 1041 calculates a node difference set between sequenced call graphs as indicated below:

diff_func1=all nodes of tp_sort_old_func−all nodes of tp_sort_new_func diff_func2=all nodes of tp_sort_new_func−all nodes of tp_sort_old_func (4) In step S1-1-4, the difference code generation section 1041 performs initialization by setting a set C1 to φ (empty set).

(5) In step S1-1-5, the difference code generation section 1041 removes the nodes included in diff_func1, and sequentially performs step S1-1-6 until all nodes are removed. The removed nodes are represented by o.

(6) In step S1-1-6, the difference code generation section 1041 performs the following calculation to identify the difference function call functions:

C1:=C1∪{get_prev_node(Old,o)}

(7) In step S1-1-7, the difference code generation section 1041 performs initialization by setting a set C2 to φ (empty set).

(8) In step S1-1-8, the difference code generation section 1041 removes the nodes included in diff_func2, and sequentially performs step S1-1-9 until all nodes are removed. The removed nodes are represented by n.

(9) In step S1-1-9, the difference code generation section 1041 performs the following calculation to identify the difference function call functions:

C2:=C1∪{get_prev_node(New,o)}

(10) In step S1-1-10, the difference code generation section 1041 returns C1, C2, and diff_func2 as processing results, and terminates the process.

A "method of difference code execution based on address conversion" in the embedded device will now be described.

Figure 31:
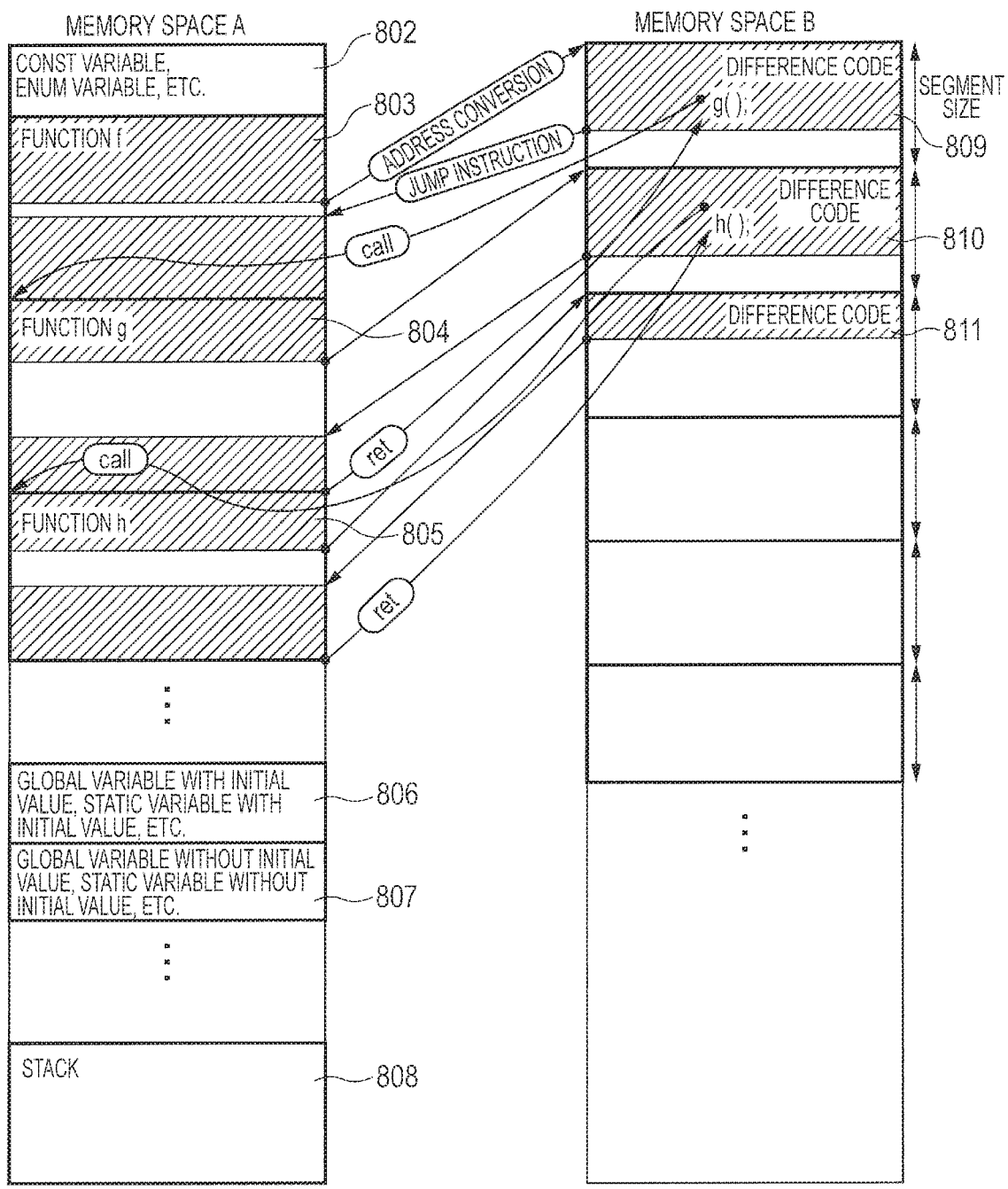
FIG. 31 is a schematic diagram illustrating a program execution transition between an un-updated program and a difference program.

First of all, a program execution transition between an un-updated program and a difference program will be described. FIG. 31 is a schematic diagram illustrating a program execution transition between an un-updated program and a difference program. Here, un-updated program object codes are allocated in a memory space A. In the memory space A, which is shown in the example of FIG. 31, const variables, enumeration values, and other constant variables to be allocated in a text segment are allocated in a memory area 802 together with their values, a function f is allocated in a memory area 803, a function g is allocated in a memory area 804, a function h is allocated in a memory area 805, a variable with an initial value is allocated in a memory area 806, a variable without an initial value is allocated in a memory area 807, and a stack and the like are allocated in a memory area 808. In a memory space B, update difference program object codes are allocated. It is assumed that a patch 809 corresponds to an update difference program object code corresponding to a part of the function f, and that a patch 810 corresponds to an update difference program object code corresponding to a part of the function g, and further that a patch 811 corresponds to an update difference program object code corresponding to a part of the function h. An example of program execution transition between the codes depicted in FIG. 31 is described below.

First of all, while the function f is executed by the CPU 401, address conversion is performed so that program execution transitions to the head address of the patch 809. Executing the function g in the patch 809 calls the head address of the function g allocated in the memory space A. Upon completion of the call of the function g, program execution transitions to an address next to a position where the function g of the patch 809 is called, and a program remaining in the patch 809 is executed. Program execution then transitions to an address of the function f that program execution should return to after completion of execution of the patch 809. Next, while the function g is executed by the CPU 401, address conversion is performed so that program execution transitions to the head address of the patch 810. Executing the function h in the patch 810 calls the head address of the function h allocated in the memory space A. Upon completion of the call of the function h, program execution transitions to an address next to a position where the function h of the patch 810 is called, and a program remaining in the patch 810 is executed. Program execution then transitions to an address of the function g that program execution should return to after completion of execution of the patch 810. Next, while the function h is executed by the CPU 401, address conversion is performed so that program execution transitions to the head address of the patch 811. Program execution then transitions to an address of the function h that program execution should return to after completion of execution of the patch 811. Subsequently, the CPU 401 continues with the execution of the function h, and then completes a program execution.

Figure 32:
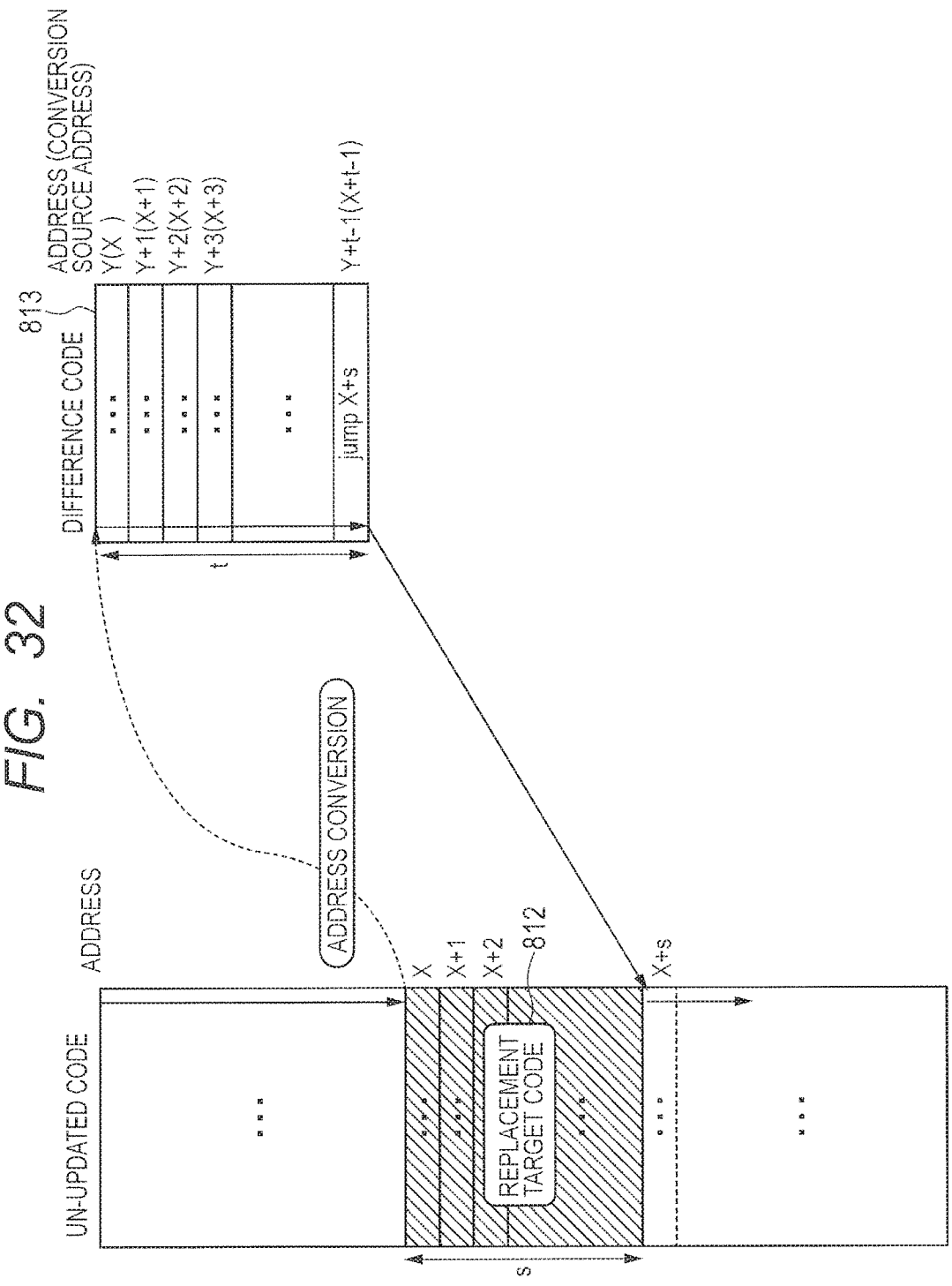
FIG. 32 is a schematic diagram illustrating an exemplary correspondence between a converted address and a difference code.

Examples of correspondence between a converted address and a difference code will now be described with reference to FIGS. 32 to 35. FIG. 32 is a schematic diagram illustrating an exemplary correspondence between a converted address and a difference code. The following describes, as an example, a case where an updated program is executed by replacing a replacement target code 812 with a difference code 813. The example shown in FIG. 32 relates to a case where a difference code size t is the same as or smaller than a replacement target code size s and the sizes s and t are not larger than a segment size set for a program address converter 402A. When a program execution by the CPU 401 reaches the head address of the replacement target code 812, program transition occurs as the program address converter 402A converts an address set in the program counter to the head address of the difference code 813. While the program address converter 402A sequentially converts unconverted addresses to the addresses of the difference code 813, program execution continues until the last address of the difference code 813 is reached. A jump instruction for jumping to an address next to the last address of the replacement target code 812 is allocated at the last address of the difference code 813. Therefore, the program execution is resumed for a remaining un-updated code.

Figure 33:
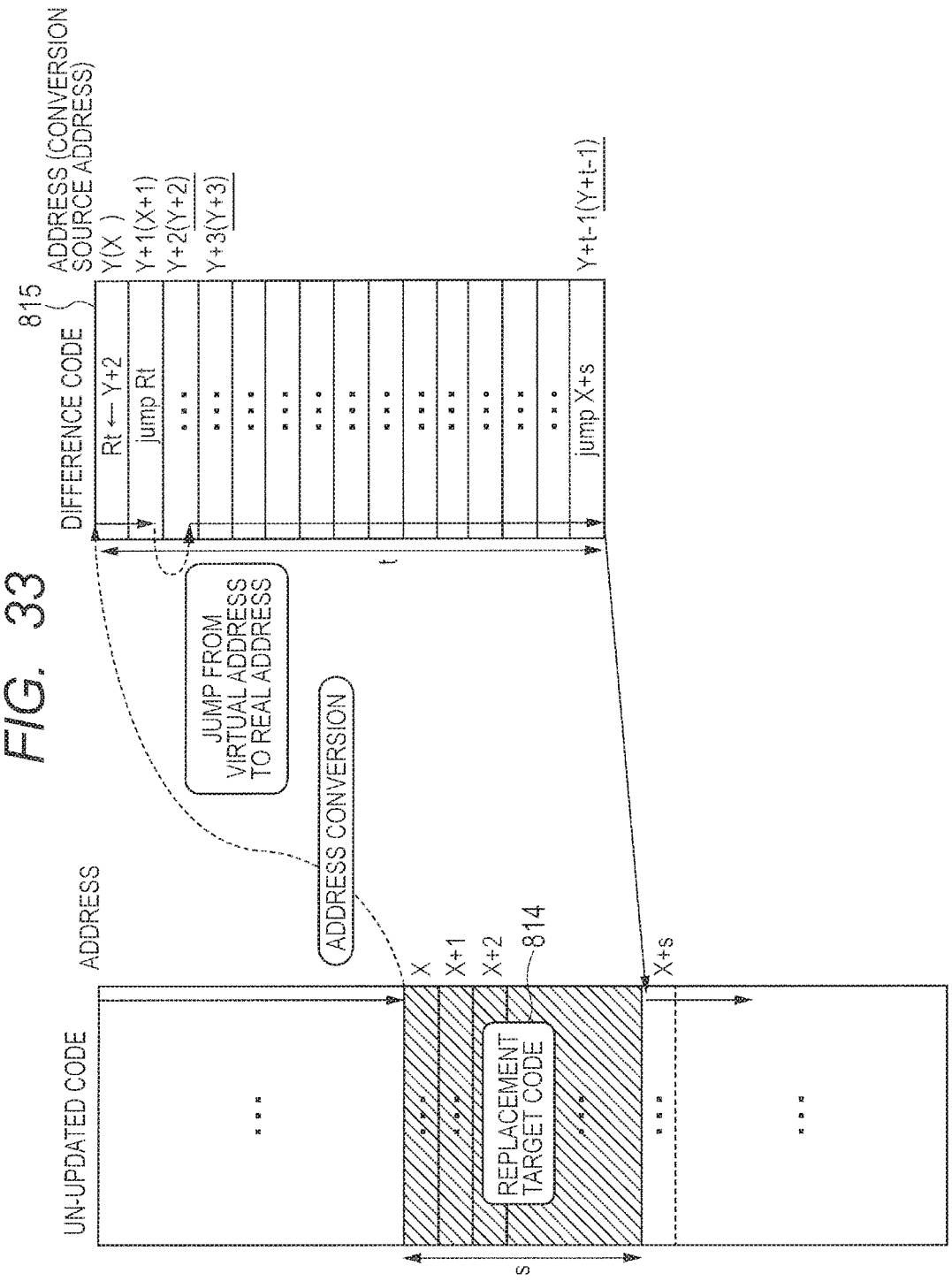
FIG. 33 is a schematic diagram illustrating another exemplary correspondence between a converted address and a difference code.

FIG. 33 is a schematic diagram illustrating another exemplary correspondence between a converted address and a difference code. The following describes, as an example, a case where an updated program is executed by replacing a replacement target code 814 with a difference code 815. The example shown in FIG. 33 relates to a case where the difference code size t is larger than the replacement target code size s or either the size s or the size t is larger than the segment size set for the program address converter 402A. When a program execution by the CPU 401 reaches the head address of the replacement target code 814, program transition occurs as the program address converter 402A converts an address set in the program counter to the head address of the difference code 815. An instruction related to a jump instruction for jumping to the head address of an update difference program is allocated at the beginning of the difference code 815. The instruction related to the jump instruction includes an object code for performing a jump. However, if necessary, the instruction related to the jump instruction may include an object code for saving and restoring the contents of a register and an object code for calculating the address of a jump destination. The object code for saving and restoring the contents of a register is required in some cases for the following reason. In general, an instruction for calculating the jump destination address of the jump instruction needs to be inserted. However, an instruction stream required for address calculation for the jump instruction and the jump instruction are inserted at the time of update difference binary generation. Such an instruction stream does not originally exist in an update program for update difference binary generation. That is to say, such an instruction stream does not originally appear when an update program is executed. Thus, the execution of such an instruction stream may create a CPU register state different from a CPU register state that should intrinsically exist. Therefore, the influence of such an instruction stream on the CPU register state is eliminated by saving the CPU register state before the execution of such an instruction stream and restoring the saved CPU register state after the execution. Here, the jump destination address is, for example, an address next to an address at which an instruction stream object code related to the jump instruction is completed. Consequently, after a program transition caused by the jump instruction, the CPU 401 continues with program execution until the last address of the difference code 815 is reached. A jump instruction for jumping to an address next to the last address of the replacement target code 814 is allocated at the last address of the difference code 815. Therefore, the program execution is resumed for a remaining un-updated code.

As described above, if the difference code replacing the replacement target code in a program is larger in size than the replacement target code, or if the replacement target code or the difference code is larger in size than the segment size, the address converter 402 performs the following address conversion. That is to say, the address converter 402 converts the head address of the replacement target code to an address that stores an instruction related to a jump instruction for jumping to the head address of an instruction stream replacing the replacement target code. This ensures that an updated program can be properly executed even if the difference code replacing the replacement target code is larger in size than the replacement target code in a program or the replacement target code or the difference code is larger in size than the segment size.

Figure 34:
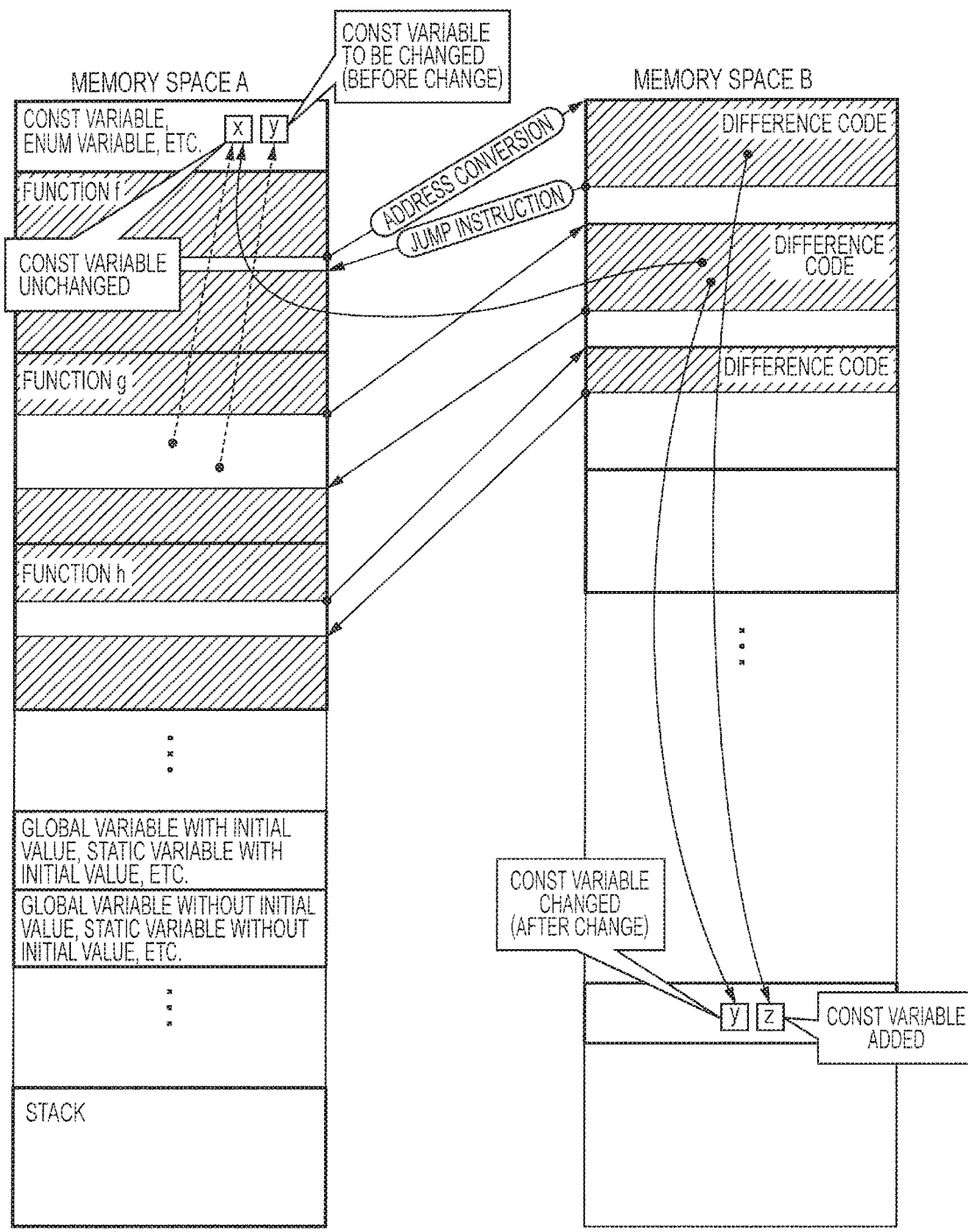
FIG. 34 is a schematic diagram illustrating an exemplary correspondence between a converted address and a difference code in a situation where a variable is updated.

An exemplary case where a variable is updated will now be described with reference to FIGS. 34 and 35. FIG. 34 is a schematic diagram illustrating an exemplary correspondence between a converted address and a difference code in a situation where a variable is updated. This figure depicts an exemplary case where an updated program is executed with a replacement target code replaced with a difference code, an update is performed to add const variables, enumeration values, and other constant variables to be allocated in a text segment and change constant variables or add variables with an initial value, and these variables are accessed only from the difference code. The added or changed variables are not originally allocated in the memory space A, but program execution is performed in accordance with an execution procedure indicated in FIG. 32 or 33 while referencing the variables allocated in the memory space B. These variables are newly allocated as some difference codes in the memory space B where difference codes are allocated. When the difference codes are executed, the values of the variables are updated by performing program execution for the added or changed variables while referencing the variables in the memory space B and not the variables originally allocated in the memory space A.

Figure 35:
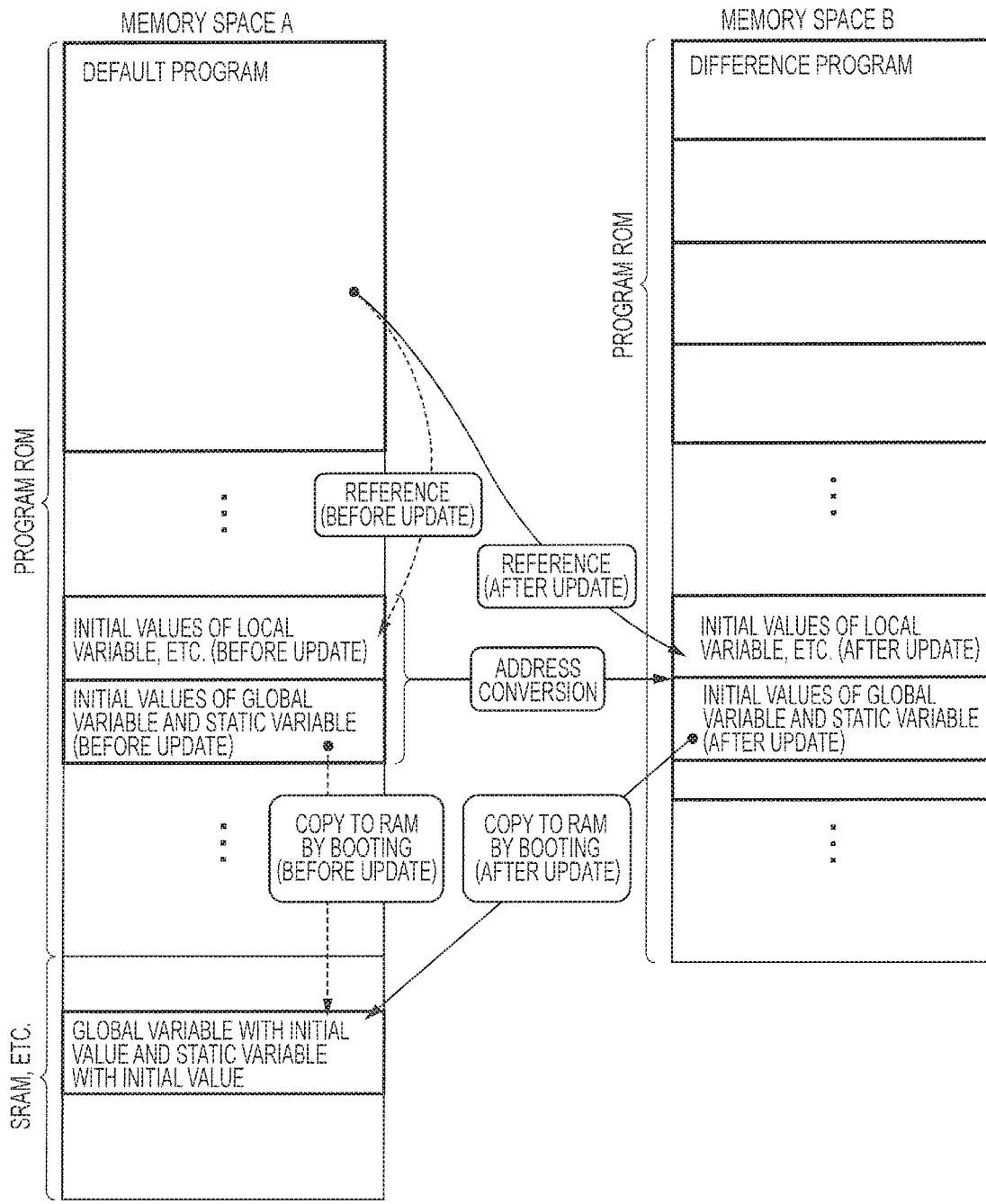
FIG. 35 is a schematic diagram illustrating another exemplary correspondence between a converted address and a difference code in a situation where a variable is updated.

FIG. 35 is a schematic diagram illustrating another exemplary correspondence between a converted address and a difference code in a situation where a variable is updated. This figure depicts an exemplary case where an updated program is executed with a replacement target code replaced with a difference code and the initial value of a variable with an initial value, which is a global variable, or the initial value of a variable, which is a local variable, is changed, or a variable with an initial value to be referenced from an un-updated code is added. For the changed or added portions, program execution is performed in accordance with the execution procedure indicated in FIG. 32 or 33 while referencing variables newly allocated in the memory space B with the aid of an address conversion mechanism. As for the change of an initial value or the addition of a variable with an initial value, program execution is performed for the variables allocated in the memory space A and affected by the change or addition while applying the addition or change by newly allocating the added or changed variables in the memory space B where difference codes are allocated and referencing and executing these variables by using the address conversion mechanism at the time of difference code execution. Program execution is performed with a variable with an initial value added or changed particularly after accessing a local variable allocated in the memory space B or expanding a global variable allocated in the memory space B to a data segment (an SRAM 406 when the data segment is assigned to the SRAM 406 or a data ROM 408 when the data segment is assigned to the data ROM 408) after a reboot. In the above case, the memory space A and the memory space B may be allocated in the same memory space as far as they differ in the head address.

Figure 11:
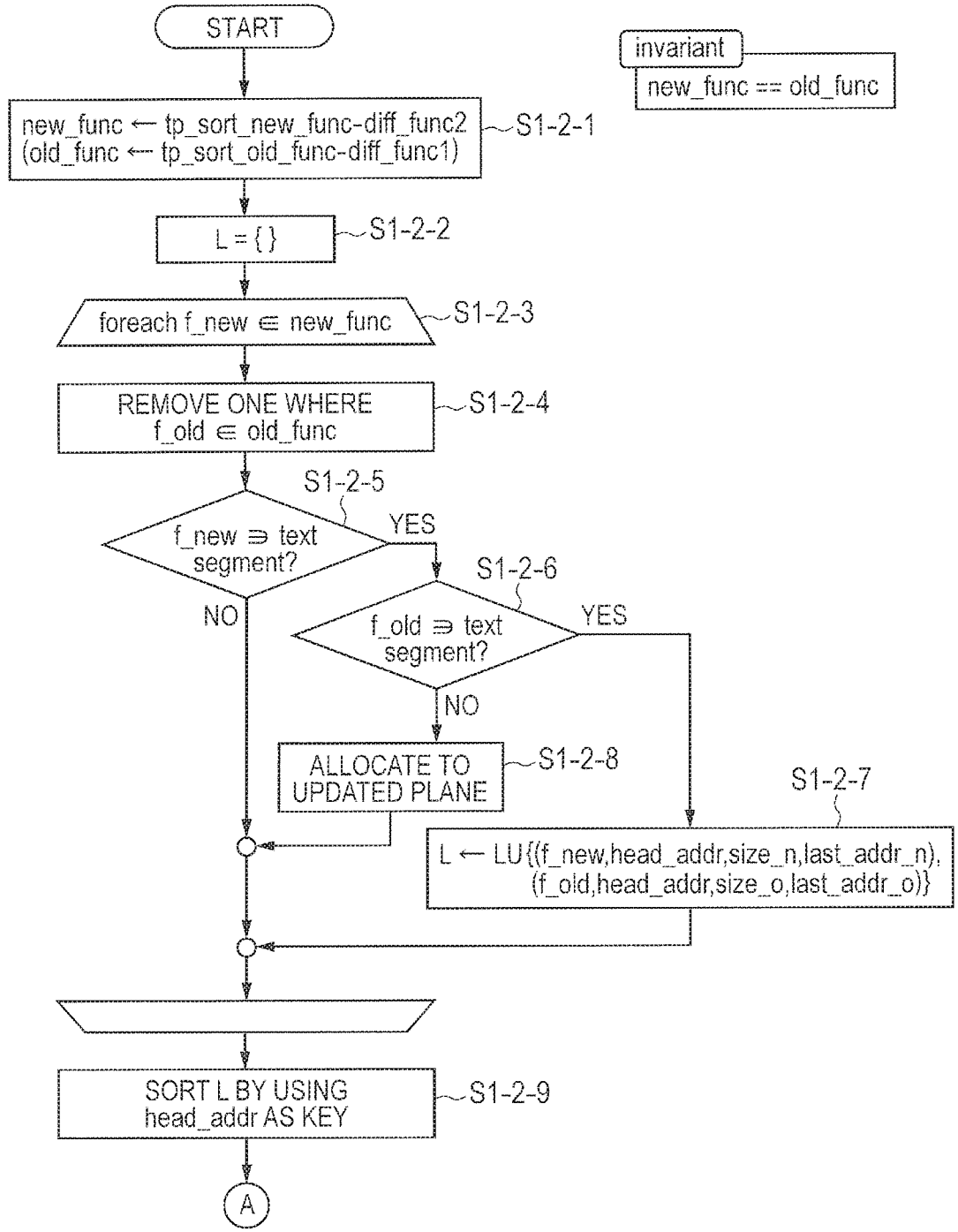
FIG. 11 is a flowchart illustrating a difference generation process (1) for a fixed constant variable.
Figure 12:
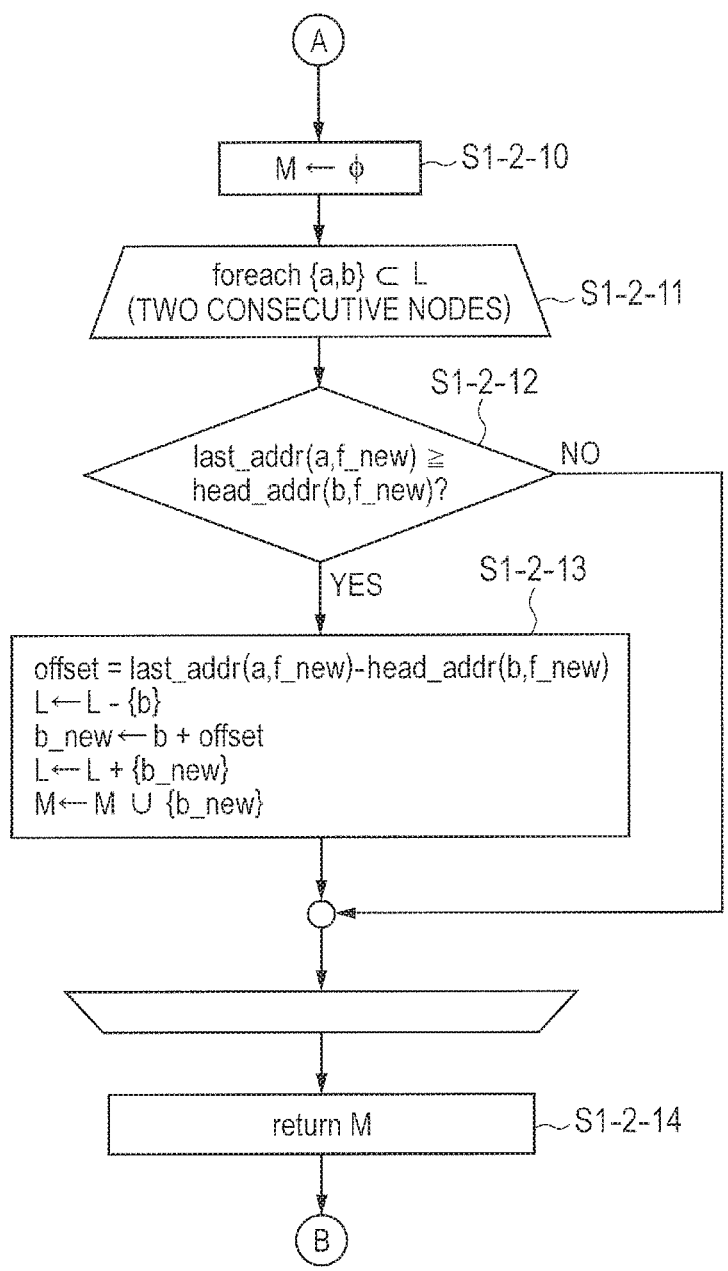
FIG. 12 is a flowchart illustrating a difference generation process (2) for the fixed constant variable.
Figure 13:
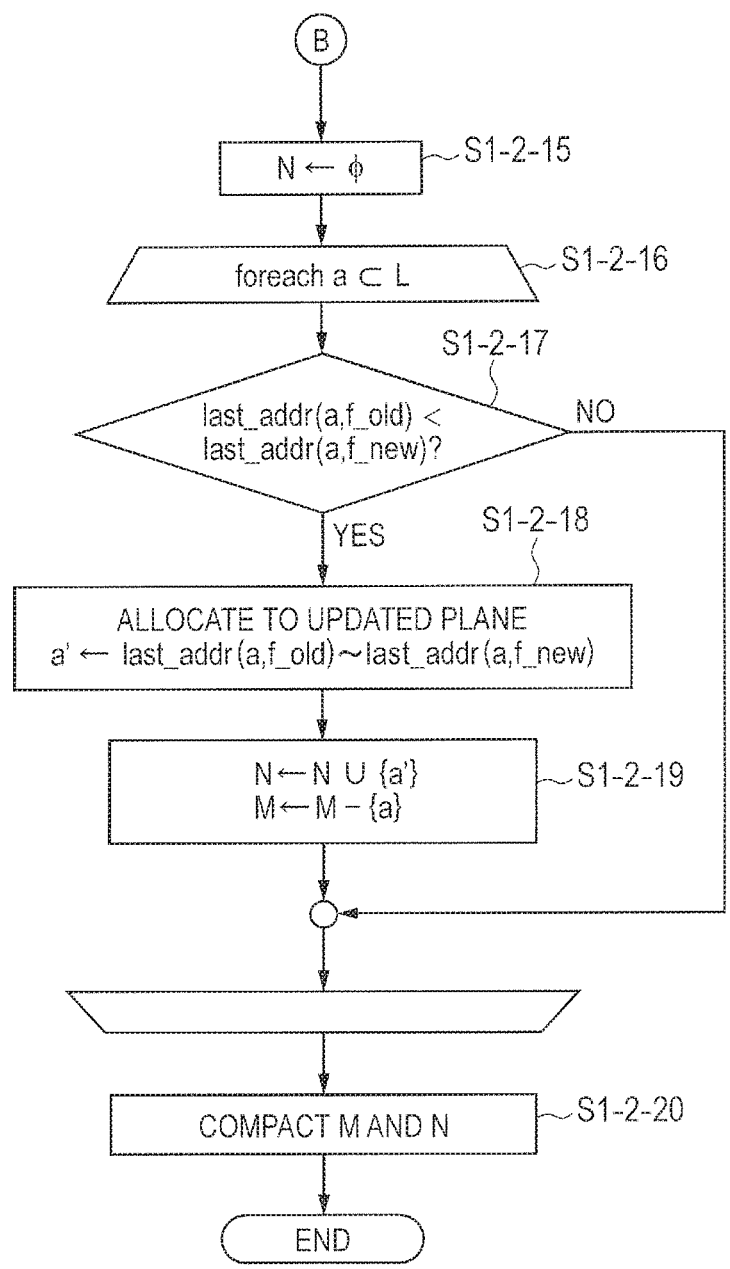
FIG. 13 is a flowchart illustrating a difference generation process (3) for the fixed constant variable.

FIGS. 11, 12, and 13 illustrate an exemplary flow of a difference generation process for a fixed constant variable. The illustrated exemplary flow of difference generation relates to a case where address conversion is performed for difference code execution. When a conventional method not based on address conversion is employed to build an updated program from a difference code and an un-updated program, the difference generation process need not be performed and may be skipped.

(1) In step S1-2-1, the difference code generation section 1041 performs the following calculations to make lists in which functions used in both the un-updated program and the updated program are arranged in the same order:

new_func=list of nodes disposed in reverse order
      from the topological sort of tp_sort_new_func−
      diff_func2 old_func=list of nodes disposed in reverse order
      from the topological sort of tp_sort_old_func−
      diff_func1

(2) In step S1-2-2, the difference code generation section 1041 initializes a set L to φ (empty set).

(3) In step S1-2-3, the difference code generation section 1041 removes a node included in new_func and sequentially performs steps S1-2-4 to S1-2-8 until all nodes are removed. The removed nodes are represented by f_new.

(4) In step S1-2-4, the difference code generation section 1041 removes an original f_old of old_func that corresponds to f_new.

(5) In step S1-2-5, the difference code generation section 1041 checks whether a text segment is included in f_new. If so, processing proceeds to step S1-2-6. If not, processing continues by proceeding to the next repetition processing step in (3).

(6) In step S1-2-6, the difference code generation section 1041 checks whether a text segment is included in f_old. If a text segment is included in f_old, processing proceeds to step S1-2-7. If no text segment is included in f_old, processing proceeds to step S1-2-8.

(7) In step S1-2-7, the difference code generation section 1041 determines the head address of the text segment of f_old and regards the determined head address as head_adder. The difference code generation section 1041 also regards the head address of f_new as the same head_adder.

The segment size of f_old is regarded as size_o to calculate the last address as indicated below:

last_addr_o=head_adder+size_o

Similarly, the difference code generation section 1041 regards the segment size of f_new as size_n, and calculates the last address as indicated below:

last_addr_n=head_adder+size_o

The difference code generation section 1041 updates the set L as indicated below:

$L = L \cup \{(f\_new, head\_addr, size\_n, last\_addr\_n), (f\_old, head\_addr, size\_o, last\_addr\_o)\}$ (8) In step S1-2-8, the difference code generation section 1041 specifically performs address resolution as indicated in step S1-9 of FIG. 7 on the assumption that the text segment of f_new, that is, a fixed constant variable, is allocated on an updated plane.

(9) In step S1-2-9, the difference code generation section 1041 performs a sort on L by using head_addr as a key, and newly regards the result as L.

(10) In step S1-2-10, the difference code generation section 1041 initializes a set M to φ (empty set).

(11) In step S1-2-11, the difference code generation section 1041 removes two consecutive nodes included in a list L, and repeatedly performs steps S1-2-12 and S1-2-13 in sequence until all the two consecutive nodes are removed while shifting from one node to the next. Here, the first two consecutive nodes are represented by {a, b}. If, for example, L={a, b, c, d}, the sequentially removed two consecutive nodes are {a, b}, {b, c}, and {c, d} in the order named.

(12) In step S1-2-12, the difference code generation section 1041 compares the last address of the text segment of a with the head address of the text segment of b to be allocated subsequently to a in the form of the Boolean expression of Equation (3) below:

$$last\_addr(a, f\_new) \geq head\_addr(b, f\_new) \quad (3)$$

If the result is true, processing proceeds to step S1-2-13. If the result is false, processing continues by performing the repetition process in (11).

(13) In step S1-2-13, the difference code generation section 1041 performs the following process to update the head and last addresses of the text segment of b and the sets L and M:

offset=last_addr(a,f_new)−head_addr(b,f_new)

$L = L - \{b\}$ b_new=b+offset $L = L + \{b\_new\}$ $M = M \cup \{b\_new\}$ where b_new=b+offset is an abbreviation of the following:

(f_new,head_addr_new,size,last_addr_new)=(f_new, head_addr+offset,size,last_addr+offset)

(14) In step S1-2-14, the difference code generation section 1041 returns the resultant set M.

(15) In step S1-2-15, the difference code generation section 1041 initializes a set N to φ (empty set).

(16) In step S1-2-16, the difference code generation section 1041 removes the nodes included in L and sequentially performs steps S1-2-17 to S1-2-19 until all nodes are removed. The removed nodes are represented by a.

(17) In step S1-2-17, the difference code generation section 1041 compares the text segments included in f_old and f_new, which are an un-updated function and an updated function corresponding to each other. If the text segment of f_old perfectly matches the text segment of f_new from its beginning, the difference code generation section 1041 compares their last addresses in the form of the following Boolean expression:

$$last\_addr(a, f\_old) < last\_addr(a, f\_new)$$

If the result is true, processing proceeds to step S1-2-18. If the result is false, processing continues by performing the repetition process in (16).

(18) In step S1-2-18, the difference code generation section 1041 calculates a' as follows:

$$a' = last\_addr(a, f\_old) \sim last\_addr(a, f\_new)$$

More specifically, the difference code generation section 1041 calculates the following:

$$a' = (f\_new, last\_adder\_o, size\_n - size\_o, last\_adde\_n)$$

Here, it is assumed the text segment of f_old is as follows:
(f_old, head_adder, size_o, last_adde_o)
It is also assumed that the text segment of f_new is as follows:
(f_new, head_adder, size_n, last_adde_n)

(19) In step S1-2-19, the difference code generation section 1041 updates the set N and the set M as follows:

$$N = N \cup \{a'\}$$

$$M = M - \{a\}$$

(20) In step S1-2-10, the difference code generation section 1041 builds M∪N, identifies an address space where no text is allocated, and performs an offsetting process on a space where no text is allocated. The offsetting process is performed in order of increasing addresses by adding the size of the identified address space to the head and last addresses of each text segment allocated subsequently to the identified address space.

Figure 14:
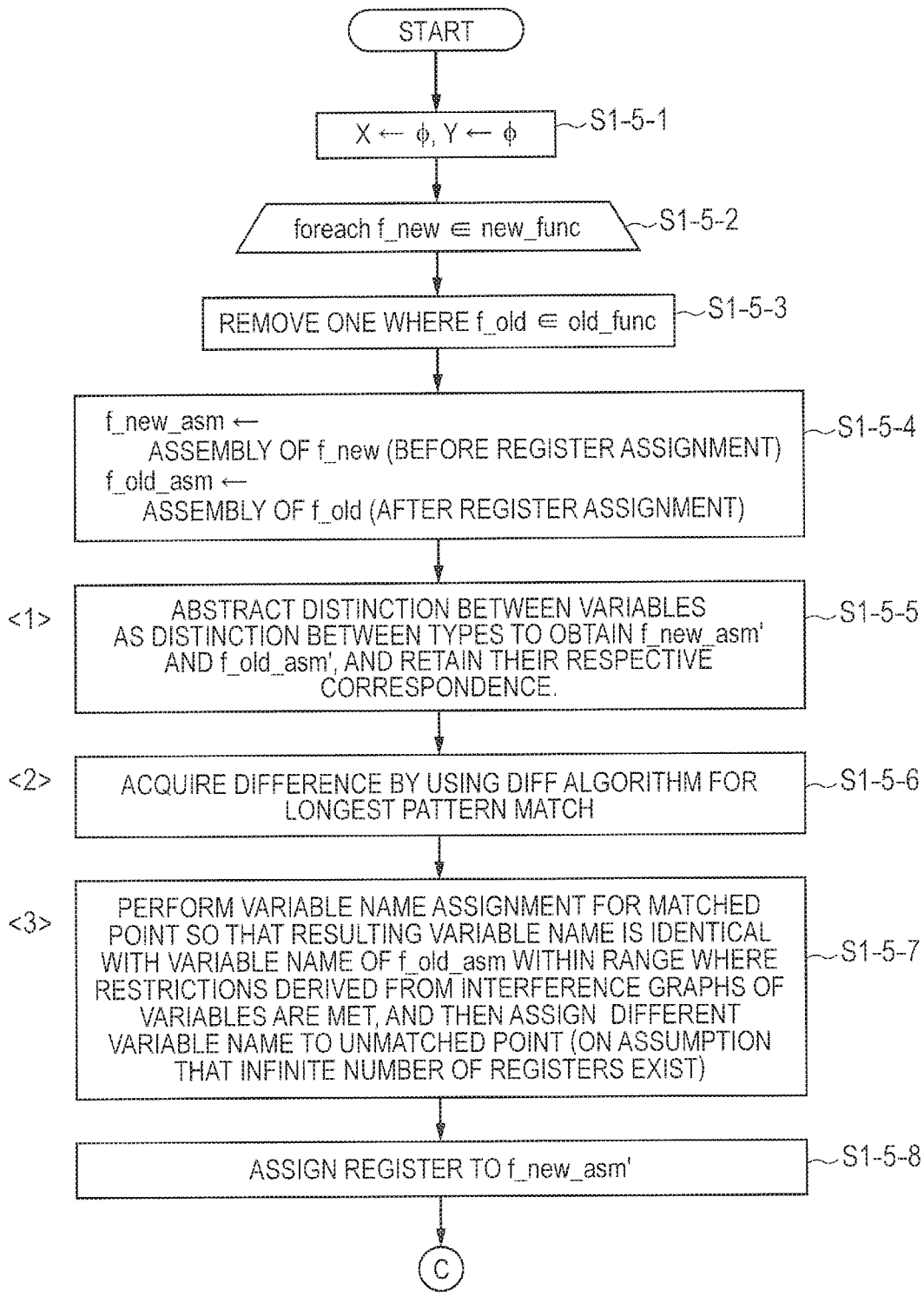
FIG. 14 is a flowchart illustrating a difference code building process (1), for example, for a diff format based on SSA for each function.
Figure 15:
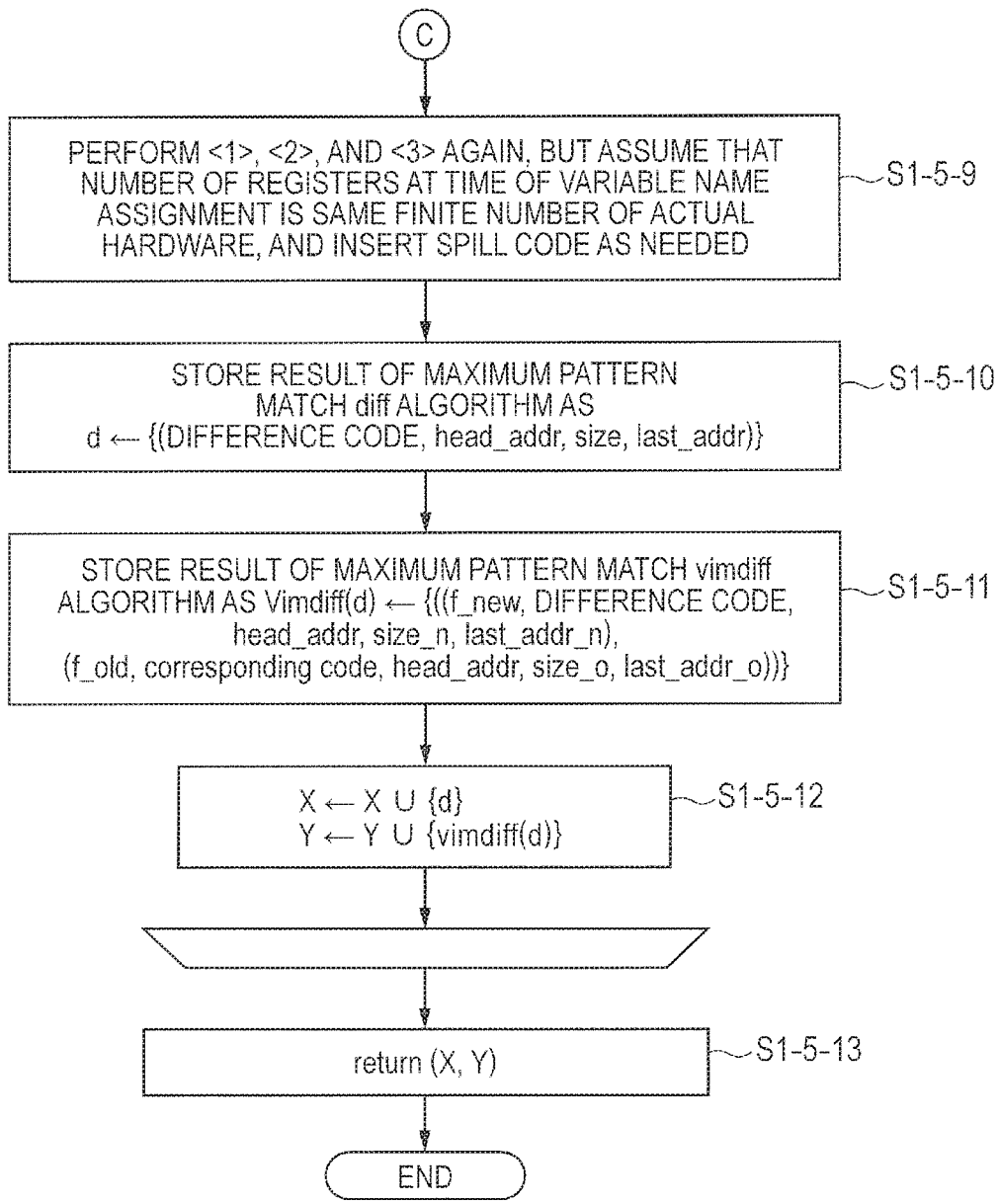
FIG. 15 is a flowchart illustrating a difference code building process (2), for example, for the diff format based on SSA for each function.

FIGS. 14 and 15 are flowcharts illustrating an exemplary process for building a difference code pair in a diff format and in a vimdiff format in consideration of the SSA format of each function. Here, the UNIX (registered trademark) commands diff and vimdiff may be used to obtain the result in the diff format and in the vimdiff format.

(1) In step S1-5-1, the difference code generation section 1041 initializes both a set X and a set Y to φ (empty set).

(2) In step S1-5-2, the difference code generation section 1041 repeatedly performs steps S1-5-3 to S1-5-12 for each original f_new in the list new_func. Here, new_func and old_func are lists made in step S1-2-1 of FIG. 11. More specifically, these lists are as indicated below:
new_func=list of nodes disposed in reverse order from the topological sort of tp_sort_new_func–diff_func2
old_func=list of nodes disposed in reverse order from the topological sort of tp_sort_old_func–diff_func1

(3) In step S1-5-3, the difference code generation section 1041 removes an original f_old of old_func that corresponds to f_new.

(4) In step S1-5-4, the difference code generation section 1041 configures the following assembly codes for f_new and f_old:
f_new_asm=a relocatable assembly description that is obtained by compiling a program description of f_new without address assignment or register assignment.

f_old_asm=an assembly description that corresponds to the function f_old in an object code operating in the embedded device.

(5) In step S1-5-5, the difference code generation section 1041 obtains f_new_asm' and f_old_asm' by abstracting the distinction between variables as the distinction between types, and retains the correspondence between f_new_asm and f_new_asm' and the correspondence between f_old_asm and f_old-asm'. This process is designated as <1>.

(6) In step S1-5-6, the difference code generation section 1041 acquires the difference between f_new_asm' and f_old_asm' by using a diff algorithm for the longest pattern match. This process is designated as <2>.

(7) In step S1-5-7, the difference code generation section 1041 performs variable name assignment for a matched point so that f_new-asm' has the same variable name as f_old_asm within a range where restrictions derived from interference graphs of variables are met. Subsequently, the difference code generation section 1041 assigns a different variable name to an unmatched point on the assumption that an infinite number of registers exist. This process is designated as <3>. Using the interference graphs to derive the restrictions on variable name assignment is disclosed in Alfred V. Aho, Ravi Sethi, Jeffrey D. Ullman Monica S. Lam, Compilers: Principles, Techniques, and Tools, Prentice Hall.

(8) In step 1-5-8, the difference code generation section 1041 performs register assignment for f_new_asm' in consideration of the number of CPU registers incorporated in a processor in the target embedded device.

(9) In step 1-5-9, the difference code generation section 1041 performs the processes <1>, <2>, and <3> again. However, the number of CPU registers incorporated in the processor in the target embedded device is assumed at the time of variable name assignment. If necessary, a spill code is inserted, and the assembly code for f_new_asm is generated so as to minimize the difference.

(10) In step S1-5-10, the difference code generation section 1041 stores difference code information about f_new_asm and f_old_asm, which are identified in the above-described configuration, as indicated below:

$$d = \{(\text{difference code}, head\_addr, size, last\_addr)\}$$

(11) In step S1-5-11, the difference code generation section 1041 stores difference information about f_new_asm and f_old_asm, which are identified in the above-described configuration, in the vimdiff format as indicated below:

$$Vim\text{diff}(d) = \{((f\_new, \text{difference code}, head\_addr, size\_n, last\_addr\_n), (f\_old, \text{corresponding code}, head\_addr, size\_o, last\ addr\_o))\}$$

(12) In step S1-5-12, the difference code generation section 1041 updates the sets X and Y as indicated by the following equations:

$$X = X \cup \{d\}$$

$$Y = Y \cup \{vim\text{diff}(d)\}$$

(13) In step S1-5-13, the difference code generation section 1041 returns the sets X and Y as processing results, and terminates the process.

Figure 16:
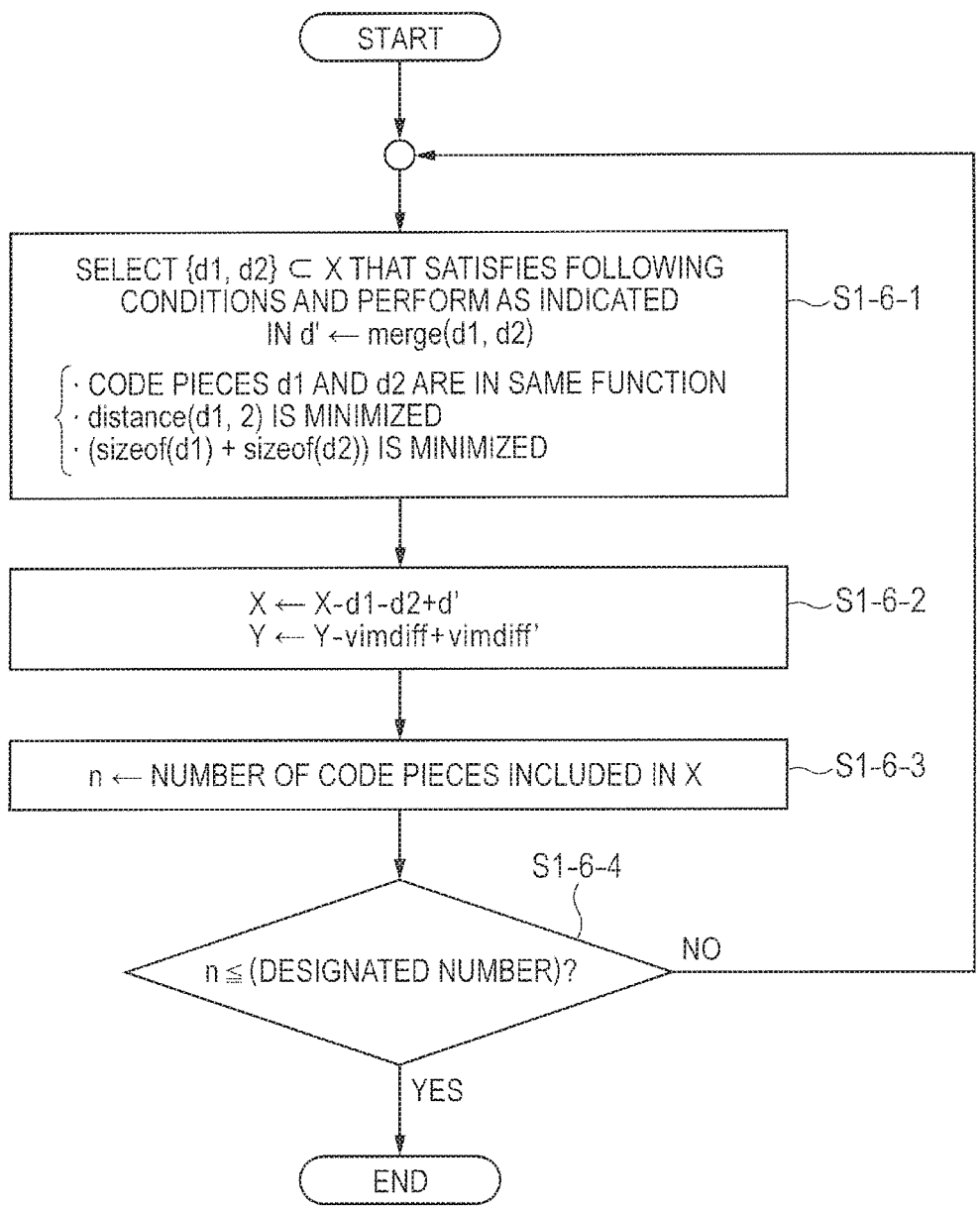
FIG. 16 is a flowchart illustrating a merge process for difference code pieces in a function.
Figure 17:
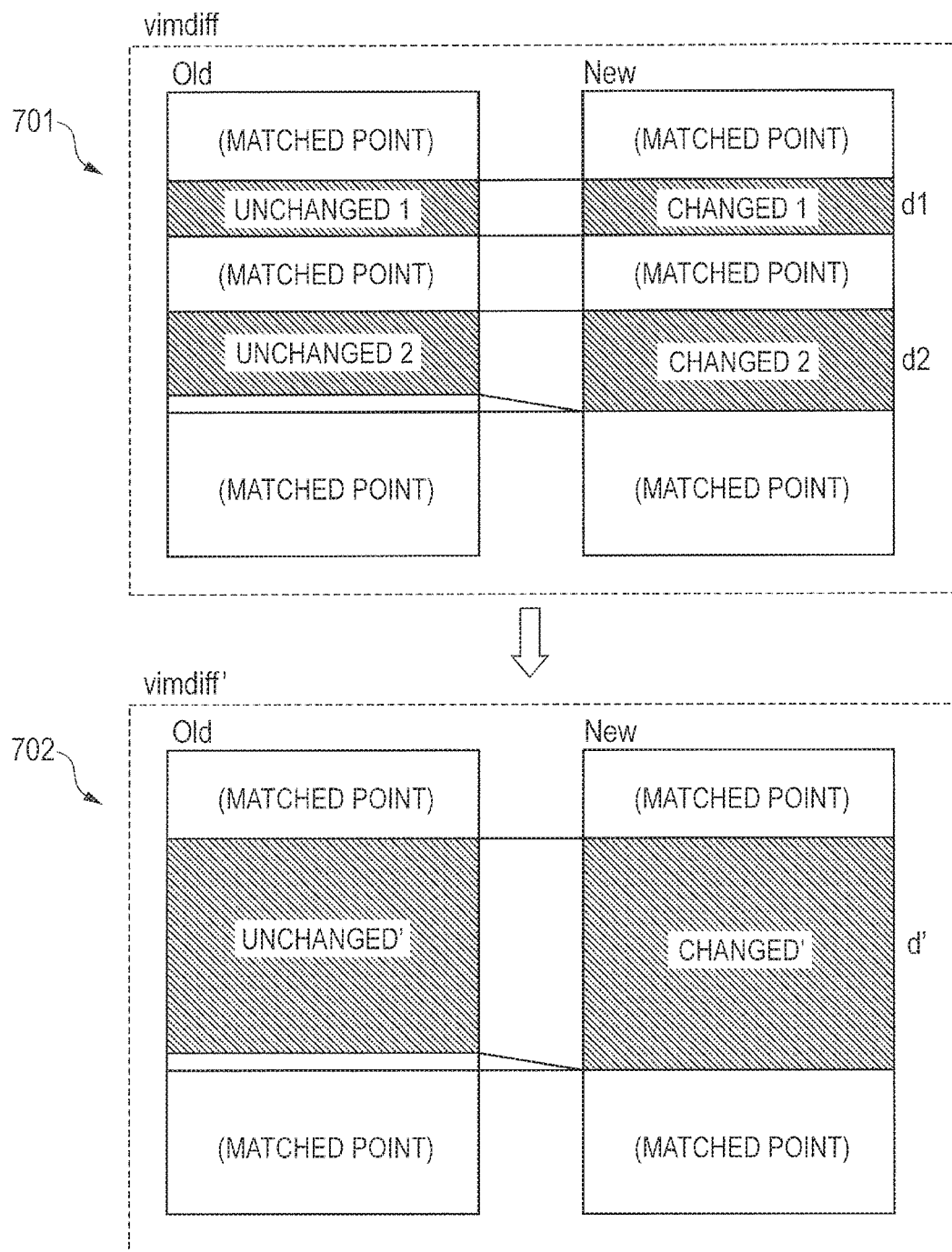
FIG. 17 is a diagram illustrating the concept of the merge process for difference code pieces in a function.

FIG. 16 is a flowchart illustrating an example of a merge process for difference code pieces in a function. FIG. 17 is a diagram illustrating the concept of the merge process for difference code pieces in a function.

(1) In step S1-6-1, the difference code generation section 1041 handles the sets X and Y as output results of the flowcharts of FIGS. 14 and 15, selects d1 and d2 that satisfy the following conditions, and assumes that d'=merge(d1, d2).

$$\{d1,d2\} \subset X \quad (4)$$

A code piece d1 and a code piece d2 are in the same function.

distance(d1, d2) is minimized.

(sizeof(d1)+sizeof(d2)) is minimized.

Here, distance( ) sizeof( ) and merge ( ) are operations defined below:

distance(d1, d2): Code size of a matched point between d1 and d2 as indicated at 701.

sizeof(d1): Code size of d1.

merge(d1, d2): A process for merging d1 and d2, including a matched point between d1 and d2, and outputting a merged code as a result as indicated by vimdiff result changes from 701 to 702.

(2) In step S1-6-2, the difference code generation section 1041 updates the sets X and Y as indicated below:

$$X = X - d1 - d2 + d'$$

$$Y = Y - vim\text{diff} + vim\text{diff}'$$

where vimdiff' represents a vimdiff result obtained by performing a merge process on an un-updated function code and an updated function code, which are indicated by using a merged code obtained not only by merging d1 and d2 after a change but also by applying merge(pd1, pd2) to unchanged codes (pd1, pd2) corresponding to d1, d2 as indicated at 702.

(3) In step S1-6-3, the difference code generation section 1041 assumes that n is equal to the number of code pieces included in X.

(4) In step S1-6-4, the difference code generation section 1041 checks whether n is equal to or smaller than a designated number. If n is equal to or smaller than the designated number, processing terminates. If not, processing returns to step S1-6-1.

Figure 18:
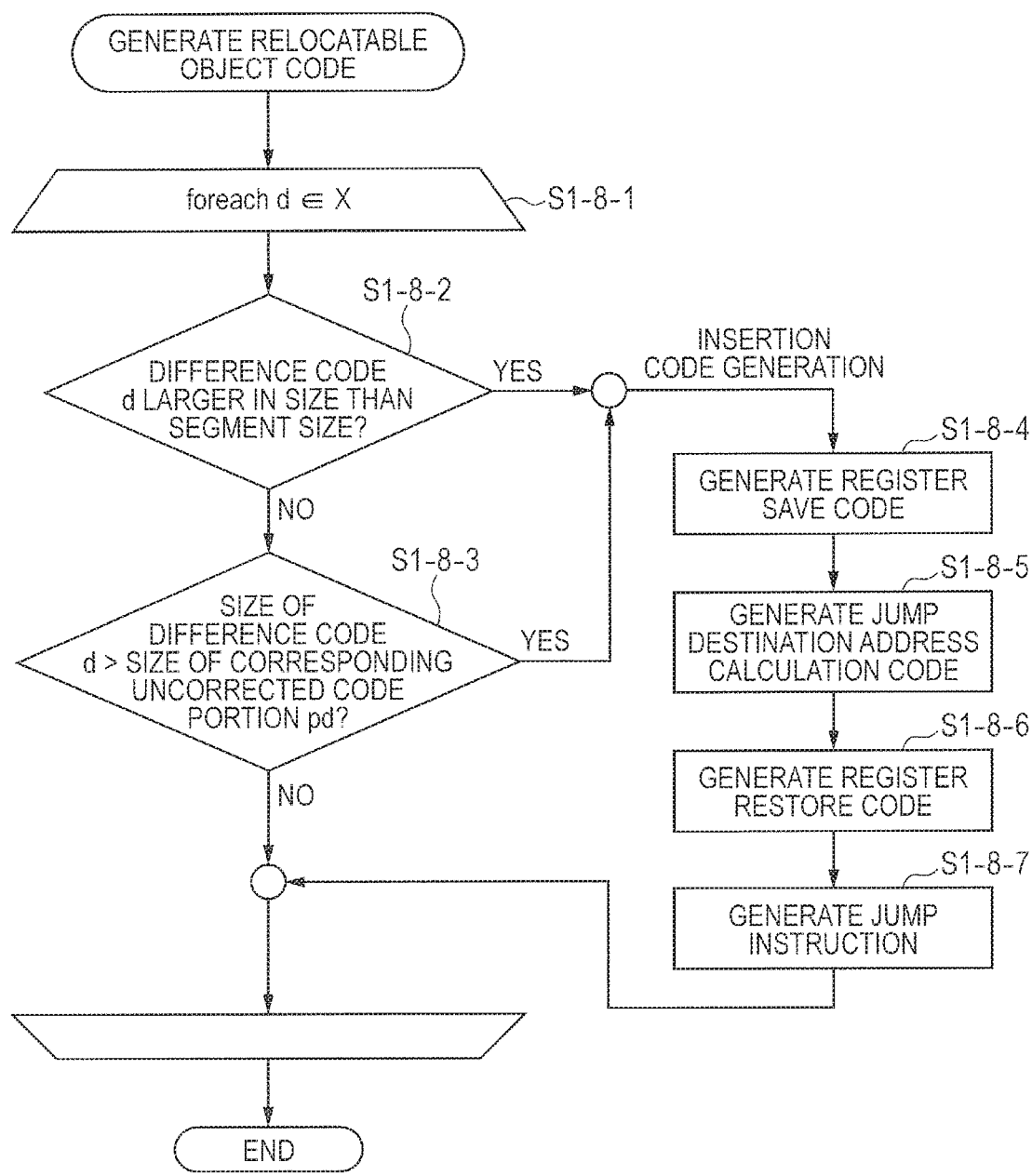
FIG. 18 is a flowchart illustrating an object code generation process.

FIG. 18 is a flowchart illustrating an example of a relocatable object code generation process performed in step S1-8 of FIG. 7.

(1) In step S1-8-1, as an output result of the flowcharts of FIGS. 14 and 15 with respect to the sets X and Y or as an output result of the flowchart of FIG. 16, the difference code generation section 1041 repeatedly performs steps S1-8-2 to S1-8-7 for each original d of X. Here, the original Y corresponding to d is regarded as pd.

(2) In step S1-8-2, the difference code generation section 1041 determines whether the size of the difference code d is larger than the segment size of a memory space where a difference code is allocated. If so, processing skips to step S1-8-4. If not, processing proceeds to step S1-8-3.

(3) In step S1-8-3, the difference code generation section 1041 determines whether the size of the difference code d is larger than the size of a corresponding uncorrected code portion pd. If so, processing proceeds to step S1-8-4.

(4) In step S1-8-4, the difference code generation section 1041 generates a save code for the CPU registers, and adds the generated save code to the beginning of the difference code d.

(5) In step S1-8-5, the difference code generation section 1041 generates a code for calculating the head address of a code corresponding to the difference code, and adds the generated code to a position immediately after the save code added in (4).

(6) In step S1-8-6, the difference code generation section 1041 generates a restore code for the CPU registers, and adds the generated restore code to a position immediately after the head address calculation code added in (5).

(7) In step S1-8-7, the difference code generation section 1041 generates a jump instruction for branching to the head address of a calculation result, and adds the generated jump instruction to a position immediately after the CPU register restore code added in (6).

Figure 19:
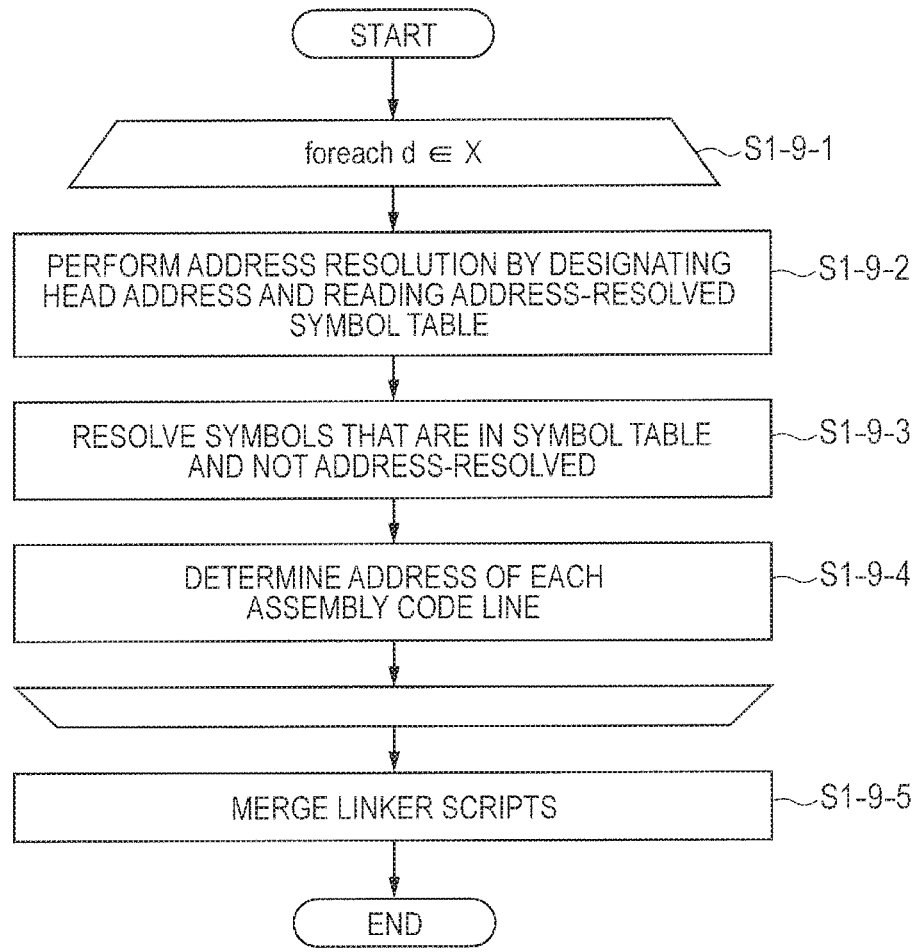
FIG. 19 is a flowchart illustrating an address resolution process for a difference code.

FIG. 19 is a flowchart illustrating a difference code address resolution process in step S1-9 of FIG. 7.

(1) In step S1-9-1, as an output result of the flowcharts of FIGS. 14 and 15 with respect to the set X or as an output result of the flowchart of FIG. 18, the difference code generation section 1041 repeatedly performs steps S1-9-2 to S1-9-4 for each original d of X.

(2) In step S1-9-2, the difference code generation section 1041 generates a linker script for performing address resolution by designating the head address for allocating d in a memory and reading an address-resolved symbol table.

(3) In step S1-9-3, the difference code generation section 1041 generates a linker script for resolving symbols that are in the symbol table and not address-resolved.

(4) In step S1-9-4, the difference code generation section 1041 determines the allocation area size of d from an estimated code size of d, that is, determines the allocation area size of d, for example, by multiplying the segment size by an integer, and generates a linker script for determining the address of each line of an assembly code.

(5) In step S1-9-5, the difference code generation section 1041 merges the generated linker scripts to generate a single link script.

Figure 20:
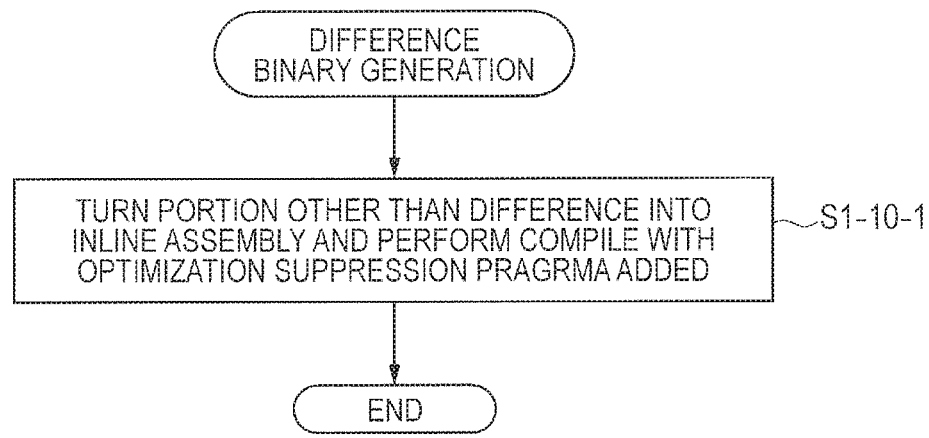
FIG. 20 is a flowchart illustrating a difference binary generation process.

FIG. 20 is a flowchart illustrating a difference binary generation process in step S1-10 of FIG. 7.

(1) In step S1-10-1, the difference code generation section 1041 turns a portion other than a difference into an inline assembly, adds an optimization suppression pragrma, and obtains a difference binary by performing a compile with the linker script derived from the process illustrated in FIG. 19.

(5. Simplification of Un-updated Code and Updated Code in Update Target Portion)

Figure 21:
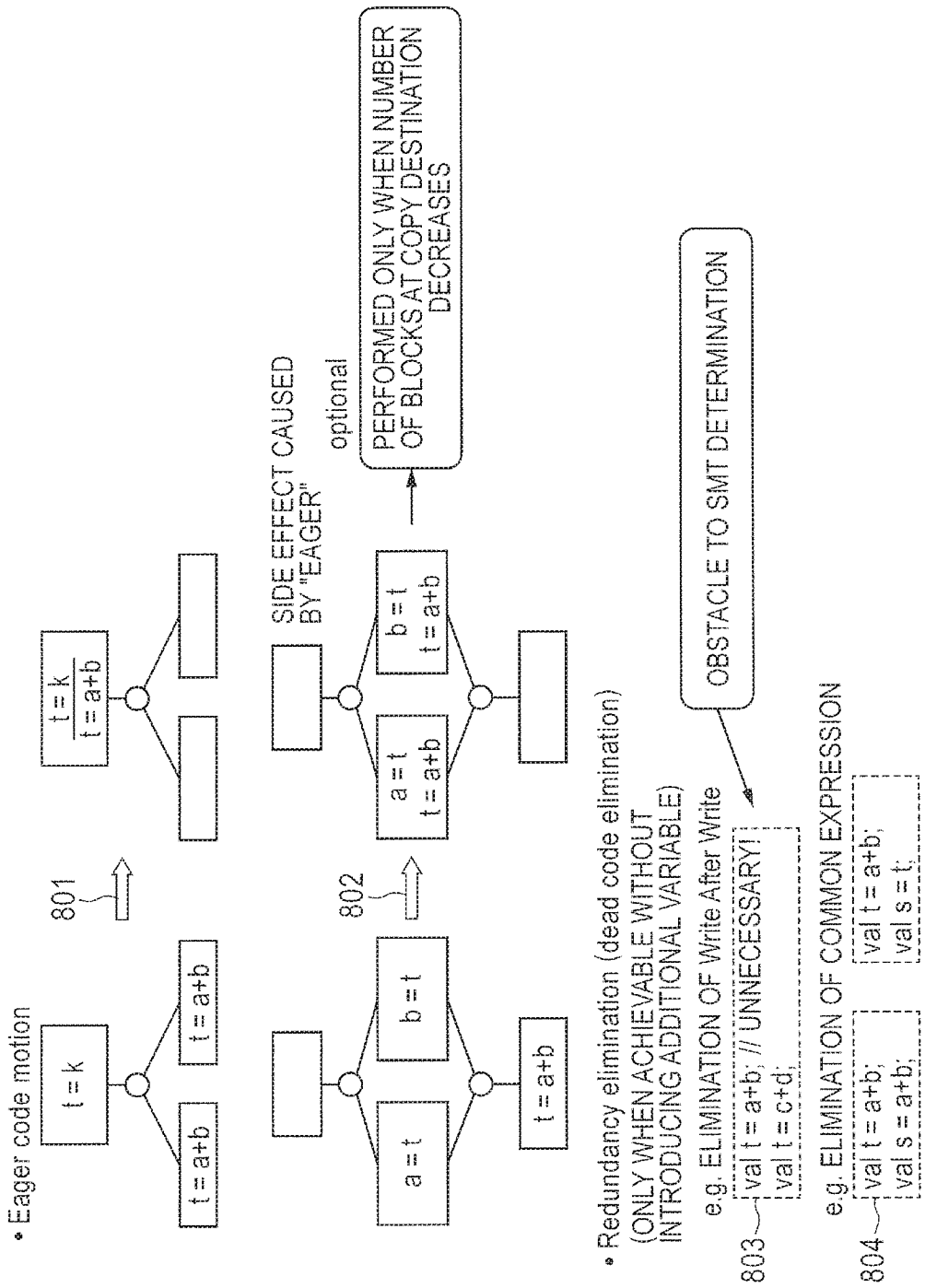
FIG. 21 is a diagram illustrating an example of difference code simplification.

FIG. 21 illustrates a concrete example of a process corresponding to the process in step S2 of FIG. 5. Processing steps implementable by an existing compiler technology will not be described in detail because they are obvious from the illustrated concrete example. FIG. 21 illustrates concrete examples of (1) eager code motion, (2) dead code elimination, and (3) redundancy elimination. Each of these concrete examples is described below. Here, the following description assumes that the orig k and update k building procedures and the determination of Equation (2) of condition 1 are completed in advance.

(1) Eager Code Motion

The present example assumes that a general eager code motion is performed only when there is no increase in the number of code motion target statements. At 801, the number of statements (t=a+b) is changed from two to one due to code motion. Therefore, 801 is an implementation target. Meanwhile, at 802, the number of statements is changed from one to two due to code motion. Therefore, 802 is not an implementation target (2) Dead Code Elimination As indicated at 803, the present example merely erases "Write after Write". Further, as it is assumed that no unreachable code is included, there is no need to perform common dead code elimination. The dead code elimination process is performed when an unreachable code is encountered in the process (1).

(3) Redundancy Elimination

In the present example, common redundancy elimination is performed on condition that no new intermediate variable be introduced. In the example shown at 804, redundancy elimination is performed based on copy propagation that does not incur the introduction of an intermediate variable during redundancy elimination. Even in the case of common subexpression elimination or partial redundancy elimination, it is assumed that redundancy elimination is performed when no new intermediate variable needs to be introduced. It is also assumed that (1), (2), and (3) are sequentially applied to each difference code in the order named. It will be obvious from the subsequent description that the above-mentioned processes reduce the calculation load on an SMT derivation process, a simulation determination process, and a bisimulation determination process, which will be described later.

Figure 22:
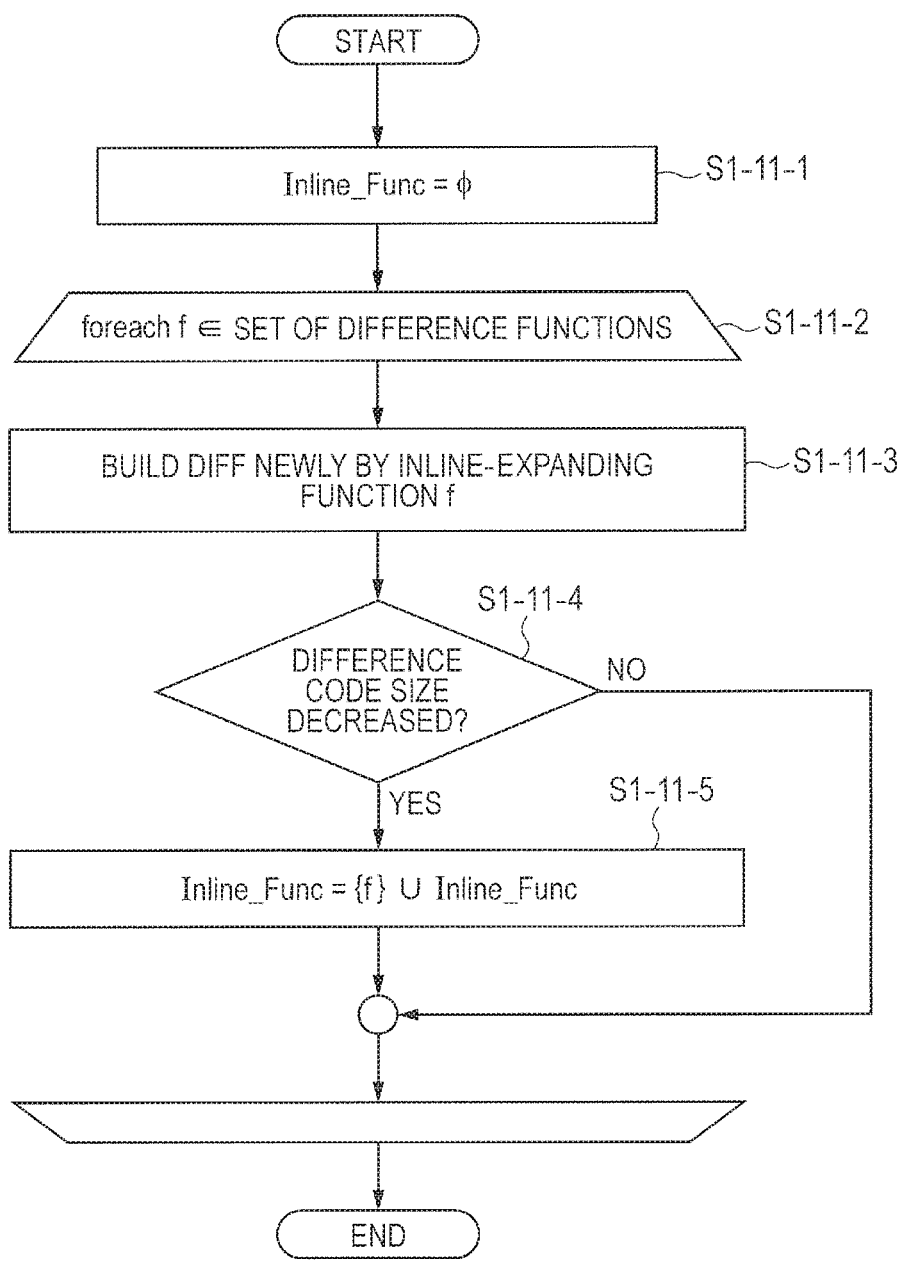
FIG. 22 is a flowchart illustrating the flow of inline expansion strategy determination of each difference function for difference code size reduction.

An exemplary procedure for building a difference code without inline-expanding a difference function has been described. However, the determination process of Equation (2) is significantly affected by un-updated and updated difference code sizes of orig k and update k. Therefore, difference code size reduction based on appropriate inline expansion of a difference function is also studied. FIG. 22 is a flowchart illustrating an example of an inline expansion strategy determination process on a difference function for difference code size reduction. If this process is not applied, it is assumed that a difference code is built and then inline-expanded.

(1) In step S1-11-1, the difference code generation section 1041 initializes a set Inline_Func to $\phi$ (empty set). Inline_Func is a subset of a set of difference functions and represents a set of difference functions that are inline-expanded before difference code configuration.

(2) In step S1-11-2, the difference code generation section 1041 repeatedly performs steps S1-11-2 to S1-11-5 for a function f that is the original of a difference function.

(3) In step S1-11-3, the difference code generation section 1041 builds a difference code by inline-expanding the function f.

(4) In step S1-11-4, the difference code generation section 1041 determines whether the difference code size is reduced. If the difference code size is reduced, processing proceeds to step S1-11-5.

(5) In step S1-11-5, the difference code generation section 1041 adds the function f to the set Inline_Func by executing the equation Inline_Func={f} ∪ Inline_Func.

(6. Configuration of EFSM (Extended Finite State Machine))

Figure 23:
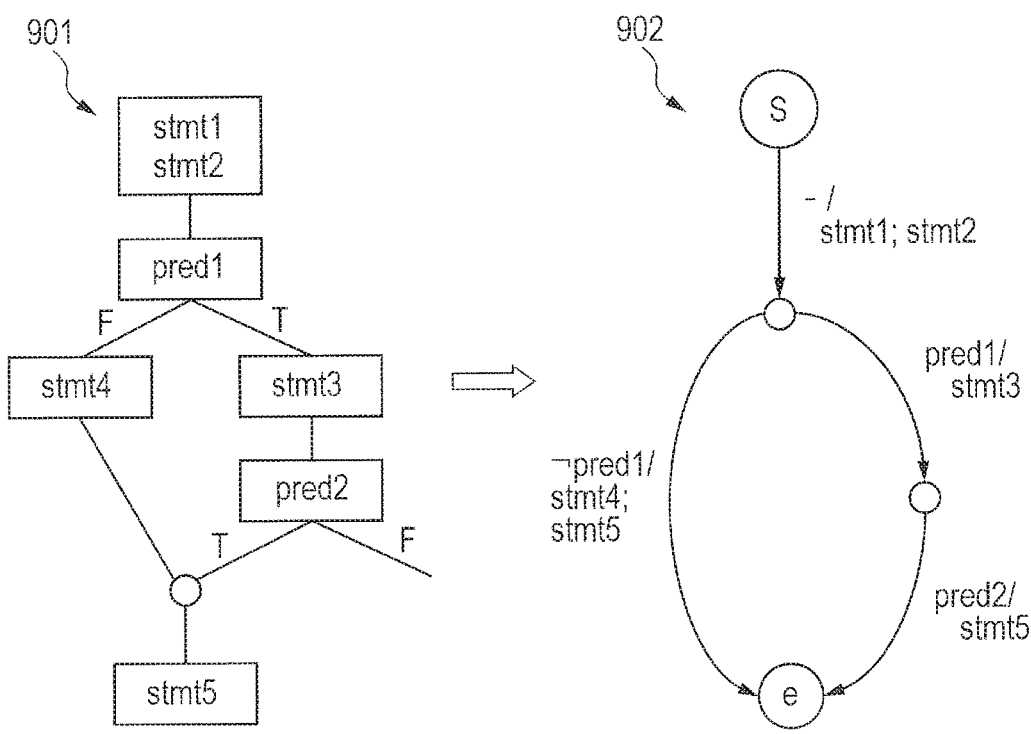
FIG. 23 is a diagram illustrating an exemplary configuration of an EFSM.

FIG. 23 illustrates a concrete example of an EFSM configuration method used in step S3 of FIG. 5. A control flow graph derived from conversion of a program code is generally known, and an EFSM derived from conversion of a control flow graph can be configured as described in Thomas A. Henzinger, Ranjit Jhala, Rupak Majumdar, and Gregoire Sutre, Lazy abstraction, Proceedings of the 29th Annual Symposium on Principles of Programming Languages (POPL), ACM Press, 2002, pp. 58-70. Therefore, the details of an EFSM configuration are not described below.

An example of the control flow graph is illustrated at 901. An example of the EFSM configured from 901 as described in Thomas A. Henzinger, Ranjit Jhala, Rupak Majumdar, and Gregoire Sutre, Lazy abstraction, Proceedings of the 29th Annual Symposium on Principles of Programming Languages (POPL), ACM Press, 2002, pp. 58-70 is illustrated at 902. In order to configure 902 from 901, the logical expression derivation section 1042 assigns a state to the beginning of the control flow graph and to each branch, performs a depth-first search on one state to another, regards a branch condition as a transition condition as indicated at 902, and configures the EFSM by using an executable statement as an executable statement for each state transition. If there is no branch in the above instance, an unconditional state occurs. Thus, "–" is shown at 902 to indicate an unconditional transition.

(7. SMT Expression Derivation)

It is assumed that a difference function not included in the set Inline_Func determined as shown in FIG. 22 is inline-expanded in an updated difference code before SMT expression derivation from the updated difference code.

Figure 24:
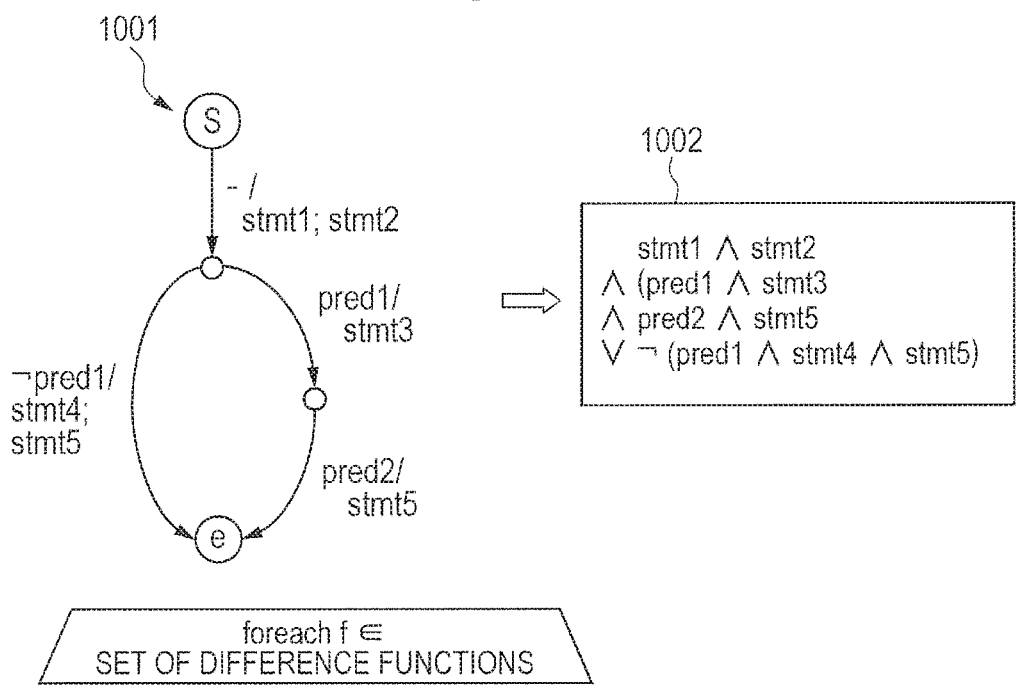
FIG. 24 is a diagram illustrating an example of SMT expression derivation performed when no loop exists.

FIG. 24 illustrates a concrete example of SMT expression derivation performed in step S4 of FIG. 5 when no loop exists. In order to derive an SMT expression from the EFSM, the logical expression derivation section 1042 performs a depth-first search, obtains a logical product of a transition condition and an executable statement that are added for each state transition traced during the depth-first search, couples branch paths with a logical sum, and obtains a logical product of all acquired expressions. As FIG. 24 illustrates a case where no loop exists, the logical product of the transition condition and executable statement for each state transition is obtained in the order indicated in Equation (5) below while performing the depth-first search on 1001:

$$\left. \begin{array}{c} stmt1 \land stmt2 \\ pred1 \land stmt3 \land pred2 \land stmt5 \text{ //}_{branch\ path} \\ \neg pred1 \land stmt4 \land stmt5 \text{ //}_{branch\ path} \end{array} \right\} \quad (5)$$

Then, an overall logical product is obtained to configure Equation (6) as shown at 1002:

$$stmt1 \land stmt2 \land (pred1 \land stmt3 \land pred2 \land stmt5 \lor \neg pred1 \land stmt4 \land stmt5) \quad (6)$$

Figure 25:
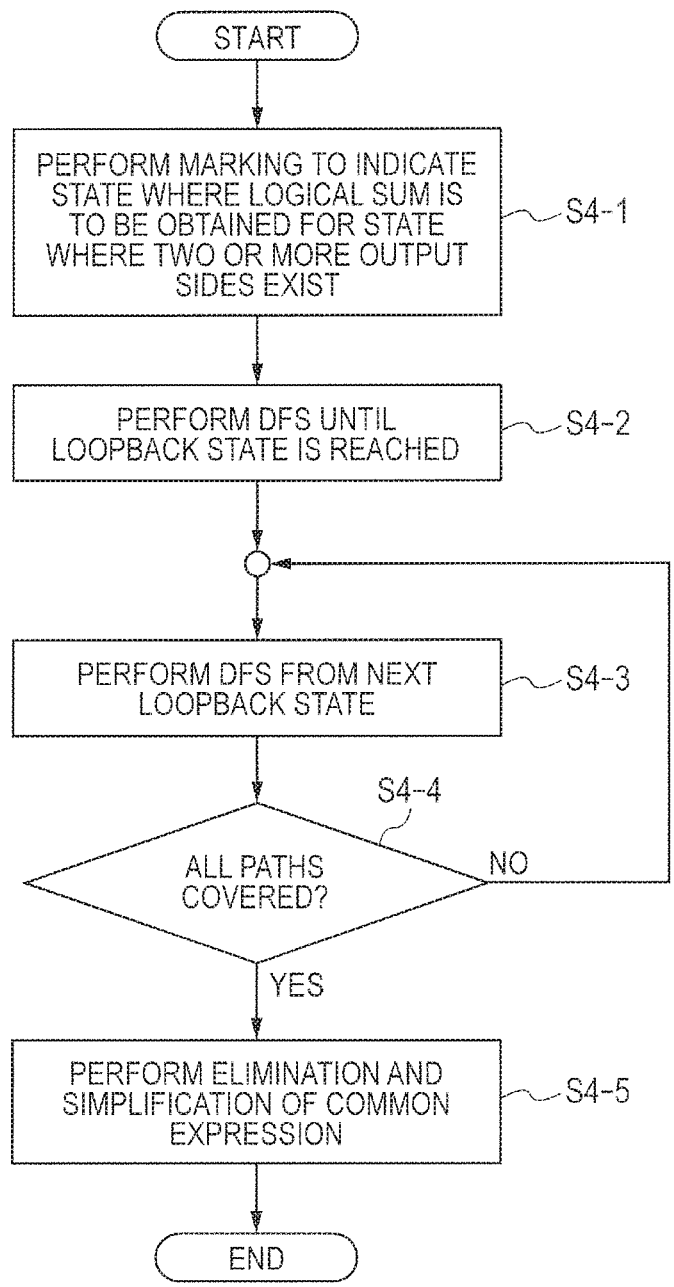
FIG. 25 is a flowchart illustrating an SMT conversion process performed when a loop exists.

FIG. 25 illustrates an exemplary flow of a process for deriving the SMT expression from the EFSM when a loop exists.

(1) In step S4-1, the logical expression derivation section 1042 performs marking to indicate a state where a logical sum is to be obtained for a state where two or more output sides exist.

(2) In step S4-2, the logical expression derivation section 1042 performs a depth-first search until the next loopback state and a local loopback state are reached, obtains a logical product of a transition condition and an executable statement that are added for each state transition traced during the depth-first search, obtains a logical sum in the case of a branch path, and obtains a logical product of all acquired expressions. Here, the next loopback state is allocated as a temporary logical variable.

(3) In step S4-3, the logical expression derivation section 1042 performs a depth-first search from the next loopback state until the second next loopback state, a local loopback state, or an edge indicative of a state transition already searched for is reached, obtains a logical product of a transition condition and an executable statement that are added for each state transition traced during the depth-first search, obtains a logical sum in the case of a branch path, and obtains a logical product of all acquired expressions. Here, state transitions already searched for are not included in an expression. The next loopback state is allocated as a temporary logical variable. The expression is expanded into the temporary logical variable allocated in an earlier step.

(4) In step S4-4, the logical expression derivation section 1042 checks whether all paths are covered by the search. If so, processing proceeds to step S4-5. If not, processing returns to step S4-3.

(5) In step S4-5, the logical expression derivation section 1042 performs common subexpression elimination and simplification on obtained SMT expressions.

As is obvious from the processing flow, even if a branch structure is changed while retaining the meaning of a program, an SMT expression capable of indicating equivalence through a bisimulation equivalence determination can be derived as far as a loop structure remains unchanged. As regards a loop structure change, a difference-induced mismatch determination is avoided by performing "do { . . . } while ( . . . )" conversion and "while ( . . . ) { . . . }" conversion on difference codes existing before and after an update, which are handled prior to processing. If, in particular, DAGs formed of only a loopback state are configured from difference codes existing before and after the update and in agreement with each other as graphs, an SMT expression building process illustrated in FIG. 25 is performed.

Figure 26:
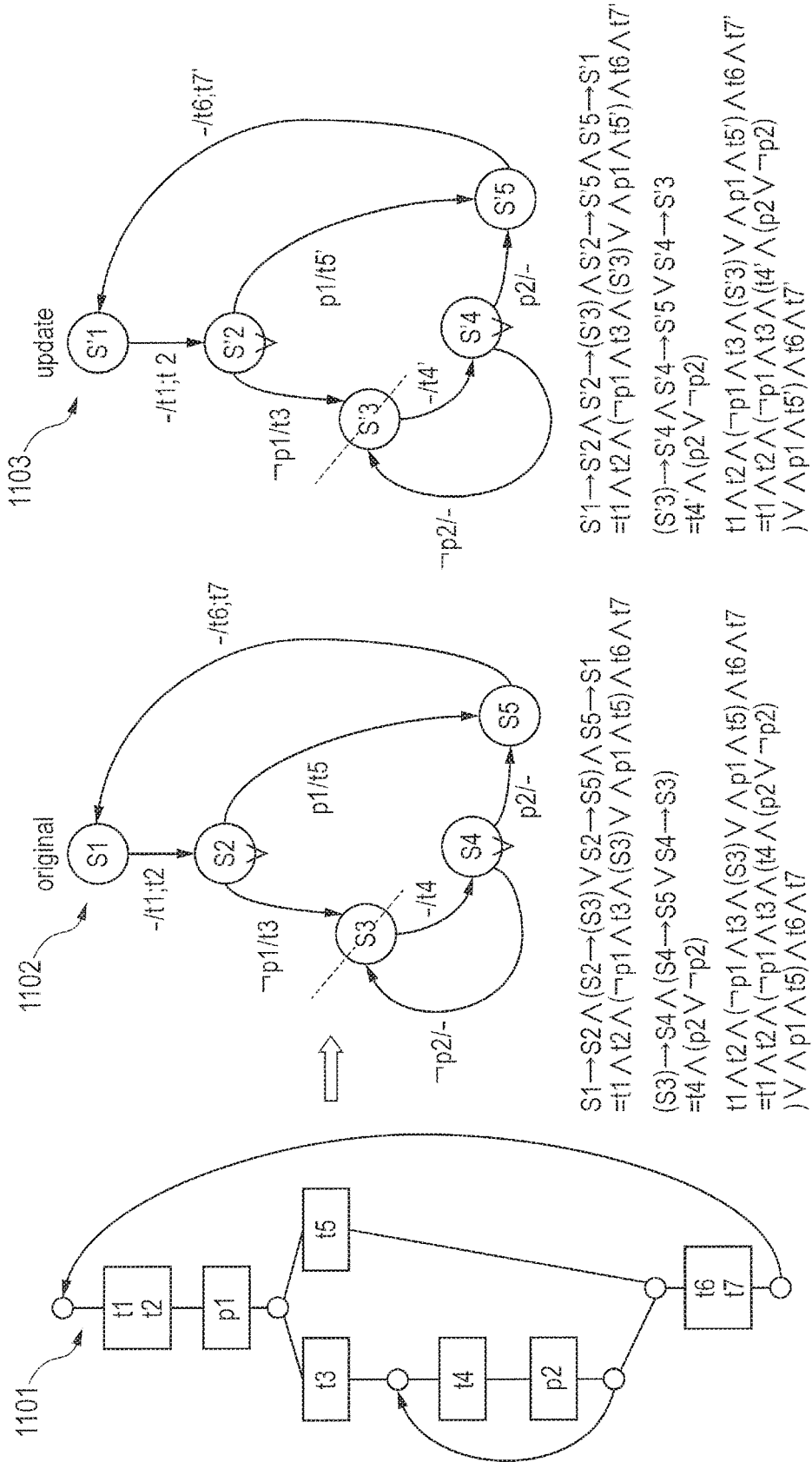
FIG. 26 is a diagram illustrating an example of SMT conversion performed when a loop exists.

FIG. 26 illustrates a concrete example of a process for deriving the SMT expression from the EFSM when a loop exists. Unchanged and changed difference code structures to be handled are shown at 1001. The present example assumes that the change corrects t4 to t4', t5 to t5', and t7 to t7'. The EFSM of un-updated difference codes is shown at 1102, and a logical sum V is added to a state indicative of a branch. The EFSM of updated difference codes is shown at 1103, and a logical sum V is similarly added to a state indicative of a branch. The process illustrated in FIG. 25 is applied to 1102, and a depth-first search is performed from a state S1 until the next loopback state S3 or a local state S1 is reached. As a result, Equation (7) below is obtained:

$$S1 \rightarrow S2 \wedge (S2 \rightarrow (S3) \vee S2 \rightarrow S5) \wedge S5 \rightarrow S1 = t1 \wedge t2 \wedge (\neg p1 \wedge t3 \wedge (S3) \vee \wedge p1 \wedge t5) \wedge t6 \wedge t7 \quad (7)$$

Here, (S3) represents the next loopback state. Subsequently, a depth-first search is performed from a state S3 until a local state S3 or an already traced state transition (S5→S1 in the present example) is reached. As a result, Equation (8) below is obtained:

$$(S3) \rightarrow S4 \wedge (S4 \rightarrow S5 \vee S4 \rightarrow S3) = t4 \wedge (p2 \vee \neg p2) \quad (8)$$

Equation (9) below is obtained by substituting Equation (8) into (S3):

$$t1 \wedge t2 \wedge (\neg p1 \wedge t3 \wedge (S3) \vee \wedge p1 \wedge t5) \wedge t6 \wedge t7 = t1 \wedge t2 \wedge (\neg p1 \wedge t3 \wedge (t4 \wedge (p2 \vee \neg p2)) \vee \wedge p1 \wedge t5) \wedge t6 \wedge t7 \quad (9)$$

Equation (10) below is obtained by simplifying Equation (9):

$$t1 \wedge t2 \wedge (\neg p1 \wedge t3 \wedge t4 \vee \wedge p1 \wedge t5) \wedge t6 \wedge t7 \quad (10)$$

Equation (11) below is obtained by performing the same process on 1103:

$$t1 \wedge t2 \wedge (\neg p1 \wedge t3 \wedge t4' \vee \wedge p1 \wedge t5') \wedge t6 \wedge t7' \quad (11)$$

(8. Simulation Determination and Bisimulation Determination)

Figure 27:
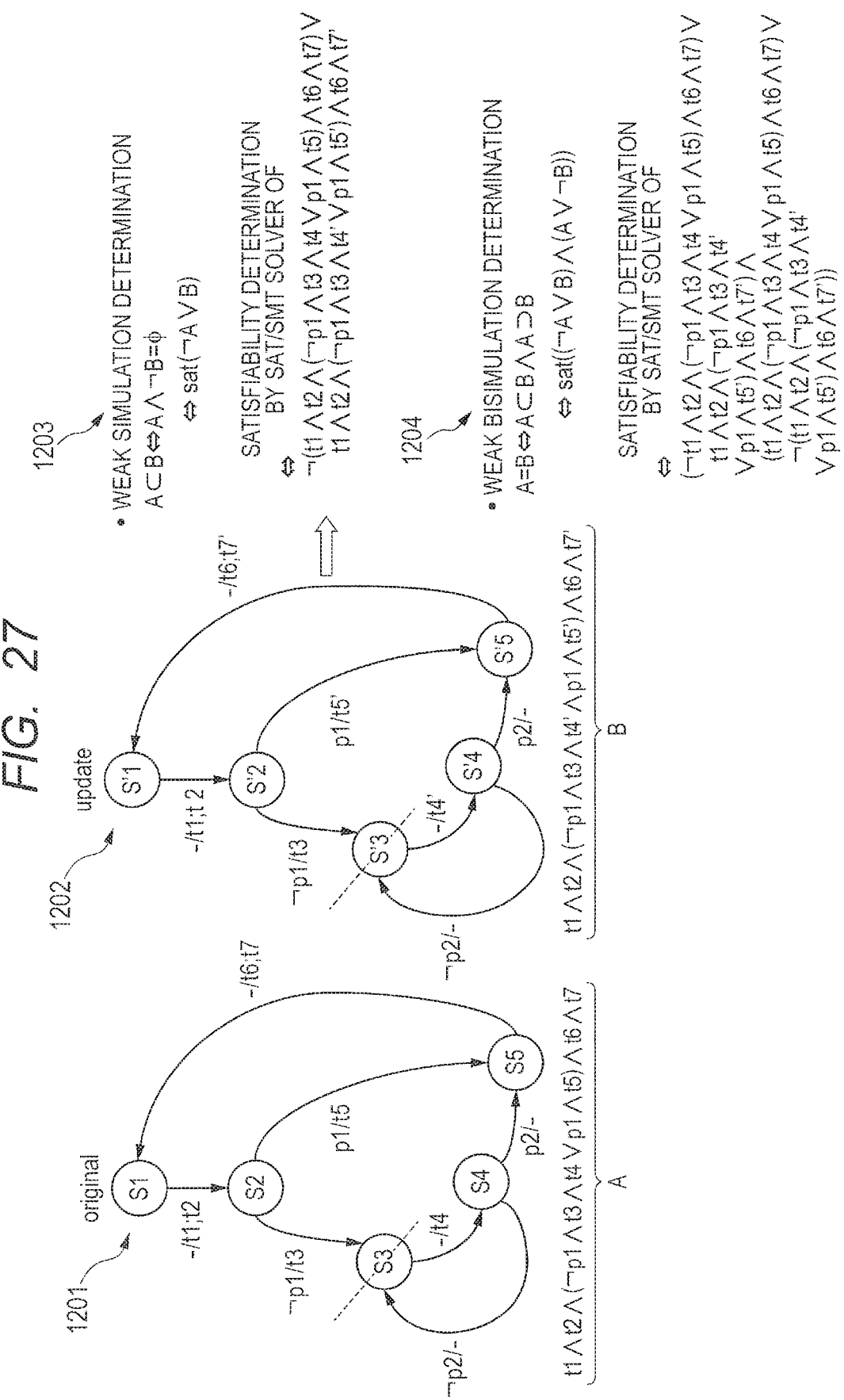
FIG. 27 is a diagram illustrating examples of simulation relation determination and bisimulation equivalence determination.

FIG. 27 illustrates examples of simulation relation determination and bisimulation equivalence determination based on a derived SMT expression. An EFSM built from un-updated difference codes and an SMT expression (12) derived from the EFSM are shown at 1201. This SMT expression is designated as A.

$$t1 \wedge t2 \wedge (\neg p1 \wedge t3 \wedge t4 \vee p1 \wedge t5) \wedge t6 \wedge t7 \quad (12)$$

Meanwhile, an EFSM built from updated difference codes and an SMT expression (13) derived from the EFSM are shown at 1202. This SMT expression is designated as B.

$$t1 \wedge t2 \wedge (\neg p1 \wedge t3 \wedge t4' \vee p1 \wedge t5') \wedge t6 \wedge t7' \quad (13)$$

As shown at 1203, a simulation relation determination is represented by Equation (14) below:

$$A \subset B \Leftrightarrow A \cap \neg B = \phi$$

However, as A and B are SMT expressions, Equation (14) is equivalent to Equation (15) below:

$$A \wedge \neg B = \text{False} \quad (15)$$

That is to say, the left side of Equation (15) is unsatisfiable. Thus, it is equivalent to say that Equation (16) below is satisfiable.

$$\neg A \vee B \quad (16)$$

Therefore, satisfiability should be determined by using a SAT/SMT solver of Equation (17) below:

$$\neg (t1 \wedge t2 \wedge (\neg p1 \wedge t3 \wedge t4 \vee p1 \wedge t5) \wedge t6 \wedge t7) \wedge t1 \wedge t2 \wedge (\neg p1 \wedge t3 \wedge t4' \vee p1 \wedge t5') \wedge t6 \wedge t7' \quad (17)$$

If satisfaction is achieved, a simulation relation is established. If satisfaction is not achieved, the simulation relation is not established.

As shown at 1204, a bisimulation equivalence determination is represented by Equation (18) below:

$$A = B \Leftrightarrow A \subset B \wedge A \supset B \quad (18)$$

However, as A and B are SMT expressions, Equation (18) is equivalent to Equation (19) below:

$$A \wedge \neg B \vee \neg A \wedge B = \text{False} \quad (19)$$

That is to say, the left side of Equation (19) is unsatisfiable. Thus, it is equivalent to say that Equation (20) below is satisfiable.

$$(\neg A \vee B) \vee (A \wedge \neg B) \quad (20)$$

Therefore, satisfiability should be determined by using the SAT/SMT solver of Equation (21) below:

$$(\neg (t1 \wedge t2 \wedge (\neg p1 \wedge t3 \wedge t4 \vee p1 \wedge t5) \wedge t6 \wedge t7) \vee t1 \wedge t2 \wedge (\neg p1 \wedge t3 \wedge t4' \vee p1 \wedge t5') \wedge t6 \wedge t7') \wedge (t1 \wedge t2 \wedge (\neg p1 \wedge t3 \wedge t4 \vee p1 \wedge t5) \wedge t6 \wedge t7 \vee \neg (t1 \wedge t2 \wedge (\neg p1 \wedge t3 \wedge t4' \vee p1 \wedge t5') \wedge t6 \wedge t7')) \quad (21)$$

If satisfaction is achieved, bisimulation equivalence is established. If satisfaction is not achieved, bisimulation equivalence is not established.

(Advantageous Effects)

Consequently, the present embodiment provides the following advantageous effects.

(1) Whether a dynamic program update is achievable can be determined even when an employed embedded device is inexpensive, is not a processor having an independently-operable redundant hierarchical structure, and is equipped with only a task dispatcher. If it is determined that a dynamic program update is achievable, the dynamic program update can be performed.

(2) A dynamic program update is achievable if an updated program is to be obtained by applying no more than three types of changes to an un-updated program, that is, by making corrections without changing the meanings of operations, adding functions, and changing fixed constant values.

(3) Program context tracing, which is essential during the use of a conventional technology, is performed merely to determine whether all tasks are idle. Therefore, dynamic switching overhead can be minimized.

As real-time capability is essential in an embedded device, loop structure changes affecting a cycle should not be made to change a program. Accordingly, the above-described analysis method effectively works.

Second Embodiment

In the first embodiment, which is described above, a dynamic program update can be achieved only when all tasks are idle. In the first embodiment, although the switching overhead is minimized, update timing (only when all tasks are idle) is significantly restricted. In view of such circumstances, a second embodiment will now be described to disclose a method of achieving a dynamic program update by making only a static context analysis achievable by a task dispatcher without tracing dynamic program context for analysis purposes when each task is idle, waiting, suspended, or ready. The method according to the second embodiment makes it possible to perform a more flexible dynamic program update than the method according to the first embodiment while significantly reducing overhead as compared to a conventional method.

Figure 28:
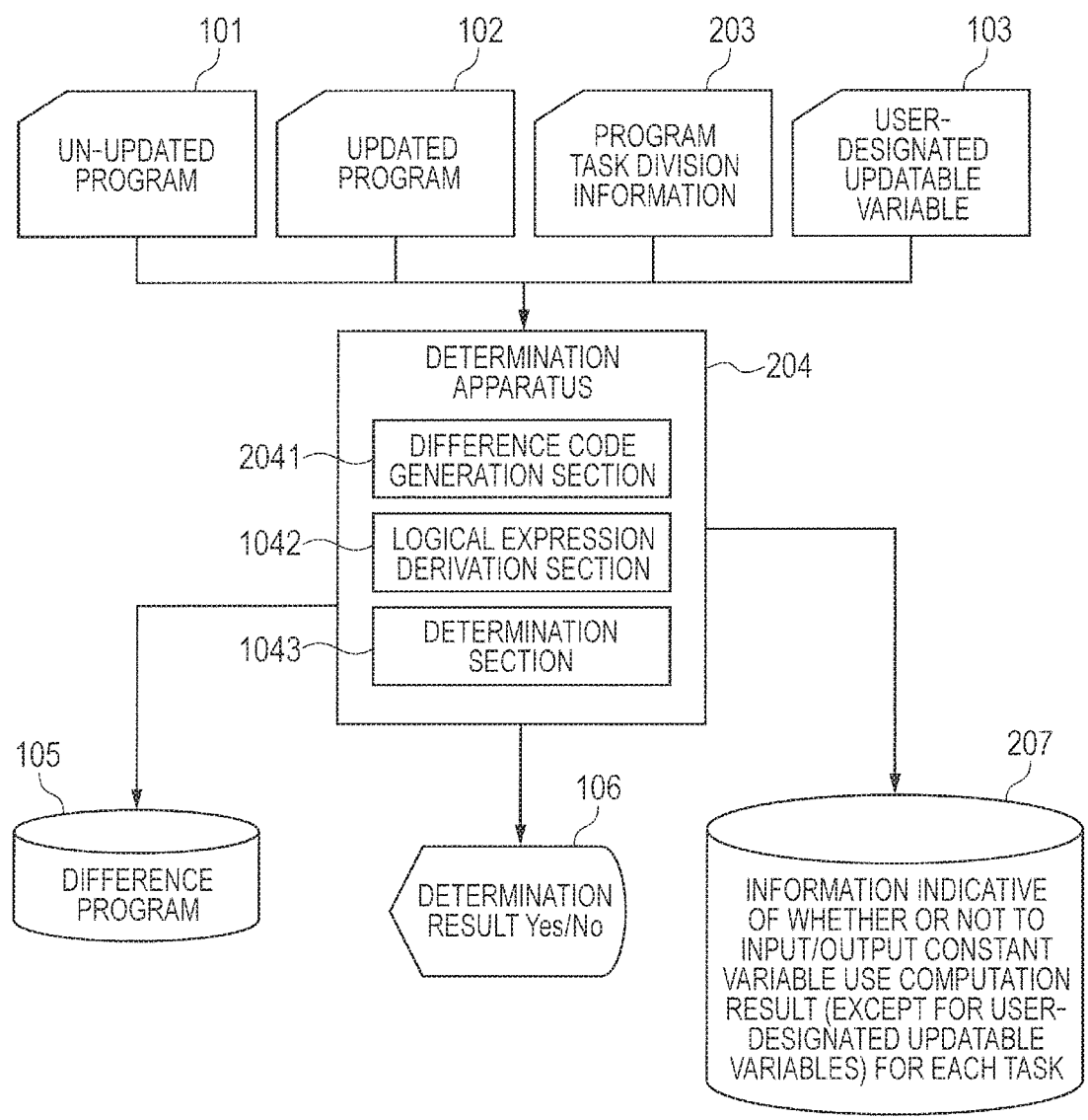
FIG. 28 is a block diagram illustrating a system configuration according to a second embodiment of the present invention.

The second embodiment provides a means and system for receiving an un-updated program, an updated program, user-designated updatable variable information, and program task division information, making a sufficient condition determination to determine whether a dynamic update is achievable, determining whether or not to input/output a constant variable use computation result (except for user-designated updatable variables) for each task, and returning determination results. The means or the system may generate a difference program. FIG. 28 illustrates a system configuration according to the second embodiment. The system configuration includes a means for performing a dynamic program update in an embedded device only when all tasks on the processor are idle, waiting, ready, or suspended. The sufficient conditions for determining whether a dynamic update is achievable are the same as in the first embodiment.

(1. System Configuration)

FIG. 28 illustrates a system configuration according to the second embodiment. A determination apparatus 204 inputs an un-updated program 101, an updated program 102, a user-designated updatable variable 103, and program task division information 203, performs a sufficiency determination process to check for dynamic updatability, and outputs a determination result 106, a difference program 105, and information 207 indicative of whether or not to input/output a constant variable use computation result (except for user-designated updatable variables) for each task. Here, the user-designated updatable variable 103 is the same as indicated in FIG. 2 for the first embodiment and is information indicative of user-designated variables that can be changed by a dynamic program update. The program task division information 203 is task definition information indicative of a program function group included in each task. The determination apparatus 204 includes a difference code generation section 2041, a logical expression derivation section 1042, and a determination section 1043.

When all tasks on the processor become idle, the dynamic program update in the embedded device is performed by using a program switching mechanism included in the embedded device. For example, dynamic program allocation is performed during program execution to let the task dispatcher running on the processor confirm that all the tasks are idle, waiting, ready, or suspended. Subsequently, a check is performed to confirm that a task for outputting a constant variable use computation result to an idle, waiting, or suspended un-updated task is not included, a task for receiving a constant variable use computation result while an updated task is waiting or ready is not included, or all tasks are idle. Then, the value of a register storing an update request is polled to check for an update request. When the update request is verified, an address converter is enabled to achieve the dynamic program update.

(2. Overview of Condition 1 Determination Procedure)
 Same as in the first embodiment.
(3. Overall Flow of Sufficient Condition Determination of Dynamic Updatability)
 Same as in the first embodiment.
(4. Difference Code Generation Process in View of Function Hierarchy)

In addition to the process performed by the difference code generation section 1041 according to the first embodiment, the difference code generation section 2041 makes an interprocedural data flow analysis of both an un-updated program and an updated program in order to determine whether each function first returns a constant array computation result as a return value, generates an inter-task data output, and receives the return value and the inter-task data output. Next, the difference code generation section 2041 uses the program task division information 203 indicative of functions included in each task in order to determine whether each un-updated task returns a computation result of update target constants as a return value and generates an inter-task data output, and determines whether each updated task receives the return value and the inter-task data output. The difference code generation section 2041 outputs information indicative of determination results as the information 207 indicative of whether or not to input/output a constant variable use computation result (except for user-designated updatable variables) for each task.

(5. Simplification of Un-updated Code and Updated Code in Update Target Portion)
 Same as in the first embodiment.
(6. Configuration of EFSM (Extended Finite State Machine))
 Same as in the first embodiment.
(7. SMT Expression Derivation)
 Same as in the first embodiment.
(8. Simulation Determination and Bisimulation Determination)
 Same as in the first embodiment.

(Advantageous Effect)

When each task is idle, waiting, suspended, or ready, a dynamic program update can be performed by making only a static context analysis achievable by a task dispatcher without tracing dynamic program context for analysis purposes.

Third Embodiment

A third embodiment provides secure dynamic allocation of an update difference program in an embedded device and performs a secure dynamic update operation. The third embodiment can be implemented by combining the first and second embodiments. Accordingly, the secure dynamic allocation of an update difference program in an embedded device and the secure dynamic update operation will now be described.

(Dynamic Allocation of Difference Codes) (Three Planes)

Figure 36:
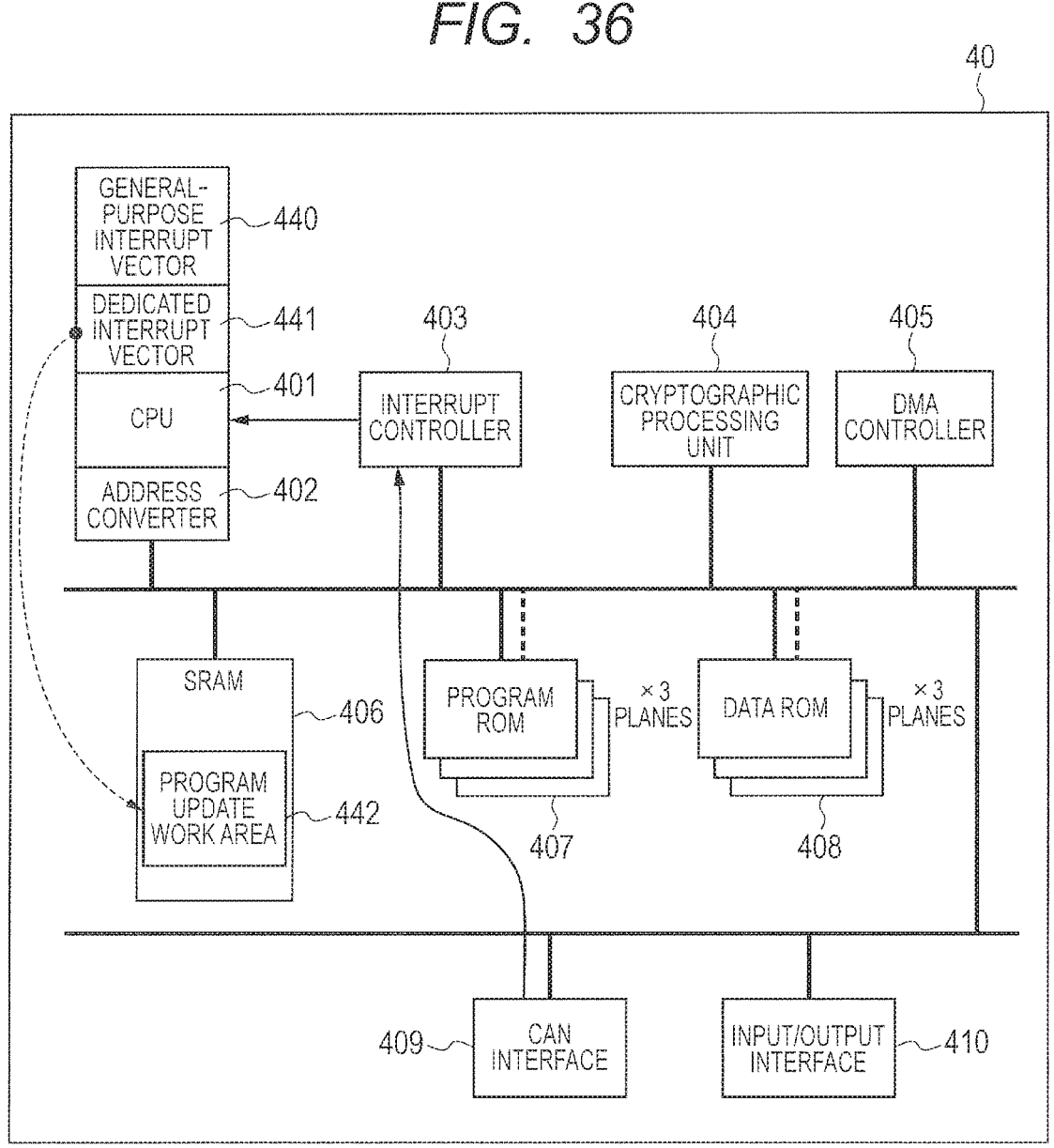
FIG. 36 is a schematic diagram illustrating an example of dynamic allocation of a program in an embedded device.

First of all, the dynamic allocation of a program in an embedded device will be described. FIG. 36 is a schematic diagram illustrating an example of dynamic allocation of a program in an embedded device 40. Here, the SRAM 406 in the embedded device 40 has a program update work area 442 that is fixed-assigned at startup. The CPU 401 includes a general-purpose interrupt vector table 440 and a dedicated interrupt vector table 441. The dedicated interrupt vector table 441 is an interrupt vector table used for dynamic program allocation. Physically, the dedicated interrupt vector table 441 may be implemented as a part of the general-purpose interrupt vector table 440. An example of dynamic program allocation is described below.

(1) An interrupt controller 403 receives an interrupt for requesting the transfer of update information from a CAN interface 409. The interrupt controller 403 then interrupts the CPU 401.

(2) The CPU 401 references the dedicated interrupt vector table 441 and executes the associated interrupt handler. The CAN interface 409 then transfers the update information to the SRAM 406 under the control of the CPU 401 or a DMA controller 405. In this instance, an injection code included in the update information is allocated in the program update work area 442. Further, each received data is signed in advance, and stored with a predetermined address of the program update work area 442 regarded as the head address.

(3) Steps (1) and (2) above are repeated until the interrupt controller 403 receives an interrupt indicative of an update information transfer delimiter from the CAN interface 409 and then the CPU 401 receives the interrupt.

(4) The interrupt controller 403 receives the interrupt indicative of the update information transfer delimiter from the CAN interface 409, and then the CPU 401 receives the interrupt.

(5) The CPU 401 references the dedicated interrupt vector table 441 and executes the associated interrupt handler. The injection code allocated in the program update work area 442 is then executed. The injection code allocates an update data table (i.e., local and global variables with an initial value included in update difference codes) in the program ROM 407/data ROM 408 not accessed by the CPU 401, allocates an update difference binary in the program ROM 407 not accessed by the CPU 401, or allocates an address conversion table in the data ROM 408 not involved in a current execution, depending on the type of injection code.

(6) Steps (1) to (5) above are repeated until the interrupt controller 403 receives an interrupt indicative of the end of update information transfer from the CAN interface 409 and then the CPU 401 receives the interrupt.

(7) The interrupt controller 403 receives the interrupt indicative of the end of update information transfer from the CAN interface 409, and then the CPU 401 receives the interrupt.

(8) The CPU 401 references the dedicated interrupt vector table 441 and executes the associated interrupt handler. The data table and difference codes allocated in the program ROM 407/data ROM 408 and the address conversion table allocated in the address converter 402 and the data ROM 408 are then subjected to signature verification. If the signature verification is successful, the embedded device 40 stores a difference code signature (hash value) in the data ROM 408 and outputs a completion notice from the CAN interface 409 to the outside. Further, the embedded device 40 sets a flag to indicate that a difference code allocation plane is to be changed after a restart. If, by contrast, the signature verification is unsuccessful, the embedded device 40 erases the data table and difference codes allocated in the program ROM 407/data ROM 408, erases the address conversion table allocated in the address converter and the data ROM, and outputs a signature verification failure notice from the CAN interface 409 to the outside.

(Dynamic Allocation of Difference Codes) (Two Planes)

When the program ROM 407/data ROM 408 has two planes, a default program is changed at first. When a dynamic update is determined to be achievable in accordance with the first embodiment, the default program can be changed by turning off the address conversion table upon detecting that all tasks are sleeping. Subsequently, the difference codes are dynamically allocated in the same manner as described for three planes.

(Secure Dynamic Allocation of Difference Codes)

Figure 37:
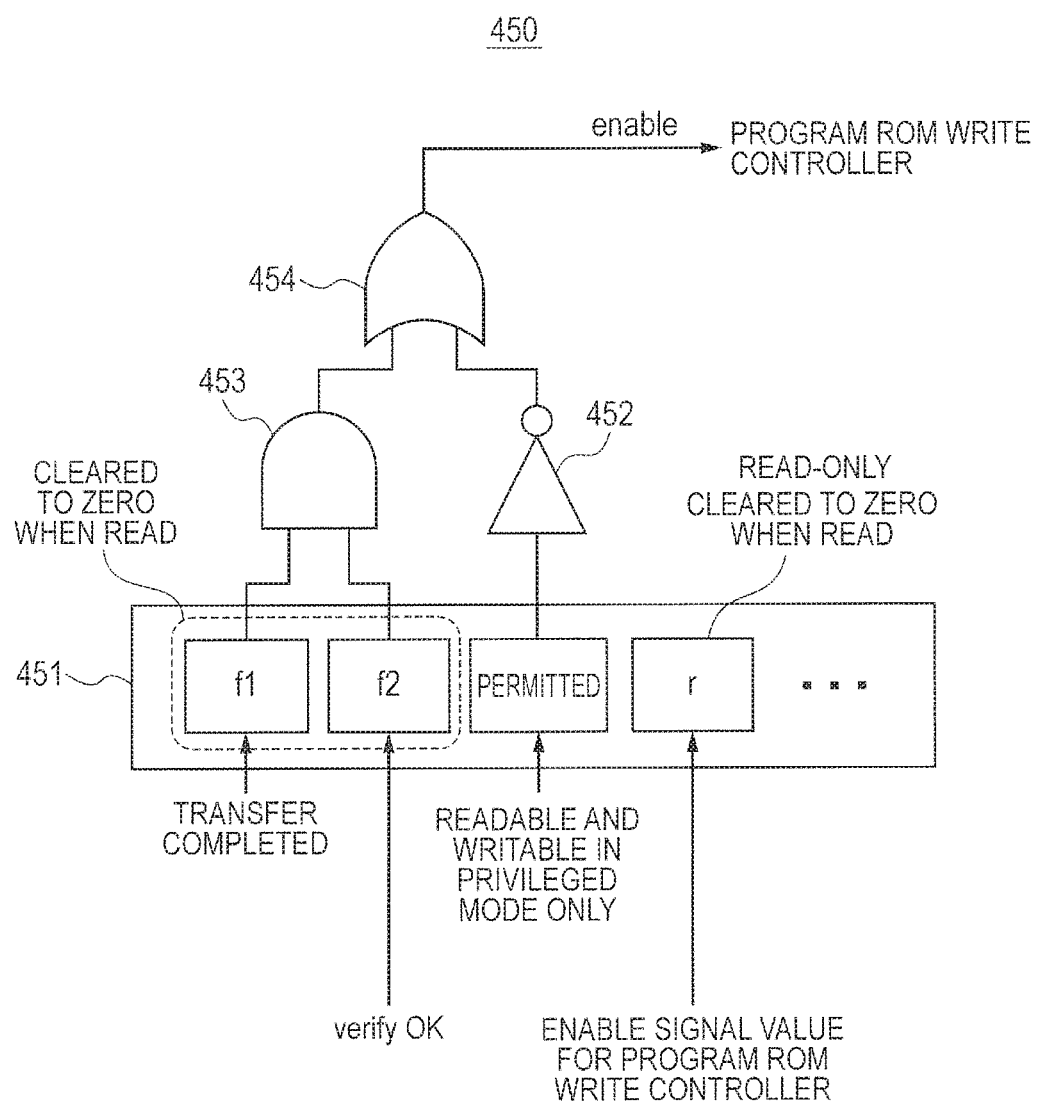
FIG. 37 is a schematic diagram illustrating an example of a control circuit for determining whether or not to permit a write operation to a ROM.

In the present embodiment, signature verification is performed before writing into the program ROM 407/data ROM 408. Dynamic allocation of update information can be performed more robustly by allowing hardware to manage whether signature verification is performed before writing into the program ROM 407/data ROM 408. FIG. 37 is a schematic diagram illustrating an example of a control circuit 450 for determining whether or not to permit a write operation to the ROM.

In the present embodiment, the embedded device 40 includes the control circuit 450. The control circuit 450 includes an update control register 451, an inverting circuit 452, an AND circuit 453, and an OR circuit 454. The update control register 451 includes a "permission" bit, an "f1" bit, an "f2" bit, and an "r" bit. The "permission" bit of the update control register 451 is inputted to the inverting circuit 452. The "f1" and "f2" bits of the update control register 451 are inputted to the AND circuit 453. The output of the AND circuit 453 and the output of the inverting circuit 452 are inputted to the OR circuit 454. The output of the OR circuit 454 is inputted to a write controller that is a control circuit included in the program ROM 407/data ROM 408. The "permission" bit can be read and written only when the CPU 401 is in a privileged mode. Control exercised by the control circuit 450 is valid only when the "permission" bit is set to "1". The "f1" bit indicates the completion of data transfer to the SRAM 406, which is made before writing into the program ROM 407/data ROM 408. Upon completion of data transfer to the SRAM 406, the "f1" bit is set to "1". The "f2" bit indicates whether signature verification is successful. Upon completion of signature verification, the "f2" bit is set to "1". When read, the "f1" and "f2" bits are cleared to "0". According to the control circuit 450, control exercised by the control circuit 450 is valid when the "permission" bit is set to "1", and only when both the "f1" and "f2" bits are subsequently set to "1", the write controller in the program ROM 407/data ROM 408 is validated. If signature verification is skipped while control exercised by the control circuit 450 is validated, the write controller in the program ROM 407/data ROM 408 is invalidated. Thus, even if a write BIOS is executed by a certain means, the program ROM 407/data ROM 408 is not written into. An enable signal value for the write controller in the program ROM 407/data ROM 408 is written to the "r" bit. The "r" bit is a read-only bit. When read, the "r" bit is cleared to "0". The control circuit 450 may be separately provided for each of the program ROM 407 and the data ROM 408.

Figure 38:
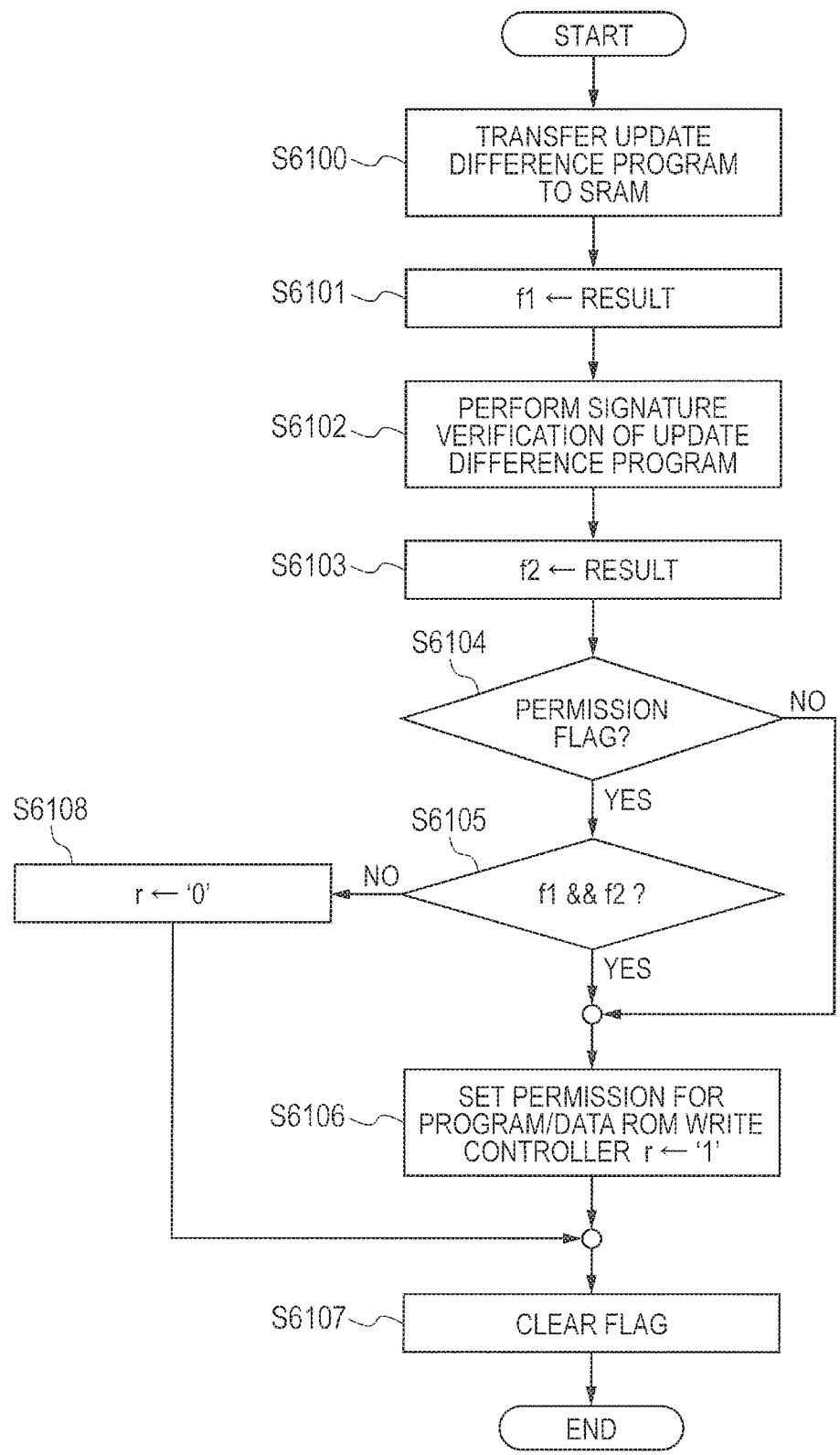
FIG. 38 is a flowchart illustrating an example of a write control operation performed by the control circuit.

An example of an operation performed by using the control circuit 450 will now be described. FIG. 38 is a flowchart illustrating an example of a write control operation performed by using the control circuit 450. It is assumed that processing indicated in this flowchart starts when step 6100 is executed.

In step 6100 (S6100), an update difference program is transferred to the SRAM 406 in accordance with an update operation described in conjunction with the first or second embodiment.

In step 6101 (S6101), which is performed after transfer, the CPU 401 sets the "f1" bit. Here, the CPU 401 sets "1" if the transfer is normally terminated, and sets "0" if the transfer is not normally terminated.

In step 6102 (S6102), a cryptographic processing unit 404 (signature verification section) perform signature verification of the update difference program.

In step 6103 (S6103), which is performed after signature verification, the CPU 401 sets the "f2" bit. The CPU 401 sets "1" if the result of signature verification is normal, and sets "0" if the result is not normal.

In step 6104 (S6104), a check is performed to determine whether the "permission" bit is "1". If the "permission" bit is "1", processing proceeds to step 6105. If not, processing proceeds to step 6106.

In step 6105 (S6105), a check is performed to determine whether the "f1" and "f2" bits are both "1". If the "f1" and "f2" bits are both "1", processing proceeds to step 6106. If not, processing proceeds to step 6108.

In step 6106 (S6106), a write permission is set for the write controller in the program ROM 407/data ROM 408, and the "r" bit is set to "1".

In step 6107 (S6107), the CPU 401 invariably reads the update control register 451. The update control register 451 is read to confirm the contents of the "f1", "f2", and "r" bits. Further, these three bits are cleared to "0". Processing then terminates. When a write process is completed in step 6107, the CPU 401 can check the "r" bit to determine whether the actual enable signal value for the write controller is 1 when the write process is performed. Moreover, as bits other than the permission bit are all cleared to "0", it is necessary to check whether signature verification and transfer completion are normally done when the next update difference program is written into the program/data ROM. This prevents an attack that may be launched by skipping such checks.

In step 6108 (S6108), the "r" bit is set to "0", and processing proceeds to step 6107.

In the present embodiment, which is as described above, the embedded device 40 includes the control circuit 450 that permits an update information write operation to the program ROM 407/data ROM 408 when the validity of the signature verification result is confirmed. This inhibits the update information from being written into the program ROM 407 or the data ROM 408 when the result of signature verification of the update information is invalid. This further makes it possible to inhibit the program ROM 407 or the data ROM 408 from being erased due to invalid update information.

(Dynamic Update Operation on Difference Codes) (Three Planes)

Figure 39:
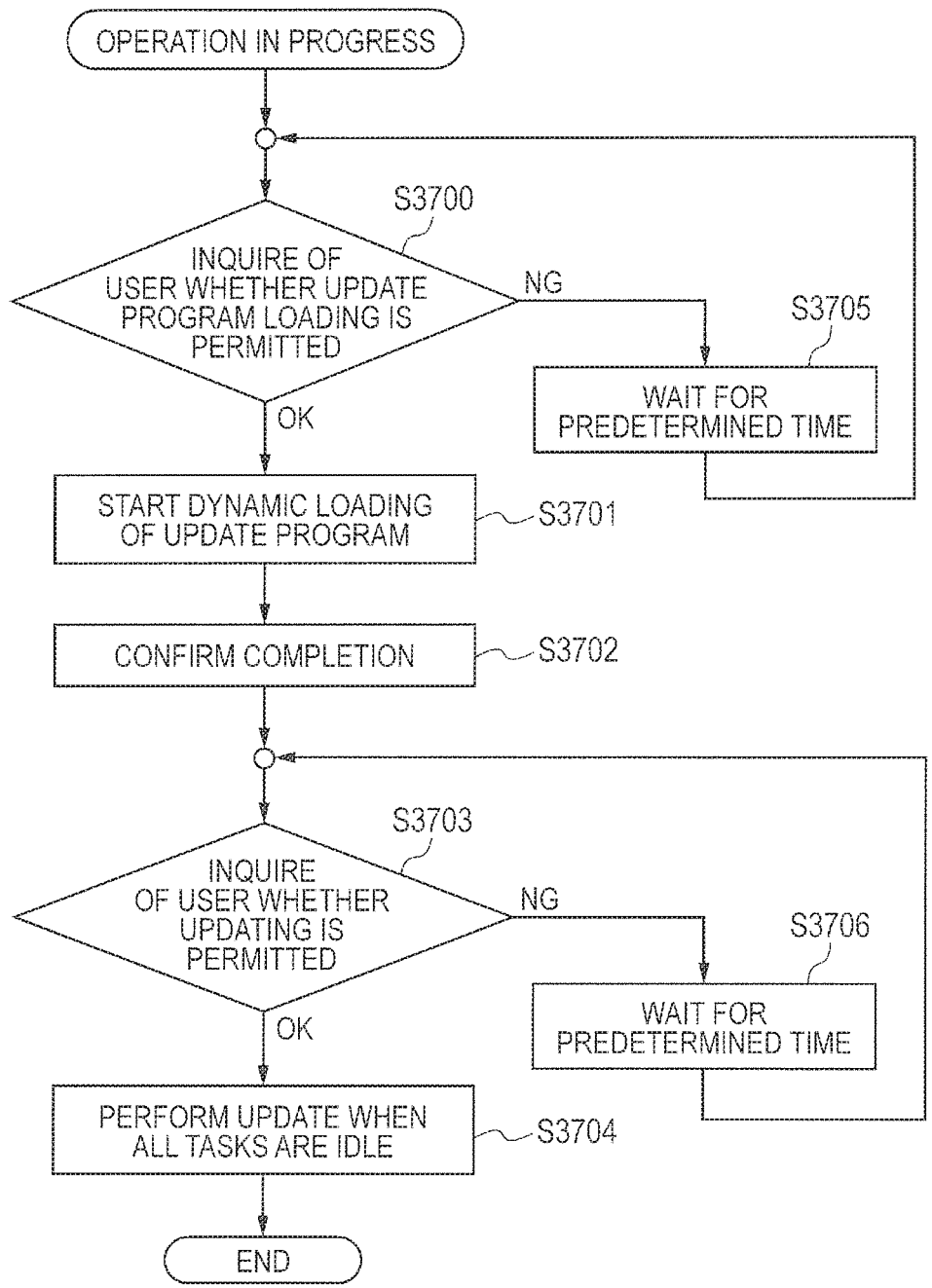
FIG. 39 is a flowchart illustrating an example of a program update procedure.

An example of an update procedure for a case where the program ROM 407 and the data ROM 408 have three planes is described below. FIG. 39 is a flowchart illustrating an example of a program update procedure.

In step 3700 (S3700), a management server 30 sends an inquiry to a user through a user interface 37 to determine whether the loading of an update program is permitted. If the loading is permitted, processing proceeds to step 3701. If not, processing proceeds to step 3705.

In step 3701 (S3701), the management server 30 begins to dynamically load the update program, that is, dynamically allocate the update program in the program ROM 407 and the data ROM 408. In dynamic allocation, difference from a program is allocated in the ROMs without stopping the operation of the program.

In step 3702 (S3702), the management server 30 confirms that the dynamic allocation of the update program is completed.

In step 3703 (S3703), the management server 30 sends an inquiry to the user through the user interface 37 to determine whether updating is permitted. If updating is permitted, processing proceeds to step 3704. If not, processing proceeds to step 3706.

In step 3704 (S3704), the task dispatcher confirms that all tasks are idle, and then updates difference codes.

In step 3705 (S3705), after the lapse of a predetermined standby time, processing returns to step 3700. Similarly, in step 3706 (S3706), after the lapse of a predetermined standby time, processing returns to step 3703.

(Dynamic Update Operation on Difference Codes) (Two Planes)

Figure 40:
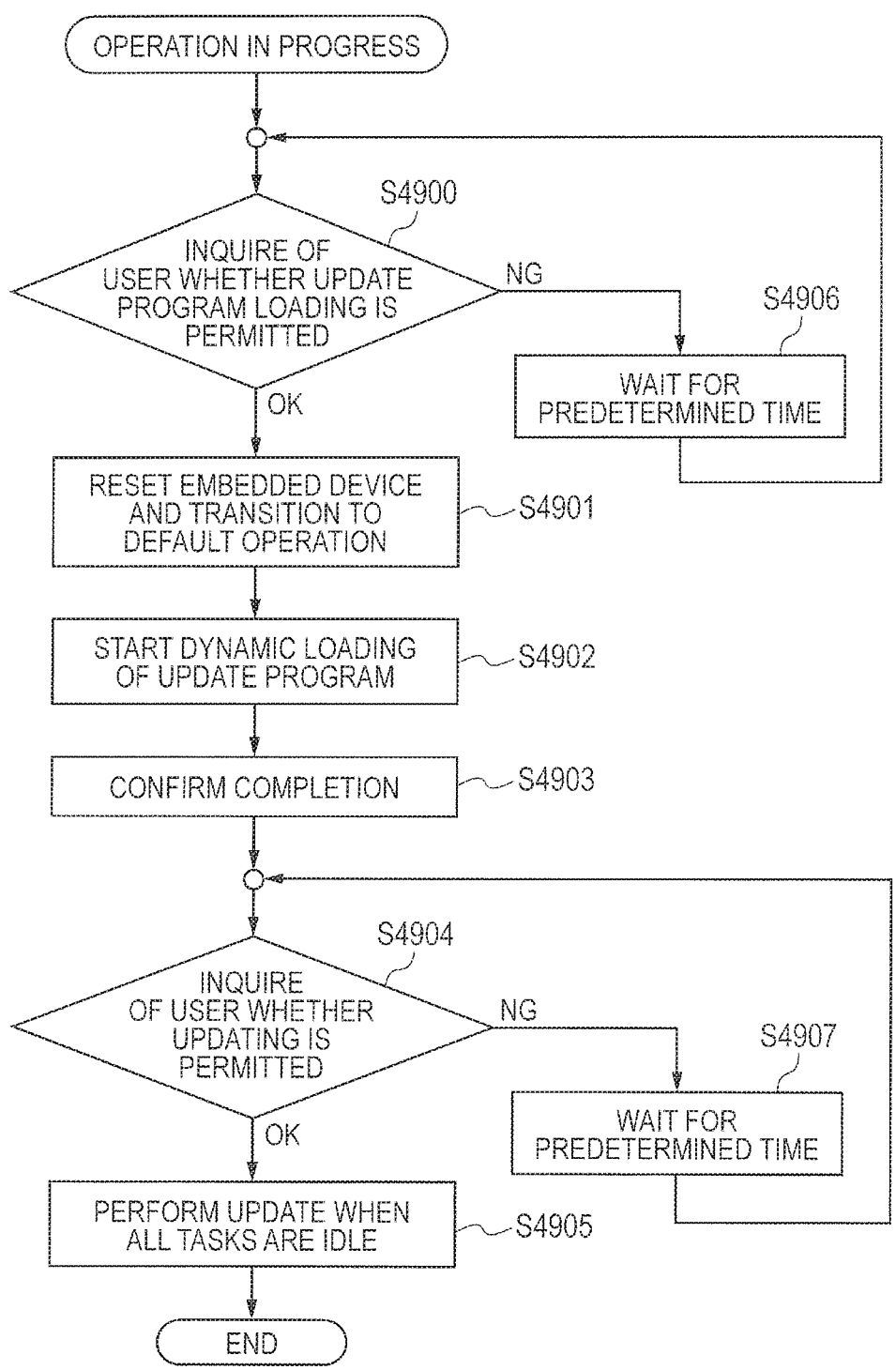
FIG. 40 is a flowchart illustrating another example of the program update procedure.

An example of an update procedure for a case where the program ROM 407 and the data ROM 408 have two planes is described below. FIG. 40 is a flowchart illustrating an example of a program update procedure.

In step 4900 (S4900), the management server 30 sends an inquiry to the user through the user interface 37 to determine whether the loading of an update program is permitted. If the loading is permitted, processing proceeds to step 4901. If not, processing proceeds to step 4906.

In step 4901 (S4901), after completion of a non-permission setup operation for the address conversion table setup and other setup operations necessary for reaching a default program running state, the embedded device 40 is reset and restarted. When restarted, the embedded device 40 transitions to the default program running state.

In step 4902 (S4902), the management server 30 begins to dynamically load the update program, that is, dynamically allocate the update program in the program ROM 407 and the data ROM 408.

In step 4903 (S4903), the management server 30 confirms that the dynamic allocation of the update program is completed.

In step 4904 (S4904), the management server 30 sends an inquiry to the user through the user interface 37 to determine whether updating is permitted. If updating is permitted, processing proceeds to step 4905. If not, processing proceeds to step 4907.

In step 4905 (S4905), the task dispatcher confirms that all tasks are idle, and then updates difference codes.

In step 4906 (S4906), after the lapse of a predetermined standby time, processing returns to step 4900. Similarly, in step 4907 (S4907), after the lapse of a predetermined standby time, processing returns to step 4904.

(Secure Dynamic Update Operation on Difference Codes)

An update operation performed in the embedded device in accordance with the present embodiment will now be described. When the present embodiment is applied to the embedded device 40 in which the program ROM 407 and the data ROM 408 have three planes, the update operation is the same as indicated in FIG. 39 except for the following. Further, when the present embodiment is applied to the embedded device 40 in which the program ROM 407 and the data ROM 408 have two planes, the update operation is the same as indicated in FIG. 40 except for the following. That is to say, when the present embodiment is applied, in step 3701 of FIG. 39 and in step 4902 of FIG. 40, the management server begins to dynamically allocate the update program in the program ROM 407 and the data ROM 408 in consideration of secure dynamic loading of the update program, that is, in consideration of secureness described in conjunction with the present embodiment. If dynamic allocation is not performed, a dynamic update operation can be performed even when the program ROM 407/data ROM 408 has one plane.

(Advantageous Effects)

(1) Whether a dynamic program update is achievable can be determined even when an employed embedded device is inexpensive, is not a processor having an independently-operable redundant hierarchical structure, and is equipped with only a task dispatcher. If it is determined that a dynamic program update is achievable, the dynamic program update can be performed in a secure manner.

(2) A dynamic program update can be performed in a secure manner if an updated program is to be obtained by applying no more than three types of changes to an un-updated program, that is, by making corrections without changing the meanings of operations, adding functions, and changing fixed constant values.

(3) Program context tracing, which is essential during the use of a conventional technology, is performed merely to determine whether all tasks are idle. Therefore, dynamic switching overhead can be minimized in a secure manner.

(4) When each task is idle, waiting, suspended, or ready, a dynamic program update can be performed by making only a static context analysis achievable by a task dispatcher without tracing dynamic program context for analysis purposes.

Fourth Embodiment

In a fourth embodiment, dynamic rollback is performed when all tasks are idle in a situation where conditions 1 and 2 are met by pre-rollback and post-rollback programs with respect to a program obtained upon dynamic rollback (or fallback) to a point designated upon abnormality detection during an update in the embedded device or designated by an external instruction or to a default program. As is obvious from Masatomo Hashimoto, A Method of Safety Analysis for Runtime Code Update, In Proc. of ASIAN, LNCS 4435, pp. 60-74, 2007, the dynamic program updatability condition is met by the above-mentioned dynamic rollback under its execution conditions. The fourth embodiment can be implemented in combination with the first embodiment. Therefore, dynamic rollback in the embedded device will be described below.

(Rollback to Default Program)

When all the tasks are sleeping based on an instruction for rollback to the default program upon abnormality detection during an update in the embedded device or in compliance with an external instruction, the address converter shown in FIG. 29 is turned off in order to prohibit the execution of a difference program, that is, make only the default program executable. This performs rollback to the default program.

(Rollback to Designated Point)

When all the tasks are sleeping based on an instruction for rollback to a point designated upon abnormality detection during an update in the embedded device or in compliance with an external instruction, the address converter shown in FIG. 29 is first turned off in order to transition to a default program, then an address conversion table associated with difference code execution permitting program execution relative to the designated point stored, for example, in the data ROM is read, the read conversion table is set in the address converter, and eventually, at a dynamic switching timing described in conjunction with the first embodiment, that is, when all the tasks are sleeping, the address converter is turned on to permit program execution relative to the designated point. In this manner, rollback to the designated point is performed. In the above instance, a difference program necessary for program execution relative to the designated point may be read from the data ROM and overwritten in a code ROM. Particularly, an update difference code write operation may be performed after loading a difference code existing in the code ROM into the data ROM.

(Advantageous Effect)

Fallback and rollback of a program running in an embedded device can be performed.

Alternative Embodiments

Dynamic rollback can be performed by combining the second embodiment with the third or fourth embodiment when all tasks are idle, waiting, ready, or suspended in a situation where conditions 1 and 2 are met by pre-rollback and post-rollback programs with respect to a program obtained upon dynamic rollback to a point designated upon abnormality detection during an update in the embedded device or designated by an external instruction or to a default program.

While the present invention made by its inventors has been described in detail with reference to foregoing embodiments, the present invention is not limited to the foregoing embodiments. It is to be understood by those skilled in the art that various modifications can be made without departing from the spirit and scope of the present invention.

What is claimed is:

1. A determination apparatus comprising:
a difference code generation section that generates a first difference code and a second difference code, the first difference code representing a set of code pieces in a first program that are different from code pieces in a second program, the second difference code representing a set of code pieces in the second program that are different from code pieces in the first program, the first program being un-updated and the second program being updated;
a logical expression derivation section that performs predetermined conversion to derive a first logical expression from the first difference code, and performs the predetermined conversion to derive a second logical expression from the second difference code; and
a determination section that, depending on whether the second logical expression includes the first logical expression, determines whether the first program in a predetermined embedded device is dynamically updatable to the second program to output a determination result, the first program being updated according to the determination result.

2. The determination apparatus according to claim 1, wherein the logical expression derivation section performs the predetermined conversion to derive a first SMT (Satisfiability Modulo Theories) expression from the first difference code as the first logical expression and derive a second SMT expression from the second difference code as the second logical expression.

3. The determination apparatus according to claim 2, wherein, when the first difference code and the second difference code include a loop description, the logical expression derivation section performs the predetermined conversion to build a first EFSM (Extended Finite State Machine) from the first difference code, build a second EFSM from the second difference code, derive the first SMT expression from the first EFSM as the first logical expression, and derive the second SMT expression from the second EFSM as the second logical expression.

4. The determination apparatus according to claim 3, wherein the logical expression derivation section performs a depth-first search, obtains a logical product of a transition condition and an executable statement that are added for each state transition traced during the depth-first search, couples branch paths with a logical sum, and obtains a logical product of all acquired expressions in order to derive the first SMT expression from the first EFSM and derive the second SMT expression from the second EFSM.

5. The determination apparatus according to claim 1, wherein, by using the first logical expression and the second logical expression, the determination section makes a simulation relation determination to determine whether the second logical expression includes the first logical expression, and makes a bisimulation equivalence determination to determine whether the first logical expression and the second logical expression are equivalent to each other.

6. The determination apparatus according to claim 1, wherein the logical expression derivation section performs the predetermined conversion by simplifying the first difference code and the second difference code.

7. The determination apparatus according to claim 6, wherein, for the above-mentioned simplification, the logical expression derivation section performs the predetermined conversion by subjecting the first difference code and the second difference code to eager code motion, dead code elimination, and redundancy elimination in sequence.

8. The determination apparatus according to claim 1, wherein the difference code generation section generates object codes as the first difference code and the second difference code by performing address resolution for a code indicative of a difference between the first program and the second program.

9. The determination apparatus according to claim 1, wherein the difference code generation section generates the first difference code and the second difference code by determining the difference between the first program and the second program in such a manner as to maintain a function call structure.

10. The determination apparatus according to claim 1, wherein the difference code generation section inputs task division information defining a program function group included in each task, uses the task division information to identify whether each task in the first program returns a return value indicative of the result of computation of a constant group to be updated or generates an inter-task data output, identifies whether each task in the second program receives the return value or the inter-task data output, and outputs information indicative of the result of identification.

11. A determination method comprising:
generating a first difference code and a second difference code, the first difference code representing a set of code pieces in a first program that are different from code pieces in a second program, the second difference code representing a set of code pieces in the second program that are different from code pieces in the first program, the first program being un-updated and the second program being updated;
performing predetermined conversion to derive a first logical expression from the first difference code and derive a second logical expression from the second difference code; and
determining, depending on whether the second logical expression includes the first logical expression, whether the first program in a predetermined embedded device is dynamically updatable to the second program to output a determination result, the first program being updated according to the determination result.

12. The determination apparatus according to claim 1, wherein the first difference code and the second difference code are updated based on an inline expansion process that is performed.

13. The determination apparatus according to claim 12, wherein the inline expansion process includes building the first and second difference code by inline expanding a function.

14. The determination apparatus according to claim 12, wherein the inline expansion process includes using a function that is an original of a difference function, and an inline function that is a subset of a set of difference functions and represents a set of difference functions that are inline-expanded before difference code configuration.

15. The determination apparatus according to claim 1, wherein the first and second difference code, which are a set of parts within the first and second programs, respectively, are used in order to determine whether the dynamic update can be performed.

16. The determination apparatus according to claim 12, wherein the logical expression derivation section performs the predetermined conversion to derive a first SMT (Satisfiability Modulo Theories) expression from the first difference code as the first logical expression and derive a second SMT expression from the second difference code as the second logical expression, and
wherein, by using the first logical expression and the second logical expression, the determination section makes a simulation relation determination to determine whether the second logical expression includes the first logical expression, and makes a bisimulation equivalence determination to determine whether the first logical expression and the second logical expression are equivalent to each other.

17. The determination method according to claim 11, wherein the first difference code and the second difference code are updated based on an inline expansion process that is performed.

18. The determination method according to claim 17, wherein the inline expansion process includes building the first and second difference code by inline expanding a function.

19. The determination method according to claim 17, wherein the inline expansion process includes using a function that is an original of a difference function, and an inline function that is a subset of a set of difference functions and represents a set of difference functions that are inline-expanded before difference code configuration.

20. The determination method according to claim 11, wherein the first and second difference code, which are a set of parts within the first and second programs, respectively, are used in order to determine whether dynamic update can be performed.

21. The determination apparatus according to claim 1, wherein the first difference code represents the set of code pieces extracted from the first program that are different from code pieces in the second program, the second difference code representing a set of code pieces extracted from the second program that are different from code pieces in the first program.

* * * * *